(12) United States Patent
Podhola

(10) Patent No.: US 12,620,845 B2
(45) Date of Patent: May 5, 2026

(54) ELECTROMAGNETIC POWER TRANSFER SYSTEM

(71) Applicant: Kamil Podhola, Liberec (CZ)

(72) Inventor: Kamil Podhola, Liberec (CZ)

( * ) Notice: Subject to any disclaimer, the term of this patent is extended or adjusted under 35 U.S.C. 154(b) by 832 days.

(21) Appl. No.: 17/857,012

(22) Filed: Jul. 3, 2022

(65) Prior Publication Data

US 2024/0006934 A1     Jan. 4, 2024

(51) Int. Cl.
H02K 1/16          (2006.01)
H02K 11/01         (2016.01)

(52) U.S. Cl.
CPC ............. H02K 1/16 (2013.01); H02K 11/01 (2016.01); *H02K 2201/12* (2013.01)

(58) Field of Classification Search
CPC ....... H02K 1/16; H02K 11/01; H02K 2201/12
USPC .......................................................... 310/179
See application file for complete search history.

(56) References Cited

U.S. PATENT DOCUMENTS

| | | | | |
|---|---|---|---|---|
| 7,482,716 | B2 * | 1/2009 | Sugita .................... | H02K 41/03 310/12.25 |
| 11,101,724 | B1 * | 8/2021 | Christensen ............ | H02P 25/08 |
| 2008/0048505 | A1 * | 2/2008 | Moriyama ............. | H02K 41/03 310/12.25 |
| 2008/0265684 | A1 * | 10/2008 | Farkas .................... | B60L 58/40 307/104 |
| 2011/0095644 | A1 * | 4/2011 | Hou ....................... | H02K 47/20 310/261.1 |

| | | | | |
|---|---|---|---|---|
| 2011/0273052 | A1 * | 11/2011 | Long ......................... | F03G 5/06 310/208 |
| 2013/0015726 | A1 * | 1/2013 | Trammell ............ | H02K 41/031 310/12.26 |
| 2013/0249343 | A1 * | 9/2013 | Hunstable .............. | H02K 31/02 310/177 |
| 2015/0188400 | A1 * | 7/2015 | Kemp ..................... | H02K 53/00 74/DIG. 9 |
| 2016/0339785 | A1 * | 11/2016 | Rumbak .................. | B60L 5/005 |
| 2017/0194823 | A1 * | 7/2017 | Tokoi ........................ | H02K 1/20 |
| 2017/0222494 | A1 * | 8/2017 | Hunstable .............. | H02K 21/12 |
| 2017/0346360 | A1 * | 11/2017 | Heidler .................... | H02K 3/42 |
| 2017/0353072 | A1 * | 12/2017 | Mcsheery .............. | H02K 1/182 |
| 2018/0212490 | A1 * | 7/2018 | Guina .................... | H02K 21/00 |
| 2019/0006896 | A1 * | 1/2019 | Baba ....................... | H02K 1/278 |

(Continued)

*Primary Examiner* — Rashad H Johnson

(57)          ABSTRACT

The invention relates to a stationary-rotational wireless power transfer system comprising a stationary primary electromagnetic interface providing a transverse magnetic field and a secondary electromagnetic interface spinning around an axis wherein a current is induced in a secondary electrical conductor. The primary interface can include conductor loops. The secondary conductor can be wound around a secondary magnetic conductor or can be oriented perpendicularly to the transverse magnetic field. The secondary magnetic conductor can be in a magnetic interaction with a primary magnetic conductor. The secondary electromagnetic interface can be configured to be an electric motor. The interfaces can be coupled with respective electrocomponents. The system can provide data transmission, modularity, power transfer between tracks and vehicles or offshore vessels. The system can comprise a shielding, an insulation, a thermal management system. A transverse magnetic field motor, a magnetic field driving method and an electric piston engine are proposed.

20 Claims, 24 Drawing Sheets

(56)                    References Cited

U.S. PATENT DOCUMENTS

| | | | |
|---|---|---|---|
| 2019/0305592 A1* | 10/2019 | Vannucci | H01P 3/16 |
| 2021/0344256 A1* | 11/2021 | Kummeth | H01F 27/363 |
| 2021/0376707 A1* | 12/2021 | McDonald | B65G 23/23 |
| 2022/0006340 A1* | 1/2022 | Hunstable | H02K 1/16 |
| 2022/0045559 A1* | 2/2022 | Hunstable | H02K 21/24 |
| 2023/0167886 A1* | 6/2023 | Duan | H02K 1/27 |
| 2024/0006934 A1* | 1/2024 | Podhola | H02K 41/02 |
| 2024/0223059 A1* | 7/2024 | Julen | H02K 41/025 |
| 2024/0375795 A1* | 11/2024 | Gadagkar | B64G 1/409 |

* cited by examiner

FIG. 15
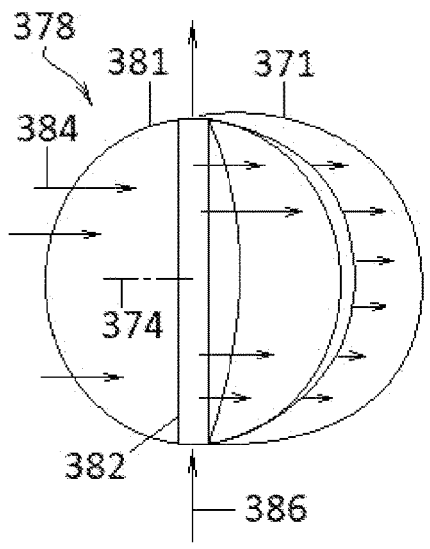
FIG. 16
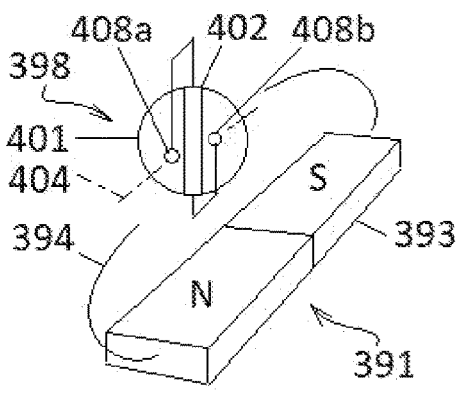
FIG. 17a
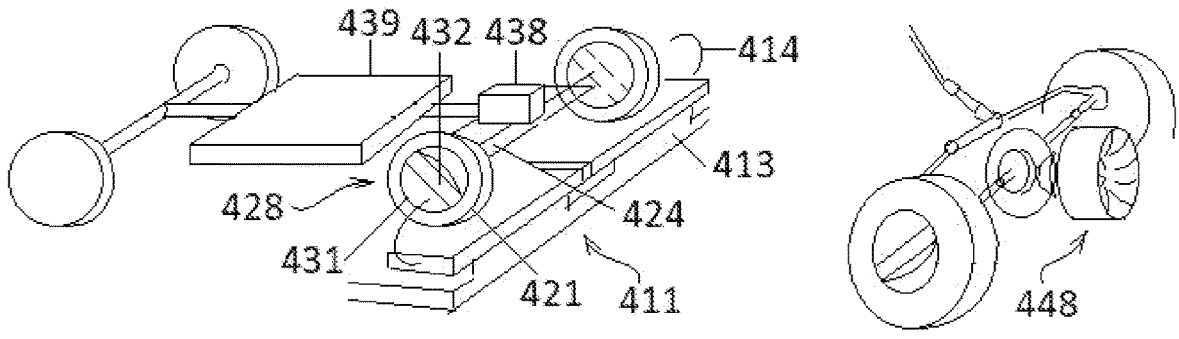
FIG. 17b
FIG. 18
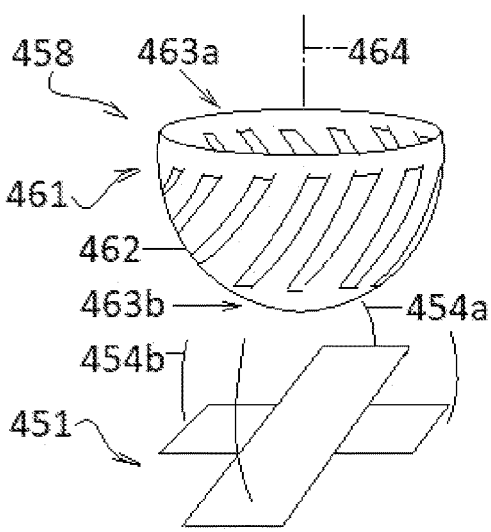
FIG. 19
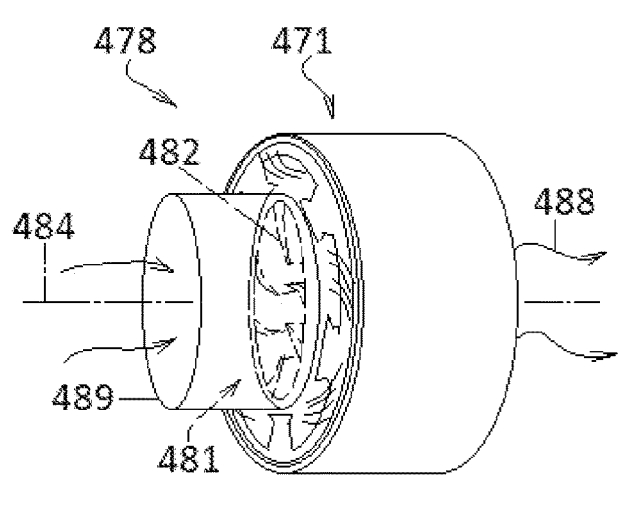

FIG. 20
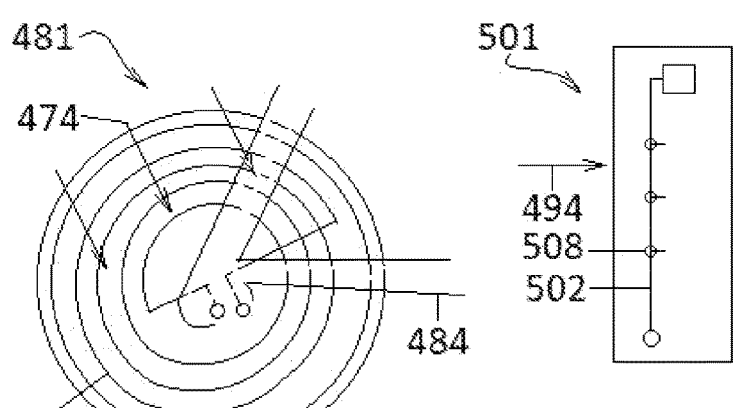
481
474
482
484
FIG. 21
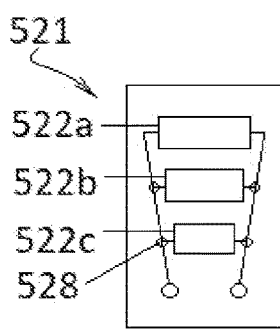
501
494
508
502
FIG. 22
521
522a
522b
522c
528
FIG. 23
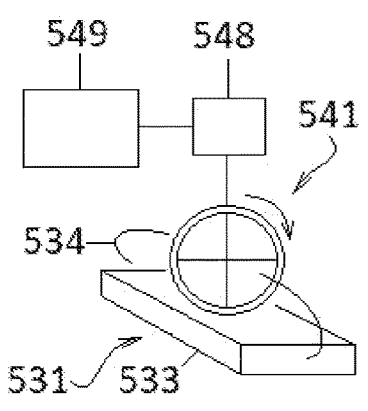
549 548
541
534
531 533
FIG. 24
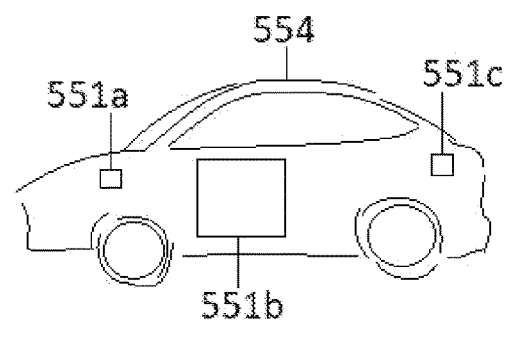
554
551a
551c
551b
FIG. 25
571
564
572
578
FIG. 26
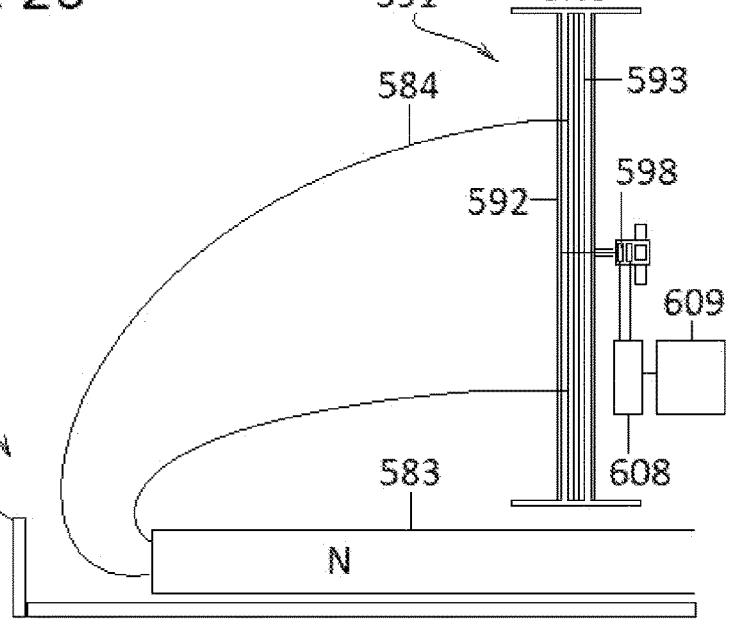
SNS
591
584
593
592
598
609
581
586
583
608
N FIG. 27    FIG. 28    FIG. 29
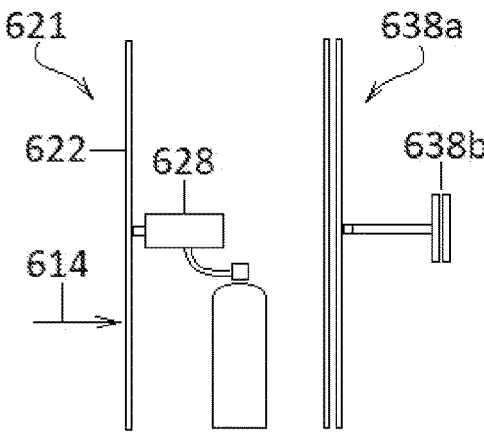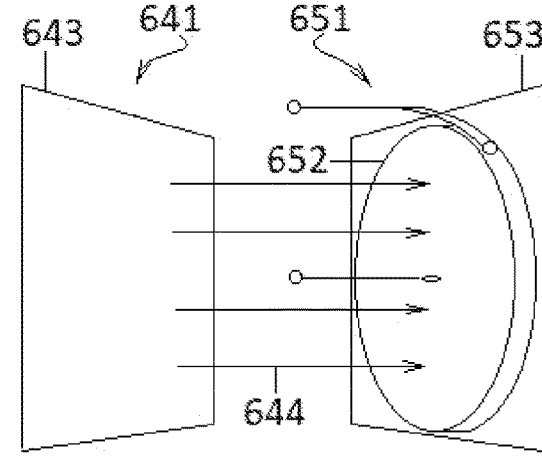
FIG. 30    FIG. 31    FIG. 32
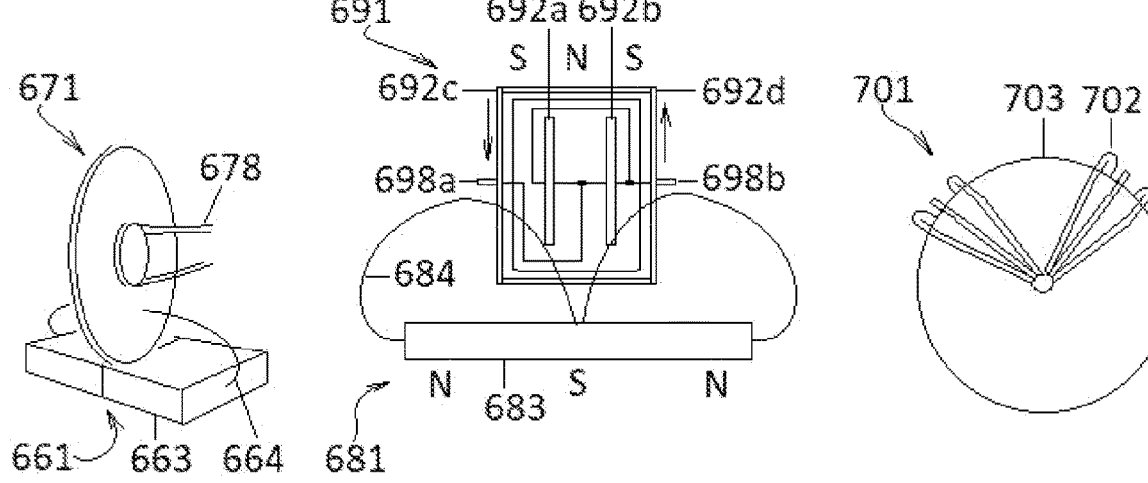
FIG. 33    FIG. 34    FIG. 35a
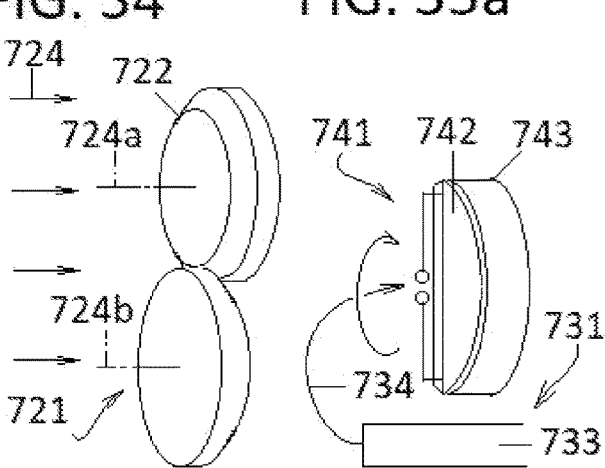

758 754
756
751
762
761     764

771  774
773a
772
773b
773   778

788  784
794
792
781
791     796

813a     814a
824a
803a     804a 834
813b     814b
824b
803b     804b 851
852
853
874     864
843     844
841

882     888a
888b 901     902
903

911     912
913

921

946
944
941
949
933
942
931     934

FIG. 45
FIG. 46
FIG. 47
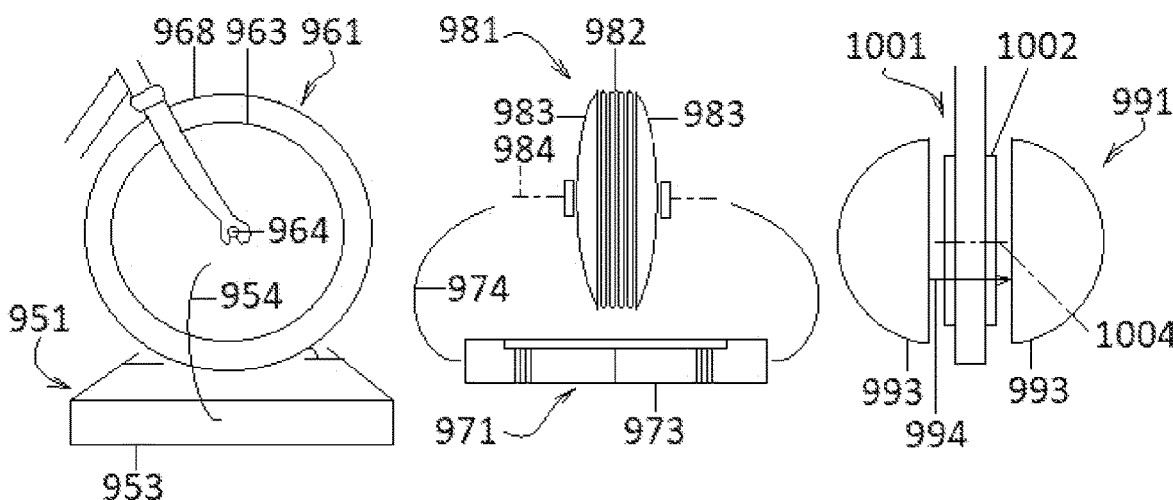
FIG. 48
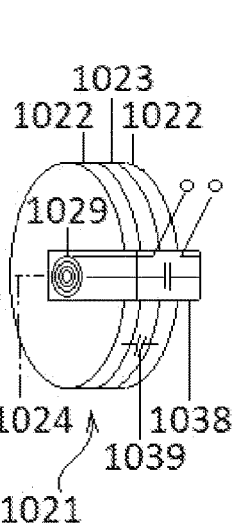
FIG. 49
FIG. 50
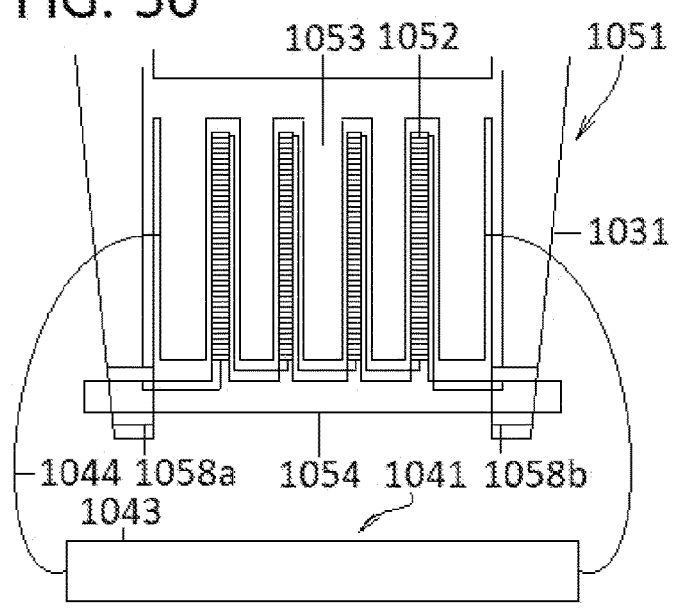
FIG. 51
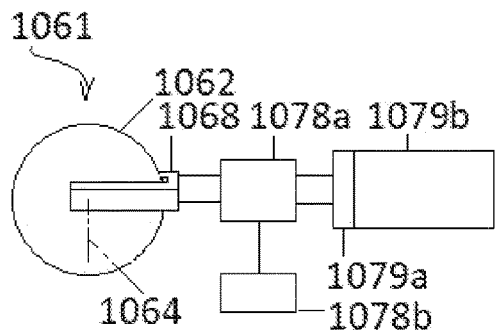
FIG. 52
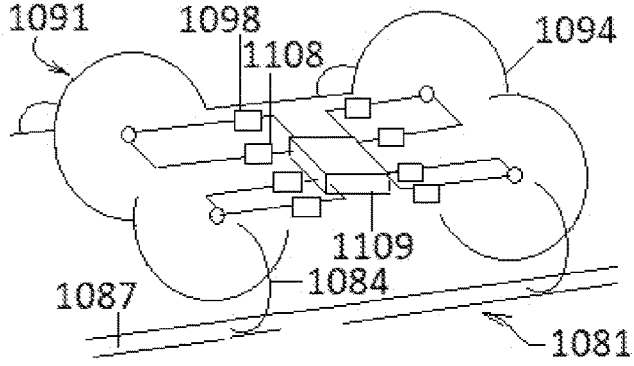

FIG. 63a
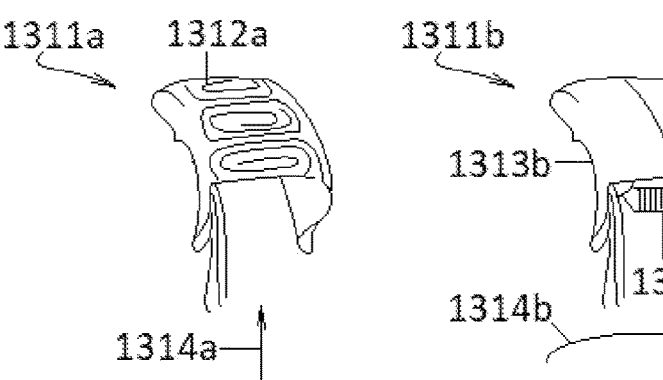
FIG. 63b
FIG. 64
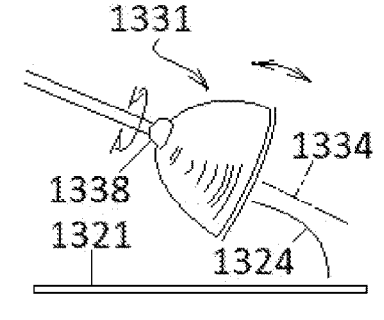
FIG. 65
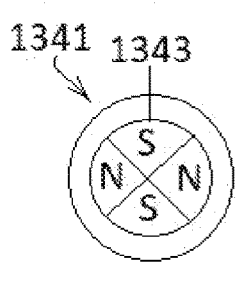
FIG. 66
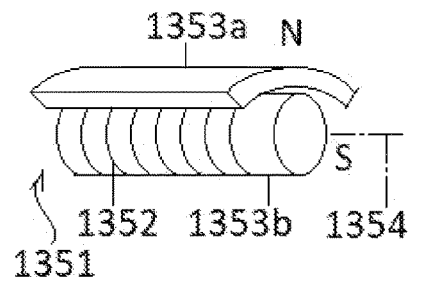
FIG. 67
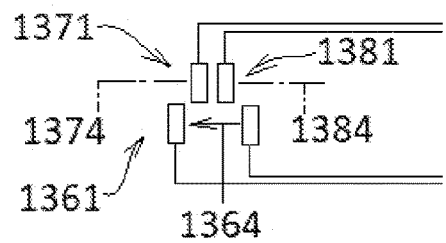
FIG. 68
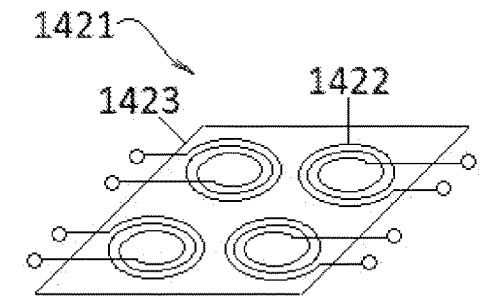
FIG. 69
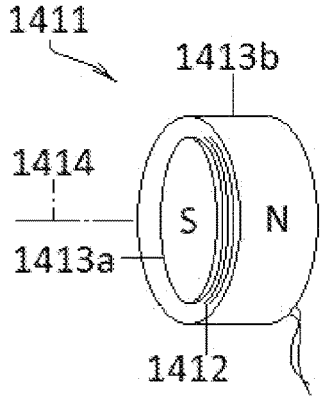
FIG. 70
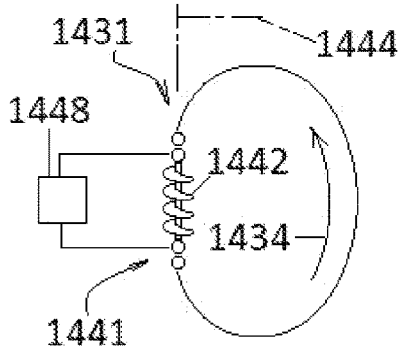
FIG. 71

FIG. 72
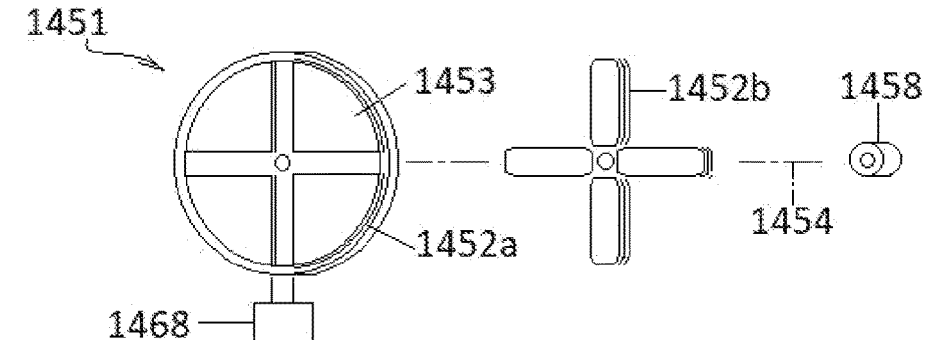
FIG. 73
FIG. 74
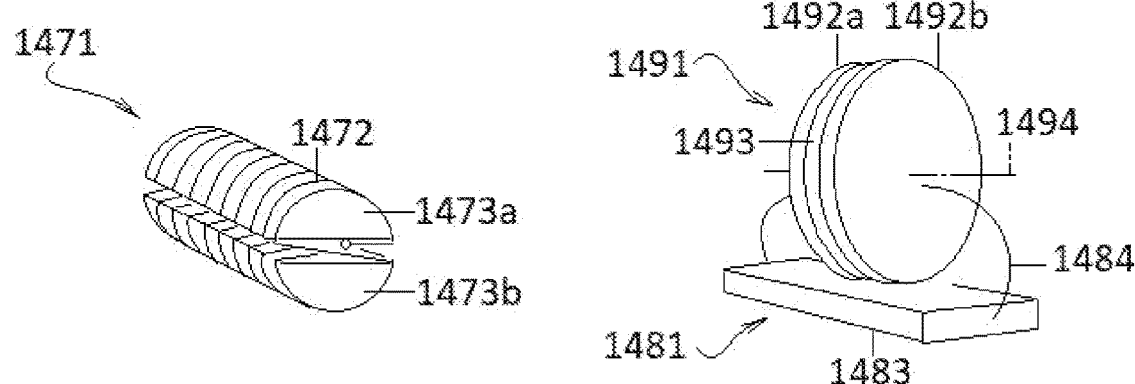
FIG. 75
FIG. 76
FIG. 77
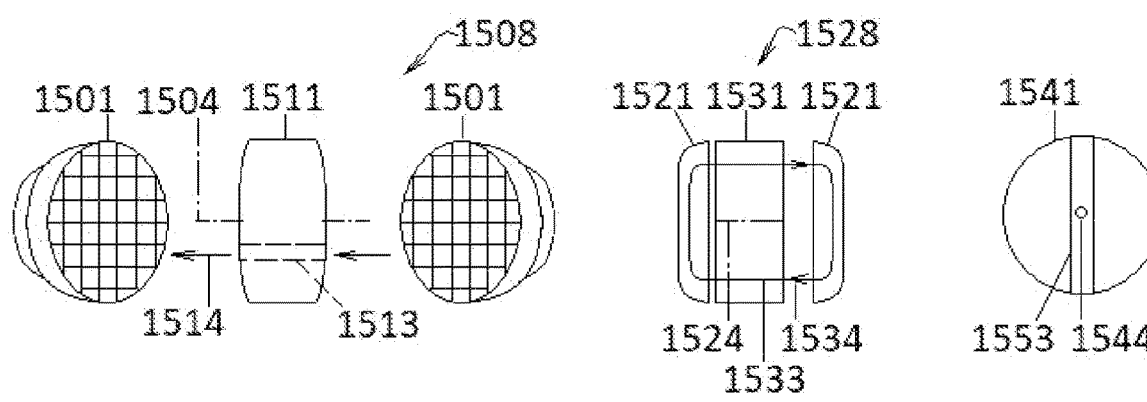
FIG. 78
FIG. 79
FIG. 80
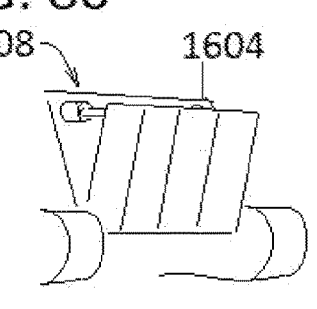

FIND A HOLE — 1701
APPLY A VOLTAGE — 1702
FIND ANOTHER HOLE — 1703
APPLY A VOLTAGE — 1704

REPEAT THE STEPS TILL A SIGNAL — 1705

FIG. 92
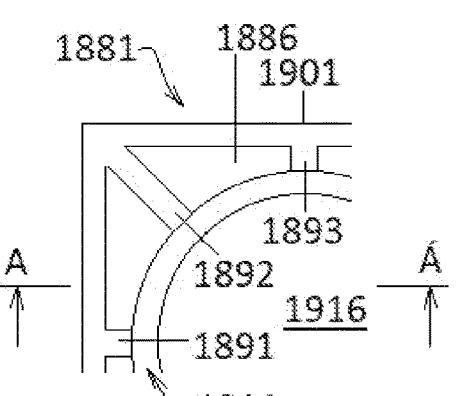
1881 1886
1901
1893
1892
A A
1916
1891
1911
FIG. 93
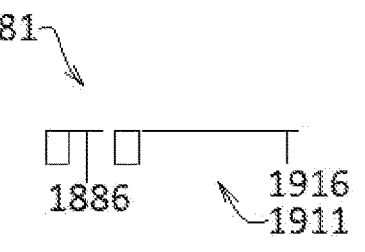
1881
1886 1916
1911
FIG. 94
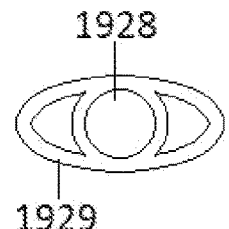
1928
1929
FIG. 95
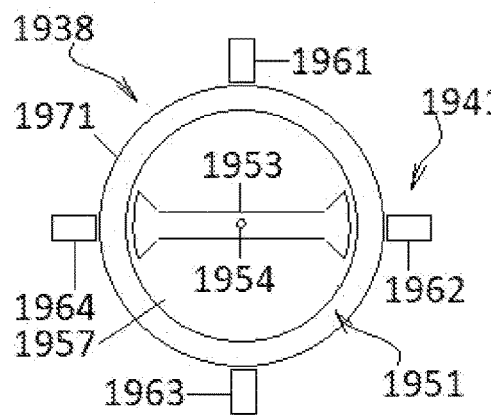
1938
1961
1971 1941
1953
1954
1964
1957 1962
1963 1951
FIG. 96
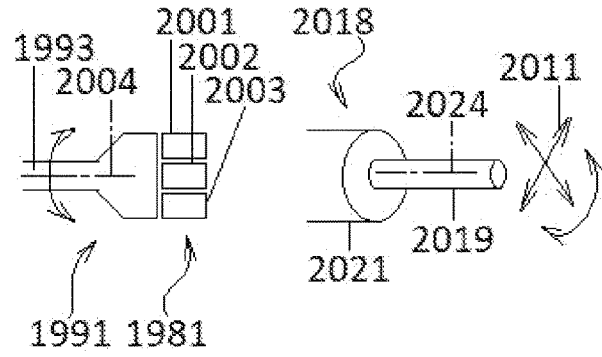
1993 2001
2004 2002
2003
2018
2024 2011
2019
2021
1991 1981
FIG. 97
FIG. 98
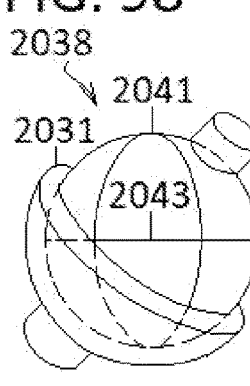
2038
2041
2031
2043
FIG. 99
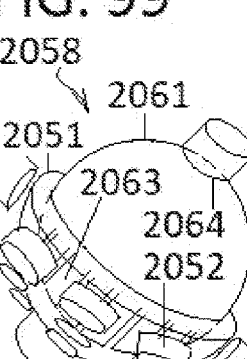
2058
2061
2051
2063
2064
2052
FIG. 100
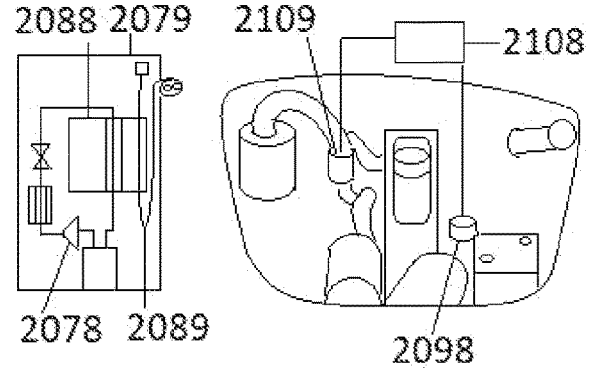
2088 2079
2078 2089
FIG. 101
2109
2108
2098
FIG. 102
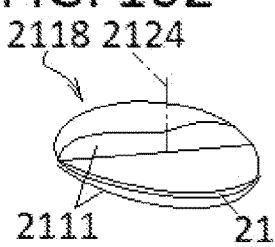
2118 2124
2111 2121
FIG. 103
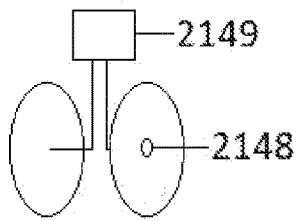
2149
2148
FIG. 104
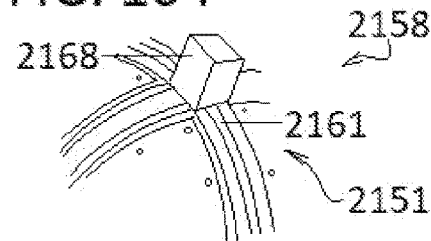
2168 2158
2161
2151

FIG. 122
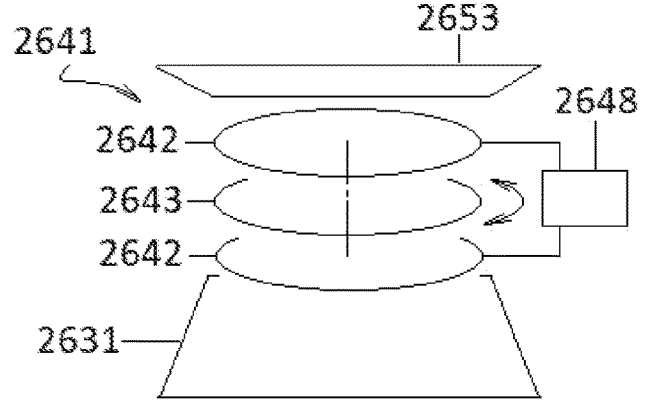
FIG. 123
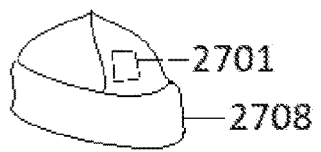
FIG. 124
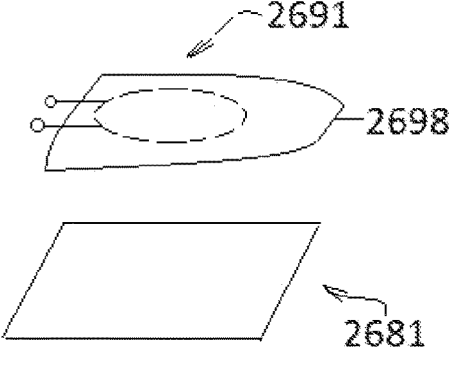
FIG. 125
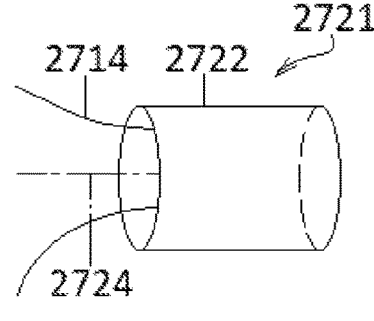
FIG. 126
FIG. 127
FIG. 128
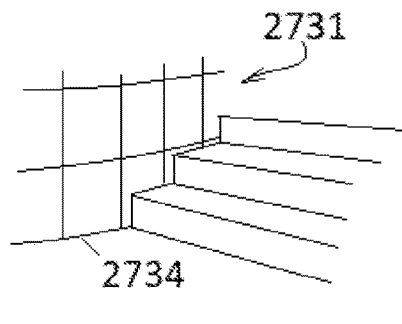
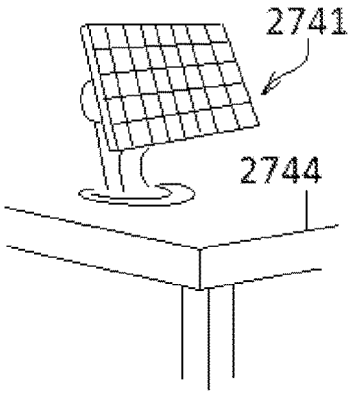
FIG. 129
FIG. 130
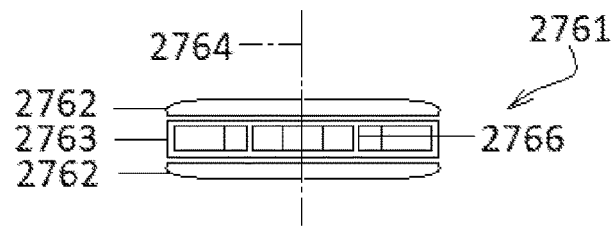

FIG. 137
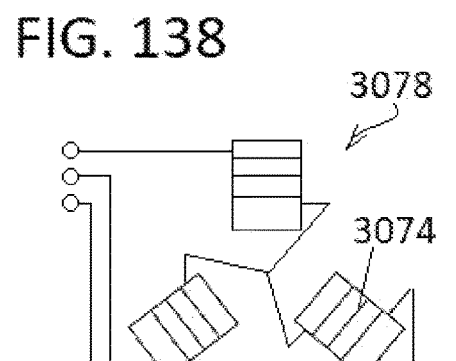
FIG. 138
FIG. 139
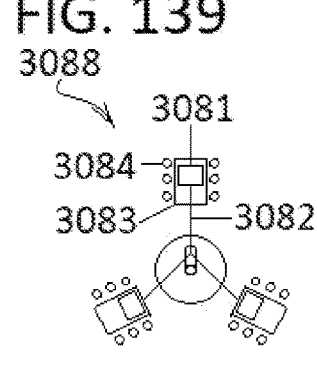
FIG. 140
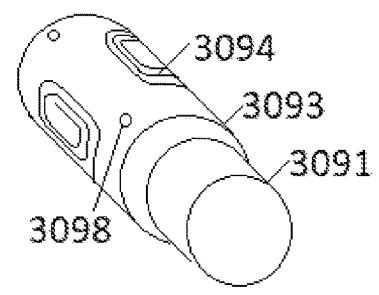
FIG. 141
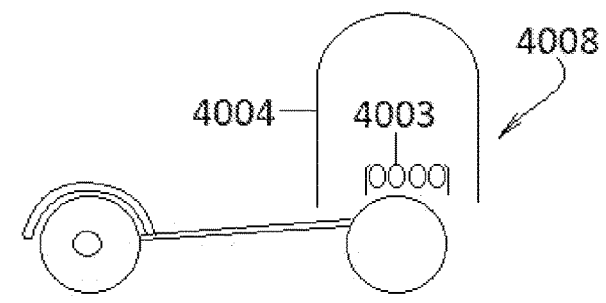
FIG. 142
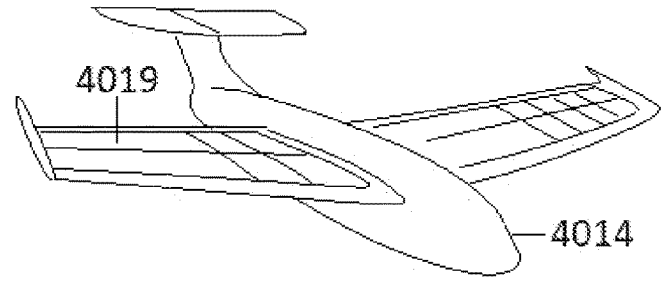
FIG. 143
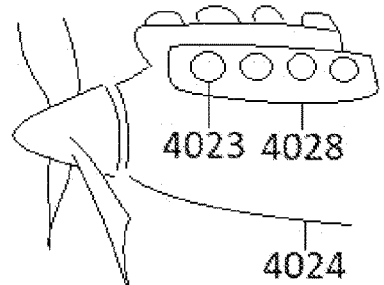
FIG. 144
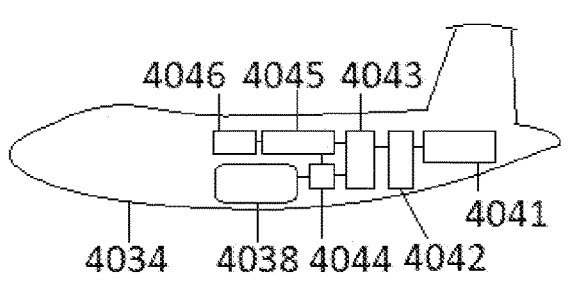
FIG. 145
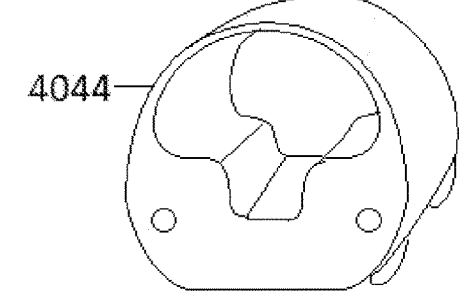

FIG. 146 FIG. 147 FIG. 148
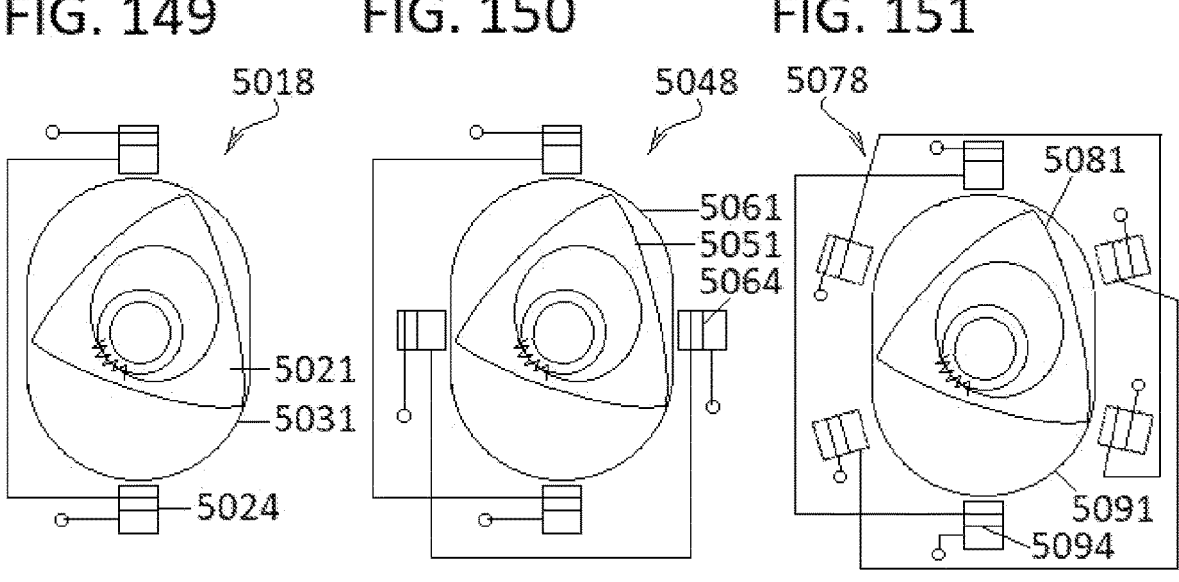
FIG. 149 FIG. 150 FIG. 151
FIG. 152 FIG. 153 FIG. 154
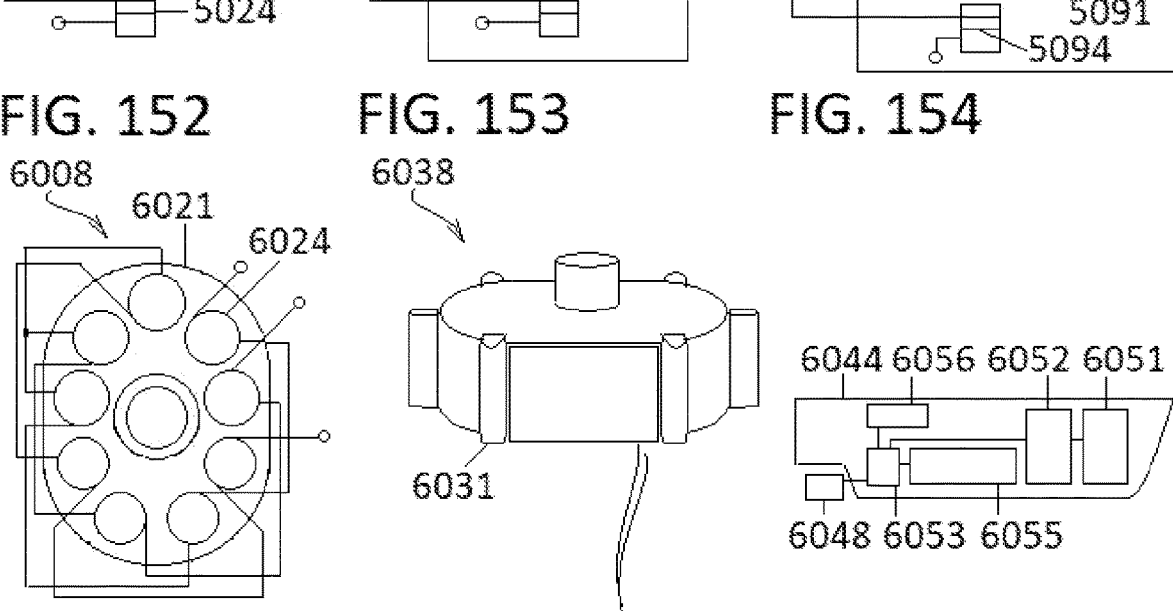

6068

6064

6078

6074   6073

6071

6075     6076

6088

6091

6081

6108

6109

6119

6129

6128

6139

6138

6149

6159
6158

6169   6168

6179

6178

FIG. 167
FIG. 168
FIG. 169
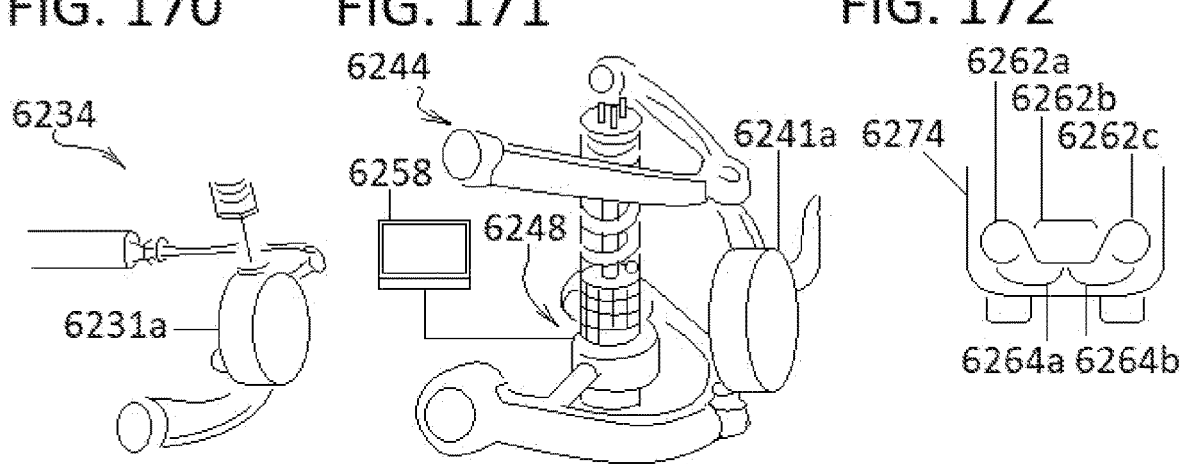
FIG. 170
FIG. 171
FIG. 172
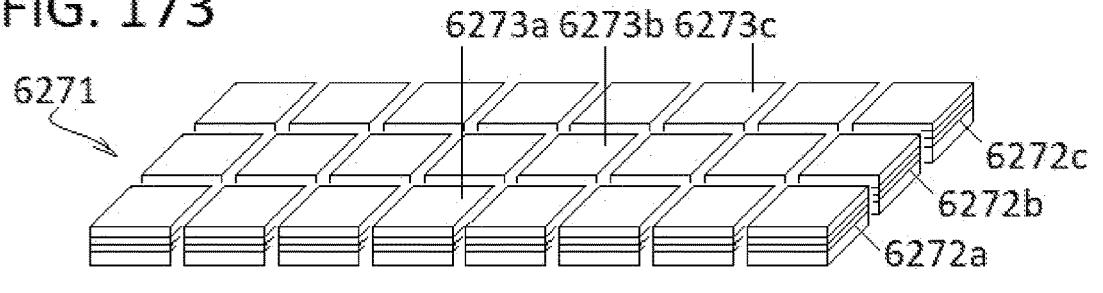
FIG. 173
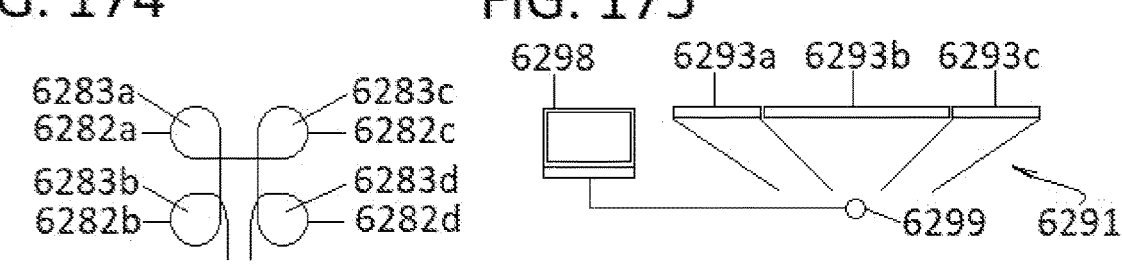
FIG. 174
FIG. 175

FIG. 186
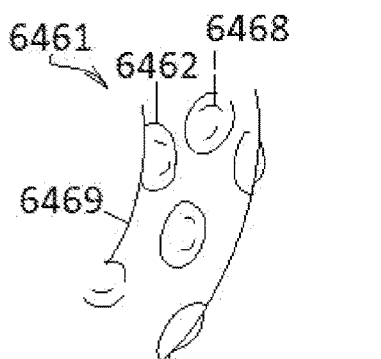
FIG. 187
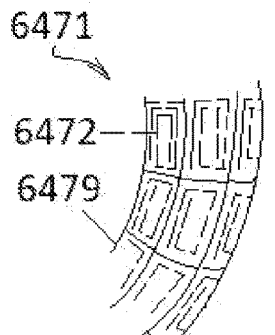
FIG. 188
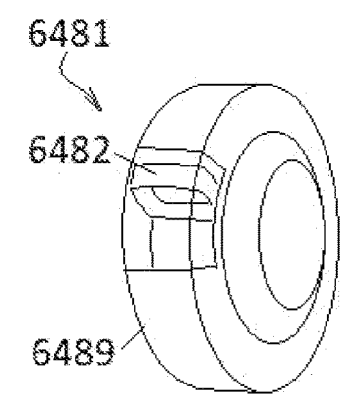
FIG. 189
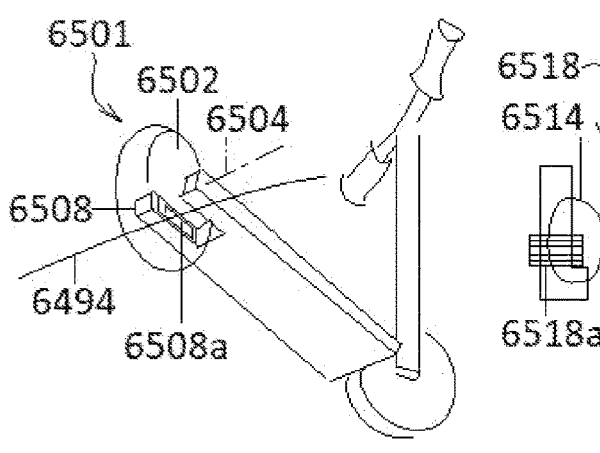
FIG. 190
FIG. 191
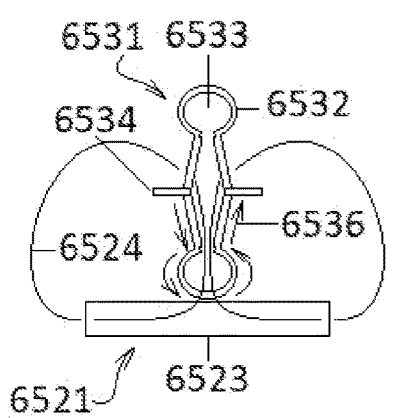
FIG. 192
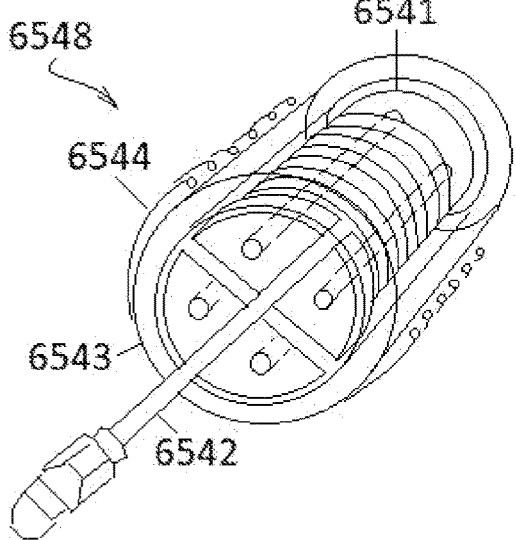
FIG. 193
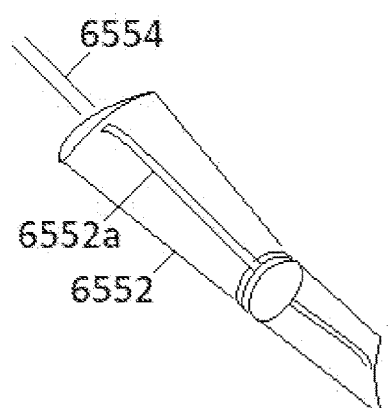

6568

6571

6578

6561

6588

6591

6598

6581

6581a 6581b

6608

6611

6618

6601

6621

6622a

6622b

6622c

6622d

6638

6641

6648

6631

ELECTROMAGNETIC POWER TRANSFER SYSTEM

TECHNICAL FIELD

The invention relates to an electromagnetic power transfer system including a stationary rotational power transfer system, a transverse magnetic field motor, an electric motor driving method and an electric piston engine.

BACKGROUND ART

There is a wide range of wireless energy transfer systems including radiative, nonradiative, resonant, nonresonant, acoustical, optical systems, etc. The wireless power transfer systems are used in electronic, transport, medical devices industries, etc. There is an inductive power transfer using coupling coils, a capacitive power transfer using coupling capacitors, an electrodynamic power transfer using transducers. There is a static and a dynamic charging of vehicles at least partially electrically driven. There are driving methods for electric motors which works with Faraday's law of electromagnetic induction. There are machines (linear or rotative) providing low (and high) reluctance paths (switched or synchronous) which propose a design including first and second portions (a stator and a rotor, an active primary part with windings and a passive secondary part, etc.). Windings can be concentrated in one coil for each phase or partially concentrated. Linear designs can be single sided or double sided. Tubular structures can be provided. The structures can produce thrust or translation force. Windings can provide parallel or perpendicular magnetic field to the movement.

The construction of DC motors with central stators and peripheral rotors is well known in the art, as well as the construction of fiber reinforced light weight rotors with resistance to the high stress forces. See for example Piramoon et al. U.S. Pat. No. 5,505,684 issued Apr. 9, 1996 entitled CENTRIFUGE CONSTRUCTION HAVING CENTRAL STATOR which discloses the centrifuge construction with a centrally located stator directly driving a peripheral ring shaped rotor. The stator has stationary electrical windings for generating a rotating and driving magnetic field. The rotor is supported by at least one bearing relative to the stator and includes a large central aperture defined by the inside of the ring which enables the rotor to fit over and rotate about the stator. At portions of the rotor adjoining the stator, the rotor is constructed from materials which are entrained by the rotating magnetic field. The centrifuge rotor is directly driven from the stator by entrainment of the rotor with the rotating and driving magnetic field generated from the electrical windings of the stator. In the usual case, this large central aperture in the rotor requires the use of composite materials in the rotor to resist radial centrifugal forces generated during centrifugation with hoop stress resistance from wound composite material fibers.

RU2008142786/06A (Oleg Fjodorovic Mensik (RU) 2008 Oct. 28) discloses a commutator-free dc motor including rotor and stator in the form of cylindrical magnetic conductor inside which there are two sections, each consisting of several annular magnetic conductors. The motor comprises two sections with internal and external annular electrodes. Internal rotor can be made of an electromagnet or a permanent magnet.

U.S. Ser. No. 17/668,401 (Kamil Podhola Feb. 15, 2022) co-pending patent application discloses an OUTER TURBINE SYSTEM which proposes a turbine with an axial inflow and a radial/axial outflow wherein turbine blades are disposed at an inner side of an outer rotating envelope, e.g., the turbine blades are oriented from an outer perimeter construction which can be metallic to a center of the turbine.

The documents fail to disclose a stationary-rotational wireless power transfer system with a substantially planar stationary primary electromagnetic interface or with the stationary primary interface forming a cylindrical pathway and a spinning secondary electromagnetic interface. The documents fail to disclose the stationary-rotational wireless power transfer system configured to be an electric motor. The documents fail to disclose a transverse magnetic field motor comprising two relatively spinning adjacent portions providing the transverse magnetic field and including an electrical conductor perpendicular to the transverse magnetic field. The documents fail to disclose an electrical apparatus which can be configured to be an electric motor and/or an electricity generator and having salient magnetic conductors which can be rotor blades. The documents fail to disclose a (parallel or perpendicular) magnetic field driving method for an electric motor with steps of finding a magnetic hole, applying a voltage to a magnetic point, finding another magnetic hole, applying the voltage to another magnetic point and repeating the steps till a signal can be applied. The documents fail to disclose an electric piston engine.

DISCLOSURE OF INVENTION

The object of the present invention is to propose a stationary-rotational wireless power transfer system (SRPS) with a substantially planar stationary primary electromagnetic interface or with the stationary primary interface forming a cylindrical pathway including a primary magnetic conductor and providing a transverse magnetic field and with a secondary electromagnetic interface including a secondary electrical conductor and configured to spin around a spin axis to induce a current in the secondary electrical conductor.

A further object is to propose the SRPS with primary electrically conductive loops.

A further object is to propose the SRPS with the secondary electrical conductor wound around a secondary magnetic conductor with a winding axis perpendicular to the spin axis.

A further object is to propose the SRPS with the secondary electrical conductor perpendicular to the transverse magnetic field.

A further object is to propose the SRPS with a secondary magnetic conductor interacting with the primary magnetic conductor.

A further object is to propose the SRPS with a secondary magnetic conductor providing rotating/radially oriented secondary magnetic field.

A further object is to propose the SRPS with the secondary electromagnetic interface configured to be an electric motor or an electric generator or a motor generator.

A further object is to propose the SRPS with interconnected primary magnetic conductors.

A further object is to propose the SRPS with primary/secondary electrocomponents.

A further object is to propose the SRPS providing wireless data transmission.

A further object is to propose the SRPS further comprising a shielding.

A further object is to propose the SRPS further comprising an insulation.

A further object is to propose the SRPS further comprising a thermal management system.

A further object is to propose the SRPS with the primary interface coupled with an onshore track and the secondary interface coupled with a vehicle.

A further object is to propose the SRPS with the primary interface coupled with a waterway track and the secondary interface coupled with a water vessel.

A further object is to propose the SRPS with sections and connections.

It is another object of the present invention to propose a transverse magnetic field motor with a substantially planar first portion and a second portion mounted to relatively spin around a spin axis and with a transverse magnetic field provided between the first and second portions and with the second portion including an electrical conductor perpendicular to the spin axis.

A further object is to propose the motor with the transverse magnetic field provided from a stationary primary electromagnetic interface and with the motor configured to function as a spinning secondary electromagnetic interface.

It is yet another object of the present invention to propose a magnetic field driving method for an electric motor with steps of finding a magnetic hole, applying a voltage to a magnetic point, finding another magnetic hole, applying the voltage to another magnetic point and the steps can be repeated till a signal.

It is yet another object of the present invention to propose an electric piston engine with a piston coupled with a coupling mean and guided by a guiding mean, wherein the piston is within a cylinder being the guiding mean or wherein the piston is a rotary piston within a Wankel type engine, wherein the guiding mean has at least partially a winding thereon and an electrical current in the winding forces the piston to move along the guiding mean.

In a first aspect the invention discloses a stationary-rotational wireless power transfer system.

In a second aspect the invention discloses a transverse magnetic field motor.

In a third aspect the invention discloses a magnetic field driving method for an electric motor.

In a fourth aspect the invention discloses an electric piston engine.

BRIEF DESCRIPTION OF DRAWINGS

The invention will now be described by way of example. Only essential elements of the invention are schematically shown and not to scale nor in proportions to facilitate immediate understanding, emphasis being placed upon illustrating the principles of the invention.

FIG. 15 is a functional perspective view of a transverse magnetic field motor according to the present invention.

FIG. 16 is a functional perspective view of another embodiment of the transverse magnetic field motor configured to function as a secondary electromagnetic interface.

FIG. 17*a* is a functional perspective view of another embodiment of the transverse magnetic field motor configured to function as a secondary electromagnetic interface and coupled with an electric vehicle system.

FIG. 17*b* is a perspective view of a transverse magnetic field motor coupled with an electric vehicle system.

FIG. 18 is a functional perspective view of another embodiment of a transverse magnetic field motor.

FIG. 19 is a functional perspective view of a transverse magnetic field motor according to the present invention which can be used as a pump and/or an electricity generating turbine.

FIG. 20 is a schematic oblique view of a secondary electromagnetic interface with a secondary electrical conductor oriented perpendicularly to a transverse magnetic field and coupled with an electric bicycle.

FIG. 21 is a schematic of a secondary electromagnetic interface with a secondary electrical conductor oriented perpendicularly to a transverse magnetic field and coupled with a switch.

FIG. 22 is a schematic of another embodiment of a secondary electromagnetic interface with a secondary electrical conductor oriented perpendicularly to a transverse magnetic field and coupled with a switching bank.

FIG. 23 is a functional schematic of another embodiment of a stationary-rotational wireless power transfer system with a secondary electromagnetic interface coupled with secondary electrocomponents.

FIG. 24 is a side view of an electric car with possible emplacements of secondary electromagnetic interfaces according to the present invention.

FIG. 25 is a functional schematic perspective view of a secondary electromagnetic interface with a secondary electrical conductor oriented perpendicularly to a transverse magnetic field coupled with a radial flux type electric motor.

FIG. 26 is a functional schematic cross sectional view of another embodiment of a stationary-rotational wireless power transfer system with a secondary electromagnetic interface coupled with secondary electrocomponents and with a secondary electrical conductor oriented perpendicularly to a transverse magnetic field and with a secondary magnetic conductor interacting with a primary magnetic conductor.

FIG. 27 is a functional schematic side view of a secondary electromagnetic interface with a secondary electrical conductor oriented perpendicularly to a transverse magnetic field and coupled with a pneumatic motor.

FIG. 28 is a schematic side view of a secondary electromagnetic interface coupled with an axial flux type electric motor.

FIG. 29 is a functional schematic perspective view of another embodiment of a stationary-rotational wireless power transfer system with a perpendicularly oriented secondary electrical conductor and an interacting secondary magnetic conductor.

FIG. 30 is a functional schematic perspective view of another embodiment of a stationary-rotational wireless power transfer system with a secondary electromagnetic interface coupled with a (chain) drive system.

FIG. 31 is a functional schematic cross sectional view view of another embodiment of a stationary-rotational wireless power transfer system with a perpendicularly oriented secondary electrical conductor and an interacting secondary magnetic conductor.

FIG. 32 is a schematic frontal view of a secondary electromagnetic interface with a perpendicular secondary electrical conductor and an interacting secondary magnetic conductor.

FIG. 33 is a functional schematic side view of another embodiment of a stationary-rotational wireless power transfer system with a secondary electromagnetic interface coupled with an electric piston engine.

FIG. 34 is a schematic perspective view of a secondary electromagnetic interface which can be configured to be an electric motor with gears as a perpendicular secondary electrical conductor.

FIG. 35*a* is a schematic perspective view of a secondary electromagnetic interface with a perpendicular secondary electrical conductor and an interacting secondary magnetic conductor.

FIG. 45 is a functional schematic side view of another embodiment of a stationary-rotational wireless power transfer system coupled with a track and a wheel.

FIG. 46 is a functional schematic side view of another embodiment of a stationary-rotational wireless power transfer system.

FIG. 47 is a functional schematic cross sectional view of another embodiment of a stationary-rotational wireless power transfer system with an interposed secondary interface.

FIG. 48 is a perspective illustration of a segment of a secondary electromagnetic interface according to the present invention.

FIG. 49 is a perspective illustration of a secondary electromagnetic interface configured to be an electric motor.

FIG. 50 is a functional partial detailed cross sectional view of another embodiment of a stationary-rotational wireless power transfer system.

FIG. 51 is a perspective illustration of a secondary electromagnetic interface configured to be an electric motor and coupled with secondary electrocomponents.

FIG. 52 is a functional schematic perspective view of another embodiment of a stationary-rotational wireless power transfer system coupled with a track and with electric vehicle driving and charging systems.

FIG. 63a is a perspective illustration with a partial cutout of a prior art of a secondary interface with a secondary electromagnetic interface with radially oriented coils.

FIG. 63b is a perspective illustration with a partial cutout of a secondary interface with a secondary electromagnetic interface with axially oriented coils according to the present invention.

FIG. 64 is a functional schematic perspective view of another embodiment of a secondary electromagnetic interface with a secondary electromagnetic interface spinning around a spin axis which can change its orientation.

FIG. 65 is a functional schematic perspective view of another embodiment of a sectionally subdivided primary electromagnetic interface in the proposed stationary-rotational wireless power transfer system.

FIG. 66 is a functional schematic oblique view of a secondary interface in the proposed stationary-rotational wireless power transfer system.

FIG. 67 is a functional cross sectional view of another embodiment of a stationary-rotational wireless power transfer system.

FIG. 68 is a functional schematic oblique exploded view of another embodiment of a stationary-rotational wireless power transfer system with a secondary interface with a perpendicularly oriented secondary electrical conductor coupled with electrocomponents and an interacting secondary magnetic conductor providing a rotating magnetic field and a radially oriented magnetic field.

FIG. 69 is an oblique view of another embodiment of a stationary-rotational wireless power transfer system with a secondary interface with a perpendicularly oriented secondary electrical conductor configurable to be an electric motor in a compact packaging.

FIG. 70 is an oblique view of a primary interface in the proposed stationary-rotational wireless power transfer system.

FIG. 71 is a functional schematic diagram of a stationary-rotational wireless power transfer system according to the present invention.

FIG. 72 is an oblique exploded view of a secondary interface in the proposed stationary-rotational wireless power transfer system which can be configured to be an axial flux motor.

FIG. 73 is an oblique view of a secondary interface in the proposed stationary-rotational wireless power transfer system including secondary electrically conductive loops and longitudinally split secondary magnetic conductors.

FIG. 74 is a functional schematic perspective view of another embodiment of a stationary-rotational wireless power transfer system with parallel secondary electrically conductive discs.

FIG. 75 is a functional schematic perspective exploded view of an electric motor operable by the proposed method.

FIG. 76 is a functional schematic cross sectional view of another embodiment of an electric motor operable by the proposed method.

FIG. 77 is a frontal view of a second portion of an electric motor operable by the proposed method.

FIG. 78 is a perspective view of another embodiment of a first portion an electric motor operable by the proposed method.

FIG. 79 is a perspective illustration of another embodiment of an electric motor operable by the proposed method, the motor coupled with an offshore vessel.

FIG. 80 is a perspective illustration of another embodiment of an electric motor operable by the proposed method, the motor coupled with an onshore vehicle.

FIG. 92 is a schematic partial plan view of another embodiment of an electric motor providing a magnetic return path and operable by the proposed method.

FIG. 93 is a cross sectional view of the electric motor shown in FIG. 92.

FIG. 94 is a plan view of an electric motor operable by the proposed method and coupled with a directional antenna system.

FIG. 95 is a schematic plan view of another embodiment of an electric motor with a magnetic field guide and operable by the proposed method FIG. 96 is a schematic detailed plan view of another embodiment of an electric motor operable by the proposed method with a second portion spinning and rotating around two axes.

FIG. 97 is a functional schematic perspective view of another embodiment of an electric motor operable by the proposed method and spinning and moving an actuator in a plurality of directions.

FIG. 98 is a schematic perspective view of another embodiment of an electric motor operable by the proposed method and forming a freedom spherical joint electric motor.

FIG. 99 is a schematic perspective view of another embodiment of an electric motor operable by the proposed method and forming a homokinetic joint electric motor.

FIG. 100 is a schematic side view of another embodiment of an electric motor operable by the proposed method and provided in a charging station cooling system.

FIG. 101 is a schematic perspective illustration of another embodiment of an electric motor operable by the proposed method and provided in a motor car fuel supply system.

FIG. 102 is a schematic perspective view of another embodiment of an electric motor providing transverse and longitudinal magnetic fields.

FIG. 103 is a schematic oblique view of another embodiment of electric in-wheel motors operable by the proposed method.

FIG. 104 is a partial perspective illustration of another embodiment of an electric motor operable by the proposed method and comprising a second portion spinning around multiple spin axes.

FIG. 114 is a perspective view of a second portion providing 3D modelled magnetic holes according to the present invention.

FIG. 115 is a partial perspective exploded view of another embodiment of an electric motor operable by the proposed method and comprising 3D modelled magnetic holes and driving a propeller and providing wireless power transfer under water.

FIG. 116 is a functional schematic cross sectional view of another embodiment of an electric motor operable by the proposed method and coupled with a propeller.

FIG. 117 is a functional schematic cross sectional view of another embodiment of an electric motor operable by the proposed method with a different configuration of active magnetic points and coupled with a propeller.

FIG. 118 is a functional schematic cross sectional view of another embodiment of an electric motor operable by the proposed method with a different configuration of a magnetic hole and coupled with a propeller.

FIG. 119 is a functional schematic cross sectional view of another embodiment of an electric motor operable by the proposed method with still a different configuration of magnetic boles and active magnetic points and coupled with a propeller.

FIG. 120 is a functional schematic oblique view of a first portion of an electric motor operable by the proposed method with magnetic points functionally divided into groups.

FIG. 121 is a schematic perspective illustration of an embodiment of a stationary-rotational wireless power transfer system with a central spinning secondary magnetic conductor and peripheral non-rotating secondary electrical conductors.

FIG. 122 is a schematic perspective illustration of an embodiment of a stationary-rotational wireless power transfer system with a central spinning secondary magnetic conductor and peripheral non-rotating secondary electrical conductors and with another static secondary magnetic conductor/shielding.

FIG. 121 is a schematic perspective illustration of an embodiment of a stationary-rotational wireless power transfer system with a central spinning secondary magnetic conductor and peripheral non-rotating secondary electrical conductors, the system coupled with a track or waterway track and with a vehicle or water vessel, respective.

FIG. 124 is a schematic perspective illustration of an embodiment of a stationary-rotational wireless power transfer system coupled with a tarmac and an airplane wing.

FIG. 125 is a schematic perspective illustration of another embodiment of a stationary-rotational wireless power transfer system with a secondary electromagnetic interface coupled with a piece of clothing.

FIG. 126 is a functional schematic oblique view of an embodiment of a stationary-rotational wireless power transfer system with a cylindrical secondary electrical conductor.

FIG. 127 is a perspective illustration of an embodiment of a stationary-rotational wireless power transfer system with a primary electromagnetic interface provided at a building construction.

FIG. 128 is a perspective illustration of an embodiment of a stationary-rotational wireless power transfer system with a primary electromagnetic interface provided at another supporting construction.

FIG. 129 is a schematic perspective view of an air/liquid turbine with a shaft configured to provide for or to be coupled with a spin axis of a secondary electromagnetic interface.

FIG. 130 is a schematic perspective illustration of another embodiment of an embodiment of a stationary-rotational wireless power transfer system with a secondary electromagnetic interface provided with a thermal management system.

Figure 131:
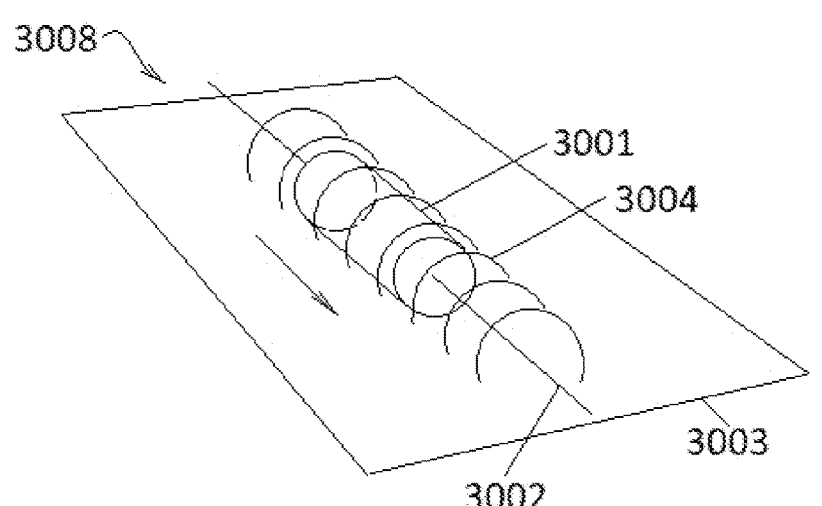

FIG. 131 is a functional schematic perspective illustration of an electric piston engine.

Figure 132:
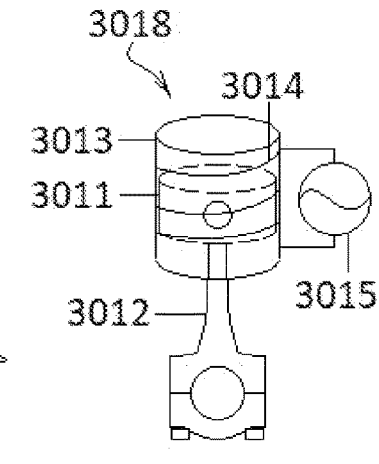

FIG. 132 is a functional schematic perspective illustration of another embodiment of an electric piston engine.

Figure 133:
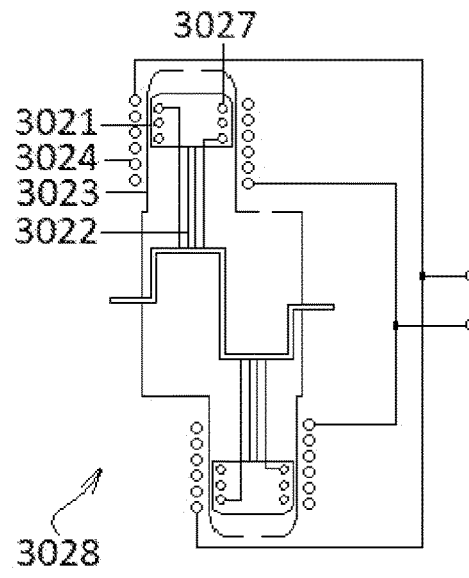

FIG. 133 is a functional schematic cross sectional view of a flat twin electric piston engine.

Figure 134:
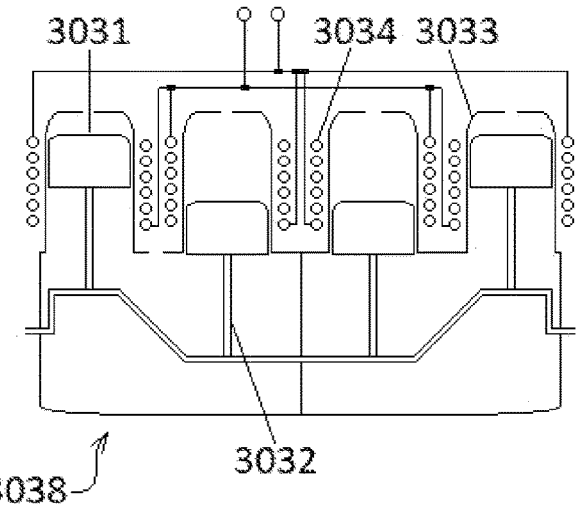

FIG. 134 is a functional schematic cross sectional view of a straight-4 electric piston engine.

Figure 135:
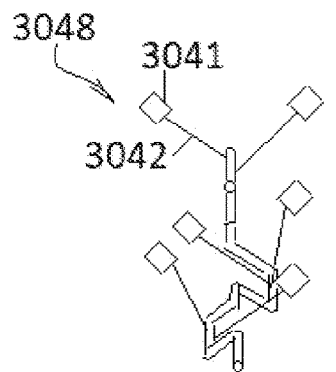

FIG. 135 is an isometric diagram of a V6 electric piston engine.

Figure 136:
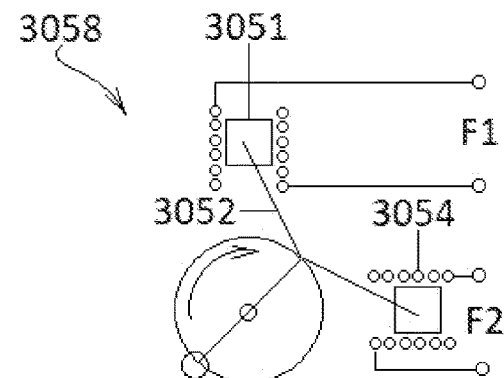

FIG. 136 is a diagram of a 90° twin electric piston engine.

FIG. 137 is a diagram of a single-phase 4 cylinder electric piston radial engine.

FIG. 138 is a diagram of a three-phase 3 cylinder electric piston radial engine.

FIG. 139 is a diagram of a 3 cylinder electric piston rotary engine.

FIG. 140 is an oblique view of a cylinder with radially oriented windings and a piston in the proposed electric piston engine including sensors.

FIG. 141 is a diagram of an electric piston engine coupled to drive a vehicle.

FIG. 142 is a perspective illustration of another application of an electric piston engine coupled to drive an aerial vehicle including solar panels.

FIG. 143 is a perspective illustration of another application of a V8 electric piston engine coupled to drive an aircraft including a rechargeable power source.

FIG. 144 is a diagram of another application of an electric piston engine coupled to drive an aircraft including a hydrogen fuel cell system.

FIG. 145 is a perspective illustration of another application of an electric piston engine coupled to drive a passenger vehicle.

FIG. 146 is a perspective illustration of an electric piston flat twin engine monoblock.

FIG. 147 is a functional schematic plan view of an electric rotating piston engine.

FIG. 148 is a time sequence scheme illustrating the stages of typical magnetic forces provided in the proposed electric rotating piston engine during a half-turn of a piston.

FIG. 149 is a functional schematic plan view of a radial flux single-phase electric rotating piston engine.

FIG. 150 is a functional schematic plan view of a radial flux two-phase electric rotating piston engine.

FIG. 151 is a functional schematic plan view of a radial flux three-phase electric rotating piston engine.

FIG. 152 is a functional schematic plan view of an axial flux three-phase electric rotating piston engine.

FIG. 153 is an oblique view of an electric rotating piston engine in a compact packaging.

FIG. 154 is a diagram of another application of an electric rotating piston engine coupled to drive a hydrogen powered water vessel.

Figure 155:
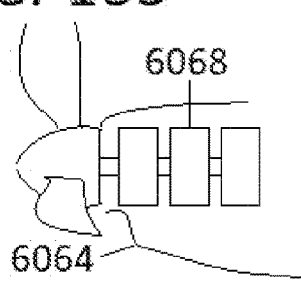

FIG. 155 is a diagram of another application of an electric rotating piston engine coupled to drive an aircraft.

Figure 156:
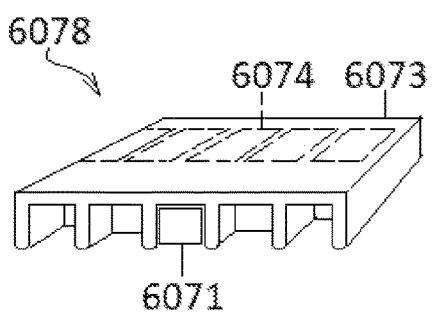

FIG. 156 is a schematic perspective illustration of an electric piston engine according to the present invention.

Figure 157:
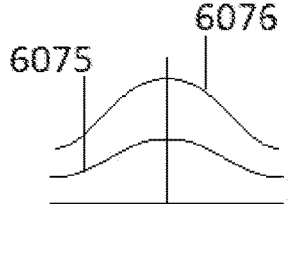

FIG. 157 is a schematic diagram of a driving wavefront to the embodiment shown in FIG. 156.

Figure 158:
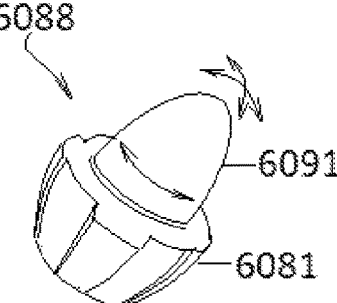

FIG. 158 is a perspective illustration of a spherical joint electric motor according to the present invention provided in a compact packaging.

Figure 159:
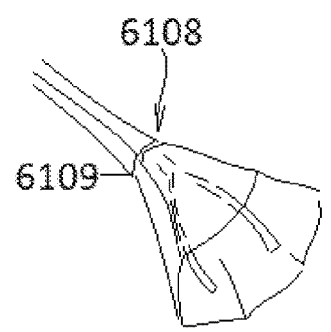

FIG. 159 is an application example of a spherical joint electric motor driving a (swivel head) mixer.

Figure 160:

FIG. 160 is an application example of a spherical joint electric motor driving a robotic cat.

Figure 161:
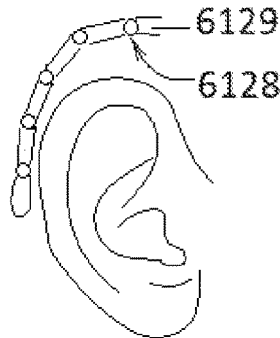

FIG. 161 is an application example of a spherical joint electric motor driving an adaptable car apparatus.

Figure 162:
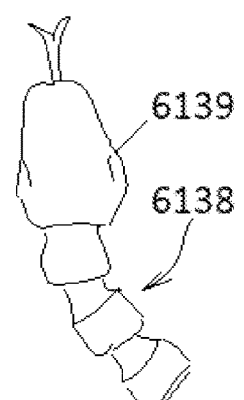

FIG. 162 is an application example of a spherical joint electric motor driving an adaptable robotic snake.

Figure 163:
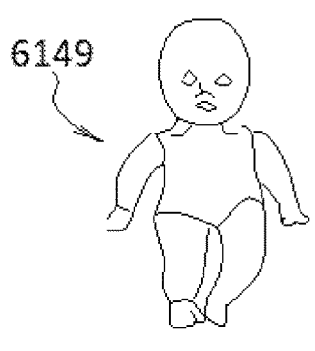

FIG. 163 is an application example of a spherical joint electric motor driving a doll or human body and limbs.

Figure 164:
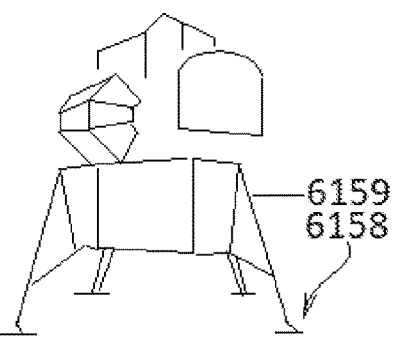

FIG. 164 is an application example of a spherical joint electric motor coupled to an adaptable landing gear.

Figure 165:
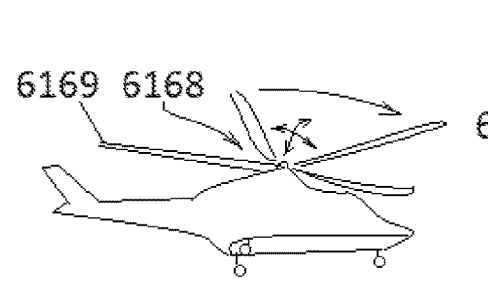

FIG. 165 is an application example of a spherical joint electric motor coupled to a rotorcraft.

Figure 166:
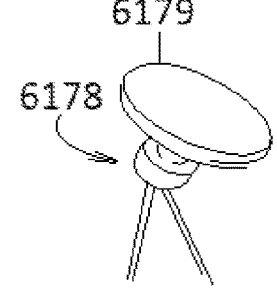

FIG. 166 is an application example of a spherical joint electric motor coupled to an antenna system.

FIGS. 167 and 168 are a functional perspective illustration and a schematic detailed functional perspective illustration of another embodiment of a stationary-rotational wireless power transfer system configured to be an in-wheel motor operable by the proposed method.

FIG. 169 is a schematic exploded perspective view of a sandwiched secondary electromagnetically conductor.

FIG. 170 is a detailed perspective illustration of a first portion of the proposed in-wheel motor coupled with a steering and suspension system of an electric vehicle.

FIG. 171 is a detailed perspective illustration of a first portion of the proposed in-wheel motor and of an electric motor operable by the proposed method and provided in an active/semi-active suspension system.

FIG. 172 is a schematic winding diagram of primary conductive loops in a stationary-rotational wireless power transfer system providing a possibility of a combined inductive power transfer according to a previous art and a transverse magnetic field power transfer according to the present invention.

FIG. 173 is an oblique view of a stationary primary electromagnetic interface in a stationary-rotational wireless power transfer system.

FIG. 174 is a schematic winding diagram of primary conductive loops of a stationary primary electromagnetic interface in a stationary-rotational wireless power transfer system.

FIG. 175 is a functional schematic perspective illustration of a stationary primary electromagnetic interface in a stationary-rotational wireless power transfer system.

Figures 176A, 176B, 177, 178, 179, 180, 181, 182, 183, 184, 185:
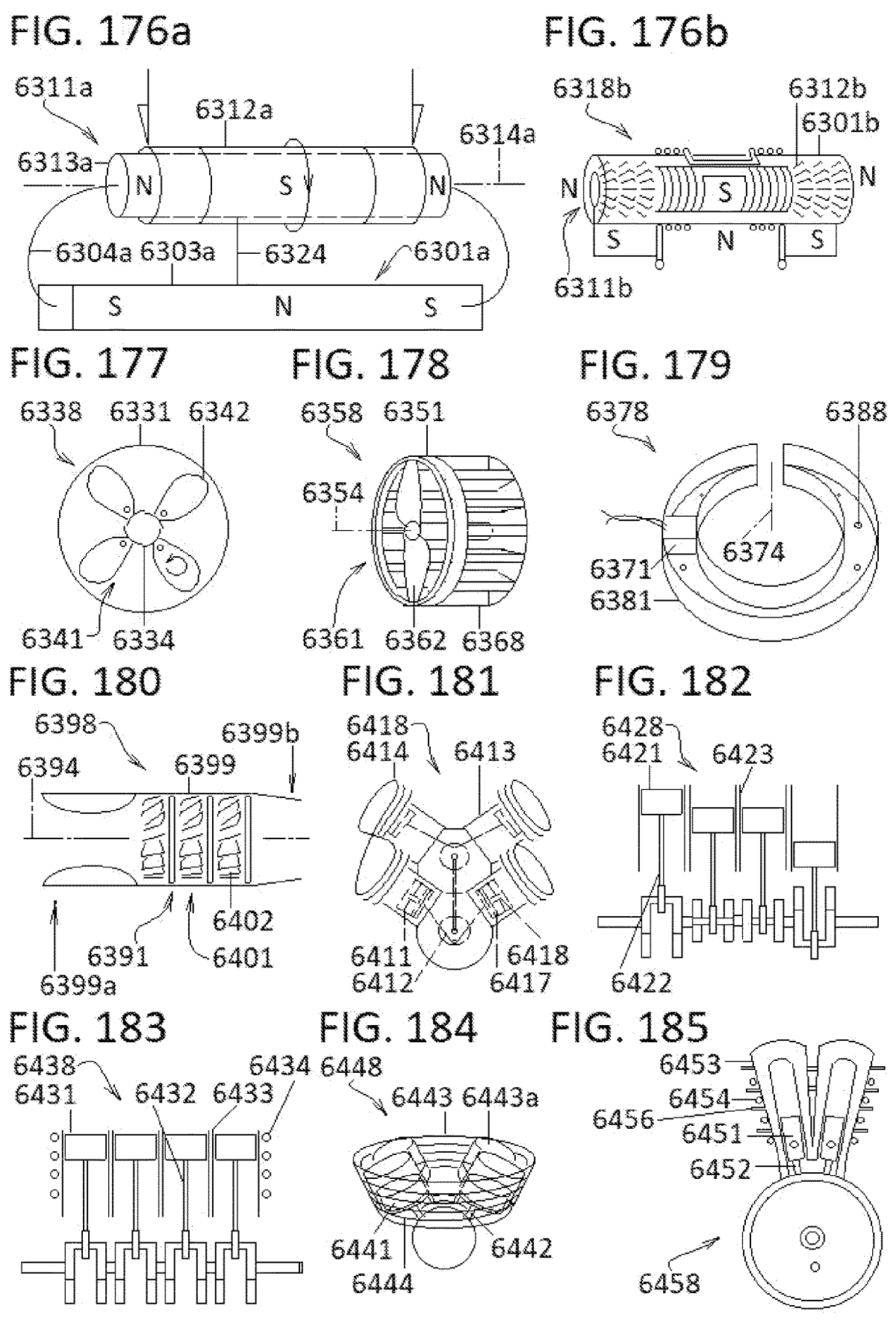

FIG. 176*a* is a functional schematic oblique view of another embodiment of a stationary-rotational wireless power transfer system with a spinning drum conductor.

FIG. 176*b* is a functional schematic oblique view of a transverse magnetic field motor with electrically conductive radial blades.

FIG. 177 is a frontal view of a transverse magnetic field motor with electrically conductive radial fan blades.

FIG. 178 is a perspective view of a transverse magnetic field motor with electrically conductive radial fan blades and with axial fan blades.

FIG. 179 is a schematic perspective view of an electric motor operable by the proposed method and including position sensors.

FIG. 180 is a schematic cross sectional view of a transverse magnetic field motor provided in an electric aircraft gas turbine.

FIG. 181 is a schematic isometric view of a V four electric piston engine.

FIG. 182 is a schematic cross sectional view of a straight-four electric piston engine with a crankshaft differently shaped from that of an IC engine.

FIG. 183 is a schematic cross sectional view of a straight-four electric piston engine with an in-line crankshaft.

FIG. 184 is a schematic perspective view of a V-four electric piston engine having a cylinder block with a common winding.

FIG. 185 is a schematic cross sectional view of an electric piston engine (6458) [which can be a narrow V engine with a common winding.

FIG. 186 is a perspective front three-quarter view of a secondary electromagnetic interface provided in a tire with switchable coils.

FIG. 187 is a perspective front three-quarter view of another embodiment of a secondary electromagnetic interface provided in a tire with radially and axially oriented coils.

FIG. 188 is a perspective front three-quarter view with a partial cutout of another embodiment of of a secondary electromagnetic interface provided in a tire with tangentially oriented coils.

FIG. 189 is a perspective illustration of a secondary electromagnetic interface configured to be an electric motor driving an electric scooter.

FIG. 190 is a plan view of an electromagnetic axle to be provide in a secondary electromagnetic interface according to the present invention.

FIG. 191 is a functional schematic cross sectional view of another embodiment of a stationary-rotational wireless power transfer system with a secondary electromagnetic interface provided in a wheel disc with a tire.

FIG. 192 is schematic perspective illustration with a partial cutout of an electric piston engine comprising a laminated piston.

FIG. 193 is a perspective illustration of an electrically conductive blade with a return conductive path for the induced electrical current.

Figure 194:
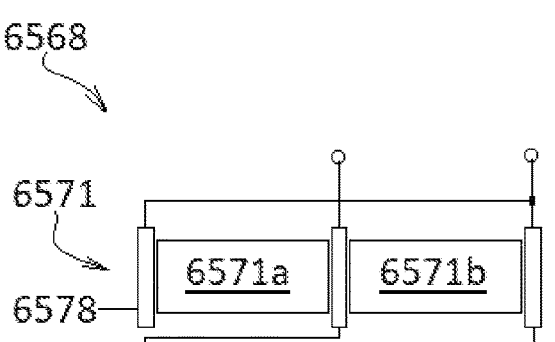

FIG. 194 is a schematic winding diagram of a transverse magnetic field motor with a two-zone rotor including salient electrical conductors.

Figure 195:
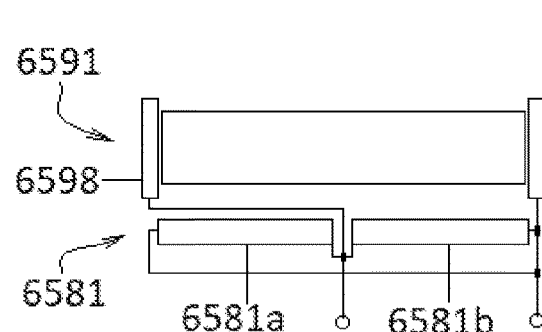

FIG. 195 is a schematic winding diagram of a transverse magnetic field motor with a two-zone stator and a rotor including salient electrical conductors.

Figure 196:
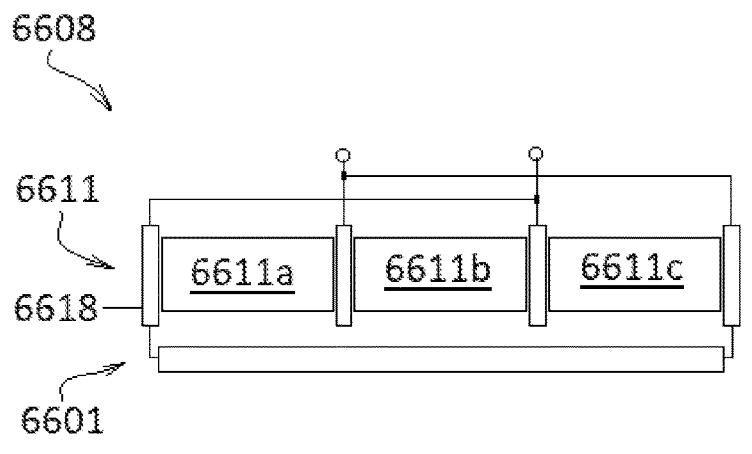

FIG. 196 is a schematic winding diagram of a transverse magnetic field motor with a three-zone rotor including salient electrical conductors.

Figure 197:
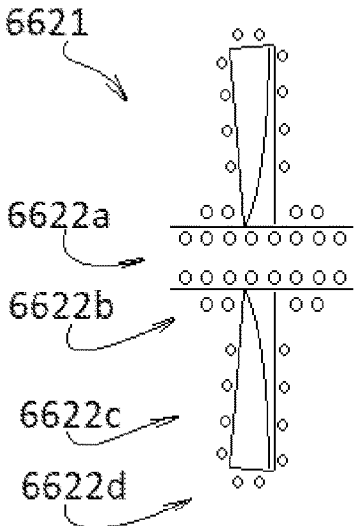

FIG. 197 is a schematic partial cross sectional view of a deployment of electrical conductors around a rotor which can be used in a second portion of a transverse magnetic field motor.

Figure 198:
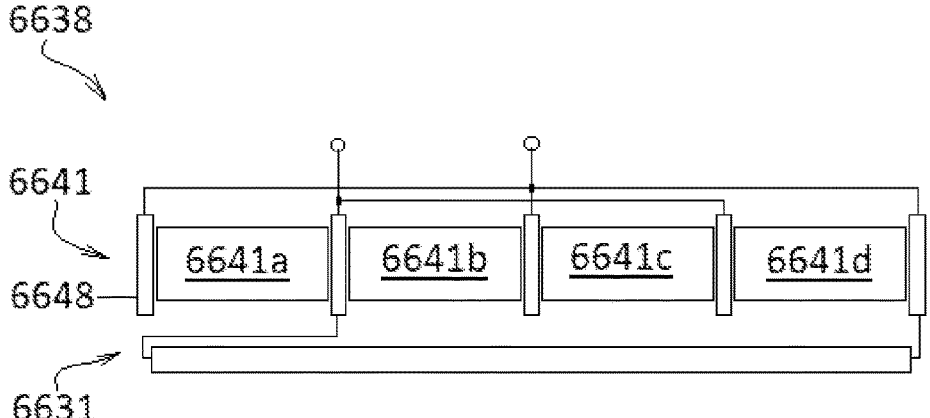

FIG. 198 is a schematic winding diagram of a transverse magnetic field motor with a four-zone rotor including salient electrical conductors.

BEST MODE FOR CARRYING OUT THE INVENTION

The following detailed description shows the best contemplated modes of exemplary embodiments. The description is made for the purpose of illustrating the general principles of the invention, and in such a detail that a skilled person in the art can recognise the advantages of the invention, and can be able to make and use the invention. The objects and advantages of this invention may be realized and obtained as pointed out in the appended claims. Additional advantages may be learned by practice of the invention. The detailed description is not intended to limit the principle of the presented invention, but only to show the possibilities of it and to explain the meaning and the sense of the terms used in the appended claims. The description and the detailed description are exemplary and explanatory only. Schematic cross sectional views are not cross-hatched for clarity. Symbols as used in figures have only symbolic meaning (e.g. others than shown types of mechanocomponents, electrocomponents can be used, etc.). Shown circuits, mechanical structures, etc. are simplified and explanatory only and can be altered, developed or provided in a different way with a same or similar or analogical functionality. Shown embodiments and their components are only partly oriented for illustrative purposes (e.g. poles of magnetic conductors, directions of electrical currents or magnetic fields, overall orientation of embodiments, etc.) and can be provided in different positions, orientations, etc. Magnetic fluxes are simplified, shown polarities and field or current directions can be temporary, etc. Features, integers, components of embodiments of the invention as shown in the figures and related parts of the description can be combined, provided in other embodiments (shown or not shown) of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in a diagram form in order to avoid unnecessarily obscuring various exemplary embodiments.

In the accompanying figures, the size and relative sizes of layers and/or regions may be exaggerated for clarity and descriptive purposes. Also, like reference numerals denote (if possible) like elements.

Since there are more embodiments of the invention shown in the drawings, no reference numerals has been introduced into the claims for clarity purposes.

The terms used in the claims and the specifications shall refer to their synonyms as well.

As used in the claims and the specification, the term "power transfer" shall preferably not exclusively refer to transferring energy to do work, to store energy but also to transfer data, to provide communication, etc.

As used in the claims and the specification, the term "magnetic conductor" shall refer to any type, size, fabrication method. It can have any shape [e.g. pads, bars, plates, panels, slabs, blocks, striated blocks, sheets, segments, 3D or 2D modelled shapes, hollow volumes, cores/e.g. circular, circular straited, square, rectangular, T-core, U-core, E-core, Double U, etc.] it can be formed from smaller pieces, particles of a magnetic material, which can be alternatively comprised in a material with different magnetic permeability or a nonmagnetic material, it can be a magnetically permeable substrate or a magnetically permeable film on a substrate, magnetically permeable printed circuit board [e.g. a glass-reinforced composite epoxy laminate material/such as FR-4/with relative magnetic permeability higher than 1/e.g. containing magnetic (nano) particles, powders, etc.]. The term shall refer to (highly) magnetic permeable material, magnetic material, material with the lower reluctance path, soft magnetic material, gyroresonant magnetic material, and the like.

As used in the claims and the specification, the term "electrical conductor", "winding" shall refer to any material, type, size, shape, cross-section, shall refer to conductors with functional openings [e.g. providing tuning possibilities], and to mutually oriented [e.g. in pairs] conductors, shall also refer to conductors with low proximity losses, nanostructures and which may be formed by any technique including crystal and structure growth techniques. The conductors may be of good conductor materials, high conductivity materials, etc. The conductors may be covered with a material with high electrical conductivity as radio frequency (RF) current with RF energy flows mostly around the surface of the conductor. The conductors may be wires, tressed wires, stranded wires, fibers, sheets, plates, bands, tubes, hollow (cavity) profiles, shaped profiles, rods, strips, microstrips, striplines, lines, ribbons, gels, inks, paints, traces [which can have a various cross section, aspect ratio and which can form stranded traces], printed circuit boards, nanostructures, etc. or may have any form of a conductive path. A cross-section of full profiles, hollow profiles, shaped profiles may have any form [e.g. circular, oval, squared, irregular, geometrical shapes, polygonal, etc.]. The conductors may be of copper wire, copper tubing, etc., may be optically transparent. The conductors may have coupling nodes, feed points [which can be represented by tabs, extensions, etc.], which may be positioned in any position [e.g. in a center of the length, at the ends, etc.], coupling ports which can be coupled with a port parameter measurement circuitry which can measure scattering, impedance, admittance, chain, cascade, transmission, parameters, etc. The port parameter measurement circuitry may be coupled with a processor in a control system e.g. to adjust a pulse width modulator, a power amplifier, an inverter, an adjustable impedance circuitry, etc. The conductors may be oriented substantially parallel or perpendicular to a coupling surface, or in any other direction. The conductors may form various paths [e.g. direct parallel, meandering, loops, etc.]. The term may also refer to semiconductors, semiconductor layers and may refer to gallium arsenide, indium arsenide, indium phosphide, indium antimonide, graphene, silicon, germanium, combinations, and the like.

As used in the claims and the specification the terms "primary", "secondary"-primary elements may be in general coupled with an energy supply and secondary with an energy consumption.

As used in the claims and the specification the term "spin axis" shall preferably refer to a spin axis substantially parallel with a coupling surface of the primary electromagnetic interface.

Permanent magnet as a magnetic conductor shall refer to flexible, non-flexible magnets, rare earth alloys magnets (e.g. neodymium iron boron, samarium cobalt, etc.), alnico, ferrite magnets, etc., shall refer to aluminium, silver, platinum, nickel type magnets, or any other type of permanent magnet.

Magnetic conductor may be made of a magnetic material which shall refer to any type, structure, it shall refer to magnetic fibers, sheets, fabrics, textiles, pieces, particles, nanoparticles, powders, shall refer to hard and soft magnetic materials, etc.

As used in the claims and the specification, the term "magnetic conductor" shall also refer to ferrites which shall refer to any kind, shape [e.g. bars, strips, sheet, layer, 3D shapes, etc.], composition, etc. of ferrites, shall refer to rigid and flexible ferrites, [e.g. at frequencies at about 6 MHz the ferrites can be Nickel-Zinc ferrites, rigidly-formed NL-12S ferrites, and/or flexible FJ3, at lower frequencies (e.g. under 2 MHz) Manganese-Zinc ferrites, etc.]. The term shall preferably refer to soft ferrites, and shall refer to transparent ferrites as well.

The term shall further refer to magnetic metals and shall preferably not exclusively refer to iron, soft iron, ferrite iron, carbonyl iron, hydrogen reduced iron, nickel, cobalt, solid metals, powdered metals, laminated metals, amorphous metal, alloys, nickel alloys, mu-metal, permalloy, supermalloy, molypermaloy, high-flux Ni—Fe, Sendust, KoolMU, steel, electrical steel, ferritic stainless steel, martensitic stainless steel, silicon steel, special alloys, nanostructures, nanocrystalline, etc. and shall refer to "magnetic permeable materials".

The term shall also refer to magnetic gel, shall preferably not exclusively refer to a gel containing magnetic particles, structures of any size (including nanoparticles) or to any gel having (high) magnetic permeability and providing a path for magnetic fluxes.

Magnetic conductors can have "enlarged ends", the term shall refer to an enlargement which may be provided as an enlarging shape, an added material [which may be attached, coupled, etc.] or a structure [e.g. a metallic plate which may be provided with a dielectric layer, etc.] which may be of same or different material from a material of a primary/secondary magnetic conductors.

As used in the claims and the specification, the term "electrocomponent" shall refer to various electrical and electronical circuits, electrical components [e.g. power electronics] of the power transfer circuits which can be bidirectional, electronical circuits, communication circuits, interfaces, etc. The term shall preferably not exclusively refer to the following terms:

Oscillator shall also refer to oscillators wherein frequency, amplitude, phase, waveform, duty cycle, etc. may be controllable, variable, etc. by digital and/or analog circuitry and shall further refer to crystals, ceramic oscillators, ring oscillators, central processing unit internal oscillators, relaxation oscillators, other waveform generating circuits, etc., class D, E, F, Doherty amplifiers may be used as oscillators, switching devices with filters, etc.

Compensation shall also refer to a tuning network, a tuning circuit, a matching circuit, an adjustable impedance network, a tank circuit, and the like [wherein with a filter may refer to a resonant transformer or L-section]. The primary/secondary electromagnetic interfaces may be impedance-matched to power sources, loads, transmission lines, etc.

Processor shall also refer to a general purpose processor, a Digital Signal Processor (DSP), an Application Specific Integrated Circuit (ASIC), an Intergrated Circuit (IC), a Field Programmable Gate Array (FPGA) or other programmable logic devices, discrete gates or transistor logic, discrete hardware components, microprocessors, electronic processors in a computing device, pre-programmed integrated circuits, combinations, etc. The processor may be coupled and communicate wiredly/wirelessly [e.g. can use near field communication, wireless personal/local area networks, telephone technologies, etc.]. The processor may monitor the power, current, voltage, etc. at any point of the system circuitry, may use feedback algorithms circuits, analog and digital signal processing techniques to control the system, etc. The processor may execute programs [which may be stored on a computer readable storage medium] based on standard programming techniques and may use any storage medium. The processor and the storage medium may reside as discrete components in an user terminal.

Capacitor shall preferably not exclusively refer to super-capacitors, ultracapacitors, double-layer capacitors (e.g. with activated carbons, carbon aerogels, carbon nanotubes, nanoporous carbon, graphene, carbide-derived carbon), pseudocapacitors (e.g. with polymers, metal oxides), hybrid capacitors (e.g. with asymmetric electrodes, lithium-ion capacitors, with composite electrodes), electrolytic capacitors (e.g. aluminium electrolytic capacitors), ceramic capacitors, mica capacitors, film capacitors, chip shape, lead shape capacitors, multilevel circuit board processed capacitors, etc.

The terms "resonator", "capacitor", "coil", "diode" shall also refer (as controllable electrocomponents) to variable, tunable resonators, capacitors, coils, diodes, and shall further refer to switched banks of these circuit components, arrays, array banks, etc. The diodes may be Schottky diodes, reverse-biased PN diodes, Si diodes, GaN diodes, SiC diodes, discrete diodes, chip integrated diodes, PIN diodes, PIN photodiodes, etc. The term "coil" shall refer to loop and the like as well and shall refer to coils with various numbers of turns and shapes from various materials including solid copper on a PCB [e.g. for frequencies above 2 MHz]. Litz wire [e.g. for frequencies under 2 MHz], braided wire, stranded mains cable, etc. The adjustability may be automatical, manual, electrical, piezo-electrical, electronical, mechanical, thermal, etc.

Inductances may be transformer coupled circuits, switching, ferro-magnetic tuning, mu-tuning, etc. adjustable.

Rectifier shall also refer to a full bridge rectifier, a half bridge rectifier, to a rectifier composed of discrete diodes, chip integrated diodes, a (high) voltage step-up, step-down rectifiers passive diode rectifier, a quad diode full wave full bridge rectifier, a synchronous rectifier, etc.

Inverter shall also refer to a half bridge inverter, a power conversion unit, a DC-AC inverter, a low frequency to high frequency inverter, an inverter rectifier, etc.

Converter shall refer to AC-DC, DC-DC, DC-AC, AC-AC, DC-DC/AC, analog to digital converters, digital to analog converters, boost, buck, buck-boost, septic converters, constant frequency power converters, power conversion units, auxiliary converters, variable voltage converters, etc.

Transformer shall refer to any transformer type, construction, functionality [e.g. isolation transformers], etc.

Transmitter, receiver shall also refer to ultra-high frequency (UHF) band or higher [e.g. 866 MHz, 900-930 MHz, 1.575 GHz and 1.610 GHz, 2.45 GHz, etc.], high frequency (HF) [e.g. 13.56 MHz], low frequency (LF) [e.g. 135 KHz], etc. transmitters, receivers.

Controller shall also refer to control electronics, control circuits and shall refer to a controller which can activate the system [e.g. can activate primary/secondary conductors to create magnetic fluxes, a 3D space time varying magnetic field, provided condenser action, etc.] to wirelessly transfer electromagnetic energy [e.g. in a bidirectional energy flow], to adjust system parameters (resistances, capacitances, inductances, frequencies, voltages, currents, etc.), shall refer to a plurality, arrays of controllers, to controllers including one or more processors, etc., and shall refer to programmable or non-programmable logic devices as well, micro-controllers, etc.

Varactor shall also refer to varactor arrays which can be connected in series and in parallel. Switch shall refer to any type of a switching mechanism and shall refer to switching circuits, banks, arrays, etc., shall refer to field effect transistors (FETs), metal-oxide semiconductor field effect transistors (MOSFETs), power MOSFETs, insulated-gate bipolar transistors (IGBTs), PIN diodes switches, micro-electro-mechanical-systems (MEMS) switches, relays, mechanical switches, switches containing electronic circuits, proximity switches, process switches, thyristor-based switches, switched-mode power supplies, etc.

Network as the electrocomponent shall refer to physical and/or logical networks [e.g. intranet, the Internet, personal area networks, local area networks, wide area networks, etc.].

Sensor shall also refer to optical, acoustical, electromagnetic sensors, magnetic sensors, voltage sensors, current sensors, inductive sensors, capacitive sensors, temperature sensors, pressure sensors, etc.

Rechargeable power source shall preferably not exclusively refer to power sources including rechargeable batteries [e.g. strings, packs, modules, cells], capacitors [e.g. strings, packs, modules, cells], batteries with integrated storage capacitors, hybrid sources, marine power sources [e.g. buoyant/nonbuoyant], swappable power sources, energy storage elements [e.g. hydrocarbon fuel storage, mechanical (e.g. compressed air, compressed gas, flywheel, etc.), electromagnetic (e.g. using superconductors, etc.), electrochemical (e.g. flow battery, ultra battery, etc.), thermal (e.g. phase change material, cryogenic energy storage, liquid nitrogen engine, etc.), chemical (e.g. biofuel storage, power to gas storage, power to liquid, hydrogen storage, hydrogen peroxide, etc.)]. The rechargeable power source can include a wireless power receiver including the primary/secondary electromagnetic interface [e.g. in a container of a marine power source, an AA rechargeable battery can include a wireless power receiver, etc.].

Rechargeable battery shall preferably not exclusively refer to lithium-ion, lithium-ion polymer, lithium-air, lithium-sulphur, lithium-metal, nickel-metal hydride, nickel-iron, nickel-cadmium, lead-acid, valve regulated lead-acid, absorbed glass mat, gel [e.g. for high pressure, high temperature implementations], solid state, organic radical batteries. Shall also refer to AA, AAA, D, 9V, laptop, cell phone, button batteries, etc. Rechargeable batteries may include fuel cells, piezoelectric elements, springs. A variety of arrangements of multiple rechargeable batteries may be used. Rechargeable batteries may be trickle, float charged, charged at fast, slow rates.

Source management system shall also refer to rechargeable power source management systems, battery charge systems, battery charge control units, battery energy control modules, and the like.

Communication interface shall also refer to RS 485, Ethernet Port, USB, Bluetooth, NIC (Network Interface Controller), CAN (Controller Area Network), DVI (Digital Visual Interface), optic modem, acoustic modem, reader/router, etc., and shall refer to user interface [e.g. a light, a noise, a vibration, a screen, a display/e.g. a liquid crystal display, a cathode ray tube, a plasma, a projector display/, a keyboard, a touch screen, a stylo, a pen, a mouse, an audio device/microphone/, etc.].

Input device, output device shall also refer to input/output circuitry which can include active components (converters, amplifiers, signal generation chips, etc.) and passive components.

Energy source as an electrocomponent shall refer to any type of electric energy source, shall refer to energy providing power and/or data, shall refer to alternating current (AC) sources, direct current (DC) sources, modulated and non-modulated signal sources (which can provide data transmission, communication, etc.), shall refer to onshore energy sources, offshore energy sources, or combinations thereof.

Hybrid source shall refer to any type of electric energy source combined with other energy source (e.g. thermal, radiant, chemical, nuclear, motion, sound, elastic, gravitational energy).

Power source shall also refer to AC. DC power sources, dual or multiple excitation power sources, power sources with a phase difference, AC/DC power outlets, etc., shall refer to shared power sources, multiplexed power sources (frequency, spatially, orientation, etc.), power sources in tuned off, idle, sleep modes, power sources monitoring, billing, controlling energy transfer, etc.

Load as an electrocomponent shall also refer to power sink and shall refer to any type of load, for example a resistive load such as a light bulb, or a mobile or stationary electronic device (e.g. GPS navigations, house-hold robots, etc.), a rechargeable power source, a transport means (e.g. vehicles, water vessels, drones, etc.), medical devices (e.g. implanted devices, autonomous devices, etc.), military applications (e.g. heated, illuminated clothing, built-in vehicles equipments, etc.), an AC or DC load/power drain, etc.

The invention can provide bidirectional energy flow which can include multidirectional energy (power and/or data) flow. Energy sources and loads can function in a dual, triple, multiple modes. Loads can be energy sources for other loads (e.g. in case of repeating systems).

Liquid crystal device as an electrocomponent which can also be coupled into the system [e.g. as a communication interface] shall refer to any device including liquid crystals, shall refer to display and non-display devices, to liquid crystal panels and liquid crystal displays, flexible and non-flexible devices, shall refer to active and passive devices [e.g. providing external and/or internal electromagnetic fields], shall refer to combined light-energy systems.

As used in the claims and the specification, the terms "shielding", "shielded" shall refer to shields that may shape, guide, shield, reflect, refract, diffract, block, change polarisation of electric and magnetic fields in a desired manner to enhance the coupling, to reduce energy losses, to direct the electromagnetic field to and/or away from a specific direction. The shielding may be a single construction or multi-layered combination and may be comprised of a conductive, magnetically permeable material, an artificial magnetic conductor (structure), a conductive material such as aluminium, copper, silver, brass, etc. with a thin magnetically permeable material layer such as ferrites containing materials. The shielding may shield electrocomponents [e.g. control electronics] of the system which can be provided in a shielded enclosure, which can be insulated [e.g. thermally, water-proof, etc.]. The shielding may have various (sufficient) thickness [e.g. at least 1 times the skin depth of fields/e.g. electric, magnetic fields/], it can be a metal gauze or mesh or other structures with slots or holes (which can be sufficiently small in comparison with a wavelength). The shielding materials may exclude circular magnetic fluxes from them [e.g. by induced circulating eddy-currents generating a second field equal and opposite to the imposed field thus cancelling it out at a surface of the shielding].

As used in the claims and the specification, the term "insulation" shall also refer to electrical insulation, dielectric layer, material, a spacer, etc., the term shall also refer to water, moisture, dust, dirt, mud insulation, and the like As used in the claims and the specification, the term "thermal management system" shall refer to active and/or passive systems.

Components of the system can be provided with a "dielectric layer", the term shall also refer to dielectric materials, dielectric coatings, etc., and shall also refer to an air-gap. The dielectric layer may be provided to the primary/secondary electrical conductor. The dielectric layer may be magnetic or non-magnetic. The dielectric layer may be a multilayer combining different materials, thicknesses, properties, etc.

As used in the specification, the term "liquid" shall also refer to a coupling liquid (i.e. liquid wherein an energy transfer may at least partially take place).

As used in the specification, the term "water" shall also refer to rain, vapor, condensed vapor, slurries, mud, ice, salt solutions, mixtures with solid particles, gaseous particles, etc.

Charging station as an electrocomponent shall also refer to charger, charging unit, converter, and the like.

As used in the claims and the specification, the term "water vessel", shall also refer to maritime vessel, electric ship, hybrid boat, and the like, and shall refer to manned and unmanned vessels, shall refer to overwater and underwater vessels, amphibious vessels, models and toys, etc.

As used in the claims and the specification, the term "vehicle" shall preferably not exclusively refer to electric vehicle, onshore (rechargeable) vehicle at least partially electrically driven, shall refer to manned and unmanned vehicles, models and toys, etc.

As used in the claims and the specification, the term "physical factor" shall refer to water movement, waves movement, tidal movement, vibrations, thermal expansion, coupling/decoupling manoeuvre, friction between relatively moving components of the invention, optimal electromagnetic energy transfer parameters, functional parameters, etc.

As used in the claims and the specification, the term "piston" shall preferably refer to reciprocating pistons and rotating pistons.

As used in the claims and the specification, "A/B" shall refer to A and/or B.

As used in the claims and the specification, the singular forms are intended to include the plural forms as well and vice versa.

The term "to couple" and derivatives shall refer to a direct or indirect connection via another device and/or connection, such a connection can be mechanical, hydraulically, electrical, electronical, electromagnetically, pneumatical, communication, functional, etc. The coupling can be temporary, permanent, detachably attachable, scalable, slotable. The coupling can be wired or wireless [e.g. the primary/secondary conductors can be designed to be couplable/coupled with an energy source, a load, etc. wiredly or wirelessly.]. The components [e.g. electrocomponents] can be indirectly coupled, transformer-coupled, inductively coupled, coupled via other electrocomponents, etc. Any additional systems may be coupled to the elements, components, etc. and to the system of the invention. Circuit components may be soldered, welded, glued, use various connection techniques, etc., and may be integrated on a chip.

The terms "to comprise", "to include", "to contain", "to provide" and derivatives specify the presence of an element, but do not preclude the presence or addition of one or more other elements or groups and combinations thereof.

The term "consisting of" characterises a Markush group which is by nature closed. Single members of the group are alternatively useable for the purpose of the invention. Therefore, a singular if used in the Markush group would indicate only one member of the group to be used.

For that reason are the countable members listed in the plural. That means together with qualifying language after the group "or combinations thereof" that only one member of the Markush group can be chosen or any combination of the listed members in any numbers. In other words, although elements in the Markush groups may be described in the plural, the singular is contemplated as well. Furthermore, the phrase "at least one" preceding the Markush groups is to be interpreted that the group does not exclude one or more additional elements preceded by the phrase.

The invention will be described in reference to the accompanying drawings.

Figure 1:
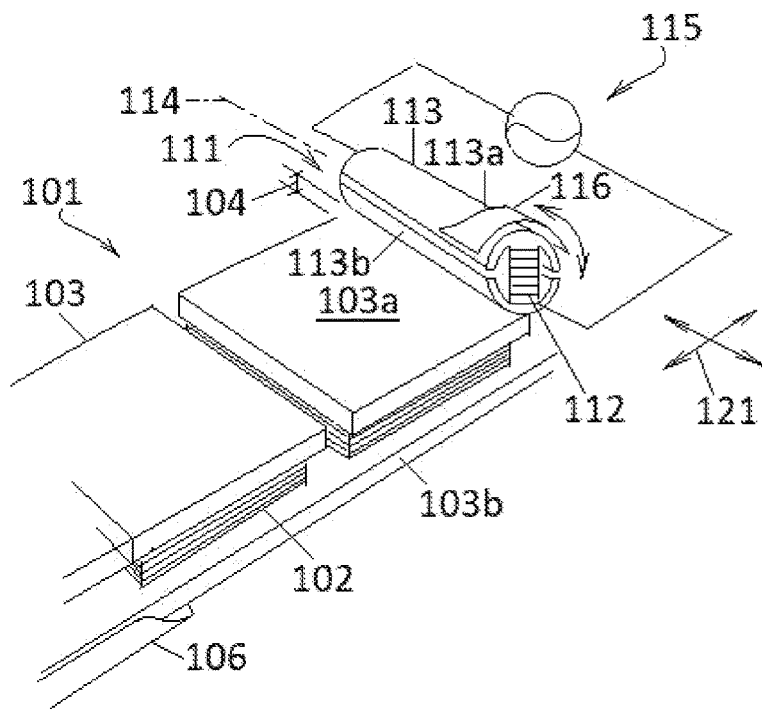
FIG. 1 is a schematic perspective illustration of an embodiment of a stationary-rotational wireless power transfer system with a secondary electrical conductor wound around a winding axis perpendicular to a spin axis, the system enabling a relative movement.

FIG. 1 is a schematic perspective illustration of an embodiment of a stationary-rotational wireless power transfer system which can comprise a stationary primary electromagnetic interface (101) including one or more primary electrically conductive loops (102) and one or more primary magnetic conductors (103). The system can comprise a secondary electromagnetic interface (111) including one or more secondary electrically conductive loops (112) and one or more secondary magnetic conductors (113). The secondary electromagnetic interface (111) can spin around a spin axis (114) substantially parallel with a coupling surface (103a) of the primary magnetic conductors (103) at a distance (104) to induce an alternative current in the secondary electrically conductive loops (112).

The primary and secondary magnetic conductors (103 and 113) can form coil cores with enlarged respective first and second ends (103a, 103b and 113a, 113b). The cores (113) can be three-dimensionally shaped at both ends (113a, 113b). The second ends (103b) can be interconnected to provide a magnetically conductive path. The secondary electromagnetic interface (111) can have a rotational form with the spin axis (114) [e.g. a cylindrical form].

The primary electromagnetic interface can be coupled with an electrocomponent (not shown) [e.g. an electric circuit with a compensation circuitry, a power and communication electronics, a power source, etc.]. The secondary electromagnetic interface can be coupled with an electrocomponent (115) [e.g. a compensation circuitry, a power and communication electronics, a rechargeable power source, an electromotor, etc.]. The system can include bidirectional electrocomponents to provide bidirectional power flow. The system can provide wireless data transmission via wireless communication interfaces and systems and/or via the primary and secondary electromagnetic interfaces (101 and 111).

The system can further comprise shieldings (106 and 116) (shown in a partial cutout) to shield at least partially the primary electromagnetic interface (101) and the secondary electromagnetic interface (111), respective. The system can further comprise an insulation (not shown) to insulate the primary and secondary electrically conductive loops [e.g. electrical insulation]. The system can comprise a thermal management system (not shown) to thermally manage the power transfer [e.g. to cool the primary and secondary electrically conductive loops (102 and 112) and the primary and secondary magnetic conductors (103 and 113), the electrocomponent (112), the power transfer conductor (116), etc.]. The primary and secondary interfaces (101 and 111) and their components and the components of the proposed system can be modularly scaleable and exchangeable. The system can enable a relative mutual movement (121).

Figure 2:
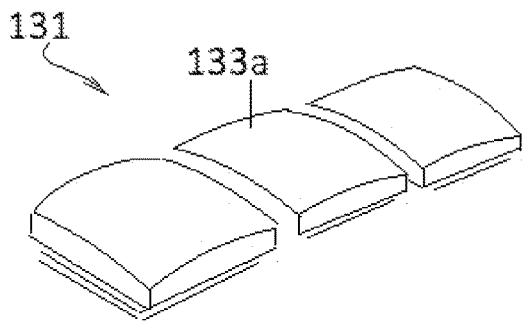
FIG. 2 is a schematic perspective illustration of an embodiment of a primary electromagnetic interface with three-dimensionally shaped ends.

FIG. 2 is a schematic perspective illustration of an embodiment of a primary electromagnetic interface (131) with three-dimensionally shaped first ends (133a).

Figure 3:
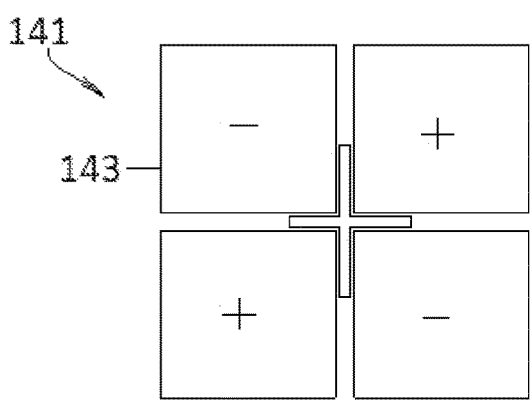
FIG. 3 is a schematic plan view of a primary electromagnetic interface layout according to the present invention.

FIG. 3 is a schematic plan view of a primary electromagnetic interface (141) with cross-polarised primary magnetic conductors (143) which can be permanent magnets or electromagnets coupled with primary electrical conductors (not shown) with power and communication electrocomponents; the communication can take place through separate communication wired/wireless canals or via the primary electromagnetic interface (141), e.g. using various power modulation techniques; the primary electrical conductors can be coupled with various electrocomponents, e.g. to an alternating current source or to a direct current source [to produce approximately uniform field]. The alternating current source can be coupled with power amplifier topologies, full-bridge inverter topologies, various (adjustable) compensation topologies (C, CL, CLC, LCCL, CLCL, etc.). The direct current source can be coupled with pulse width modulator, (adjustable) impedance circuitries which can further include resistance and which can be tuned to resonance frequency in according to load frequency. The primary electromagnetic interface (141) can create a continuous pulsating electromagnetic energy transfer board convenient for a nearfield inductive power/data transfer by a modulated/unmodulated signal. The embodiment can be convenient for stationary/mobile applications [e.g. electric vehicles, portable electronics, etc.]. The embodiment can provide an oscillating power board architecture. The embodiment can be used in a dry/humid/under water environment. The embodiment can provide a slow (electromagnetic) field motion. The embodiment can provide a crossed dipole antennas type electromagnetic interface.

Figure 4:
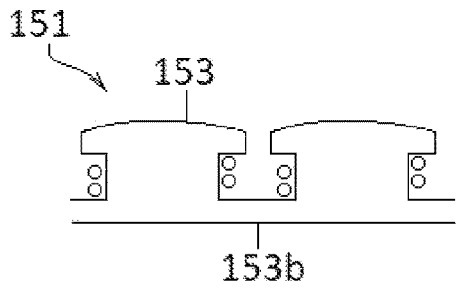
FIG. 4 is a schematic cross-sectional view of a primary electromagnetic interface with interconnected primary magnetic conductors.

FIG. 4 is a schematic cross-sectional view of a primary electromagnetic interface (151) with primary magnetic conductors (153) interconnected at second ends (153b).

Figure 5:
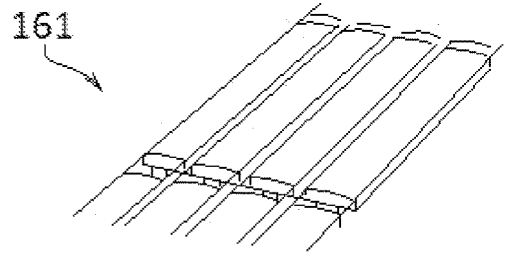
FIG. 5 is a schematic perspective view of another primary electromagnetic interface layout according to the present invention.

FIG. 5 is a schematic perspective view of another primary electromagnetic interface (161) layout which can be convenient for an onshore track static/dynamic power transfer.

Figure 6:
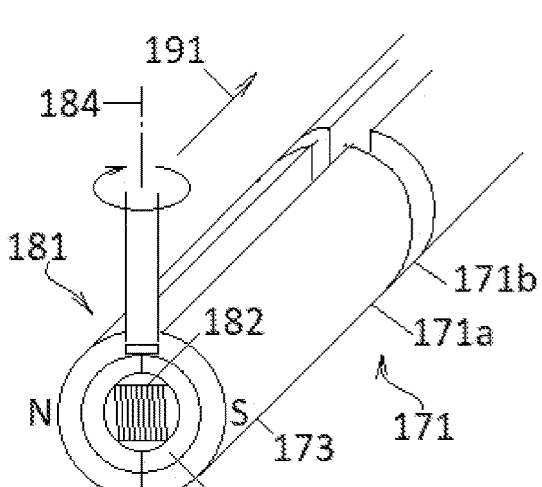
FIG. 6 is a schematic oblique view of another embodiment of a stationary-rotational wireless power transfer system with a secondary electrical conductor wound around a winding axis perpendicular to a spin axis, the system enabling a relative movement.

FIG. 6 is a schematic oblique view of an embodiment of a stationary-rotational wireless power transfer system which can comprise a stationary primary electromagnetic interface (171) including one or more primary magnetic conductors (173) and sections (171a) and connections (171b) [e.g. to cope with a water movement, thermal expansion of materials, etc.]. The system can comprise a secondary electromagnetic interface (181) including one or more secondary electrically conductive loops (182) and one or more secondary magnetic conductors (183). The secondary electromagnetic interface (181) can spin around a spin axis (184) [e.g. self-propelled] at a distance to induce an alternative current in the secondary electrically conductive loops (182). The system can enable a relative mutual movement (191). The system can be convenient for onshore tracks, waterway tracks, linear motor wireless power supply, etc. The primary and secondary electromagnetic interfaces (171, 181) can be provided with an insulation and a shielding (not shown).

Figure 7:
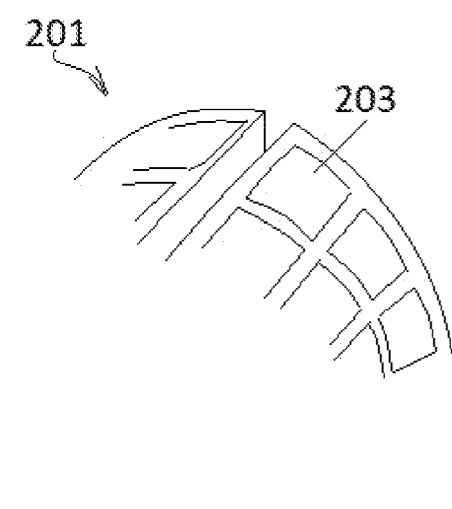
FIG. 7 is a schematic detailed perspective illustration of another embodiment of a primary electromagnetic interface.

FIG. 7 is a schematic detailed perspective illustration of another embodiment of a primary electromagnetic interface (201) which can comprise primary magnetic conductors (203) [which can form coil cores; the coils can be separately controllable, switchable, etc.].

Figure 8:
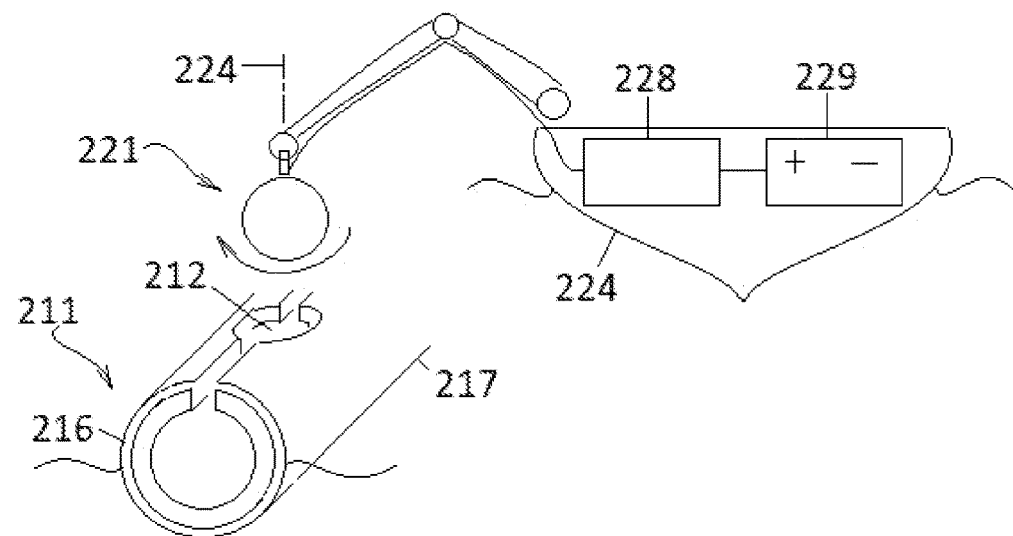
FIG. 8 is a schematic oblique view with a partial cross section of a stationary-rotational wireless power transfer system coupled with a waterway track and with a water vessel.

FIG. 8 is a schematic oblique view with a partial cross section of a stationary-rotational wireless power transfer system which can comprise a stationary primary electromagnetic interface (211) and a secondary electromagnetic interface (221) which can spin around a spin axis (224). The primary interface (211) can be coupled with a waterway track (217) and the secondary (221) with a water vessel (224). The primary and secondary electromagnetic interfaces (211, 221) can be coupled with primary and secondary electrocomponents, respectively [e.g. a primary power source, a primary control and communication center, etc. and a secondary source management system (228) providing spinning power, wireless power transfer conversion to a DC charging current for a rechargeable power source (229), power transfer control and communication with the primary controller, etc.]. The primary interface (211) can provide insertion holes (212). The primary and secondary electromagnetic interfaces (211, 221) can be provided with an insulation [e.g. the secondary electromagnetic interface (221) can rotate in an encapsuling form] and a shielding (216, only a primary shielding shown).

Figure 9A:
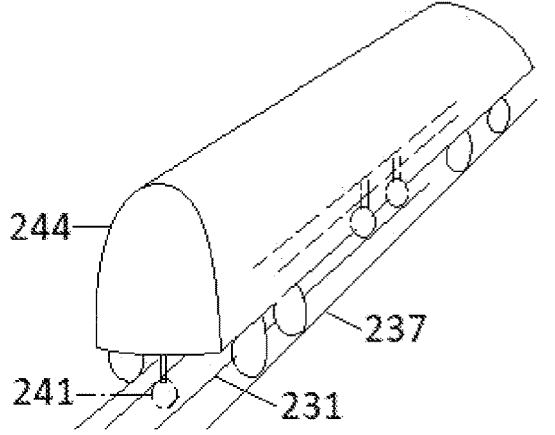
FIG. 9*a* is a schematic perspective view of a stationary-rotational wireless power transfer system coupled with an onshore track and with a vehicle.

FIG. 9a is a schematic perspective view of a stationary-rotational wireless power transfer system which can comprise a stationary primary electromagnetic interface (231) coupled with a track (237) and a secondary electromagnetic interface (241) coupled with a vehicle (244) [e.g. a train, a wagon, a tramway, a truck, etc.].

Figure 9B:
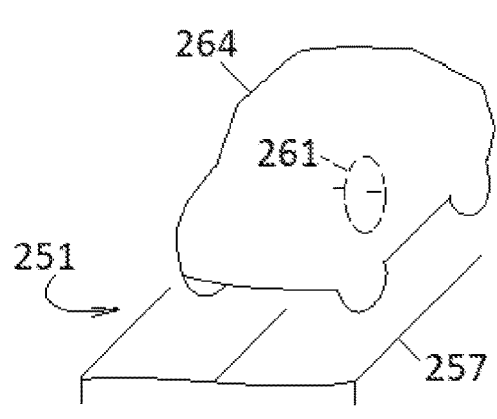
FIG. 9*b* is a schematic perspective view of another embodiment of a stationary-rotational wireless power transfer system coupled with an onshore track and with a vehicle.

FIG. 9b is a schematic perspective view of a stationary-rotational wireless power transfer system which can comprise a stationary primary electromagnetic interface (251) coupled with a track (257) and a secondary electromagnetic interface (261) coupled with a vehicle (264) [e.g. an electric vehicle, etc.].

Figure 10:
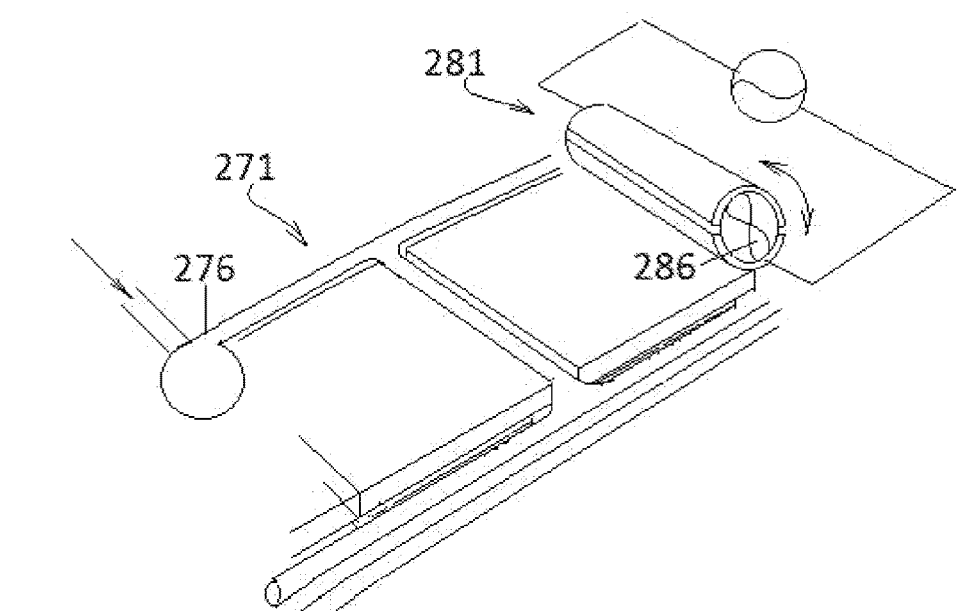
FIG. 10 is a schematic perspective illustration of an embodiment of a stationary-rotational wireless power transfer system further comprising a thermal management system.

FIG. 10 is a schematic perspective illustration of another embodiment of a stationary-rotational wireless power transfer system which can comprise a stationary primary electromagnetic interface (271) which can be thermally managed by a liquid cooling system (276) [e.g. using cooling circuits which can include compressors, condensers, fans, thermostatic expansion valves, heat exchangers, dryers/separators, evaporators, reservoirs, pumps, conduits, sensors, radiators, etc.] and a secondary electromagnetic interface (281) which can be thermally managed by an air cooling system (286) [e.g. coupled with a heating, ventilation, air conditioning (HVAC) system of a vehicle]. Thermal management circuits air/liquid can use separate systems (loops) which can be coupled with other primary/secondary systems via heat exchangers (e.g. vehicle HVAC systems, engine cooling systems, power electronics cooling systems, etc.)

Figure 11:
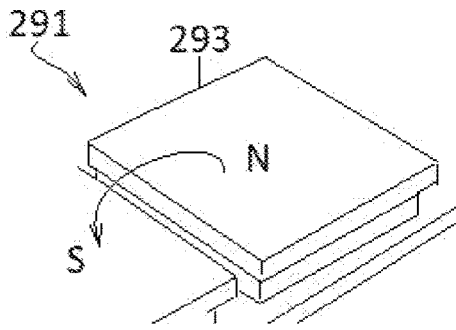
FIG. 11 is a functional schematic perspective illustration of another embodiment of a primary electromagnetic interface with permanent magnets.

FIG. 11 is a schematic perspective illustration of another embodiment of a primary electromagnetic interface (291) with permanent magnets (293).

Figure 12:
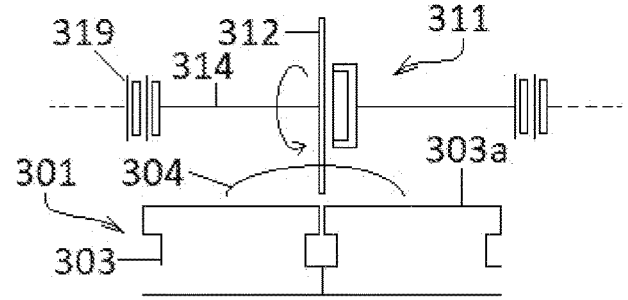
FIG. 12 is a functional schematic cross sectional view of another embodiment of a stationary-rotational wireless power transfer system with a secondary electrical conductor oriented substantially perpendicularly to a transverse magnetic field.

FIG. 12 is a functional schematic cross sectional view of another embodiment of a stationary-rotational wireless power transfer system with a primary electromagnetic interface (301) including primary magnetic conductors (303) providing a transverse magnetic field (304) on its coupling side (303a) and a secondary electromagnetic interface (311) including a secondary electrical conductor (312) oriented substantially perpendicularly to the transverse magnetic field (304) and spinning around a spin axis (314) at a distance to induce a current. The secondary electromagnetic interface (311) can be coupled with a secondary electrocomponent [e.g. a rechargeable battery (319)] and can be configured to be an electric motor [e.g. a (bidirectional) converter, a switch can be provided in the charging circuit, etc.].

Figure 13:
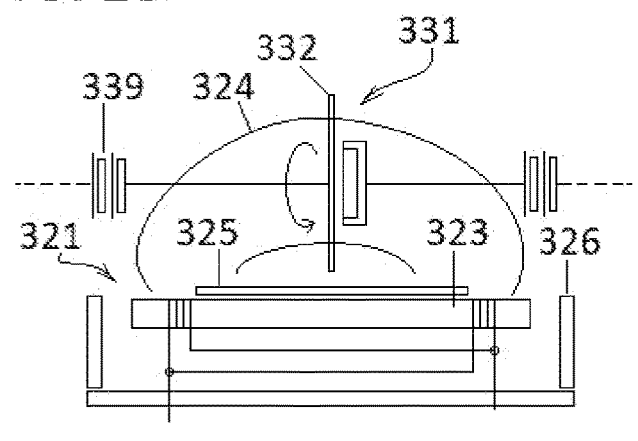
FIG. 13 is a functional schematic cross sectional view of another embodiment of a stationary-rotational wireless power transfer system with a stationary primary electromagnetic interface comprising a shielding and with a secondary electromagnetic interface coupled with a secondary electrocomponent.

FIG. 13 is a functional schematic cross sectional view of another embodiment of a stationary-rotational wireless power transfer system with a primary electromagnetic interface (321) including a primary magnetic conductor (323) providing a transverse magnetic field (324) and a secondary electromagnetic interface (331) including a secondary electrical conductor (332) coupled with a rechargeable battery (339)]. The primary electromagnetic interface (321) can comprise a shielding (325, 326). Preferably all the surface of the secondary electrical conductor (332) can rotate in the transverse magnetic field (324) to increase efficiency and to reduce eddy currents.

Figure 14:
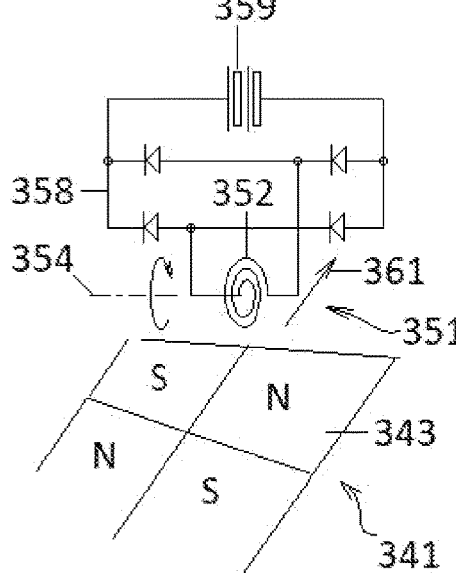
FIG. 14 is a functional schematic of another embodiment of a stationary-rotational wireless power transfer system with a secondary electromagnetic interface coupled with a secondary electrocomponent.

FIG. 14 is a functional schematic view of another embodiment of a stationary-rotational wireless power transfer system with a primary electromagnetic interface (341) including primary magnetic conductors (343) and a secondary electromagnetic interface (351) including a secondary electrical conductor (352) configured to spin around a spin axis (354). The secondary electromagnetic interface (351) can be coupled with a secondary electrocomponent [e.g. a rectifier (358) and a rechargeable battery (359)] and can be configured to be an electric motor. The system can enable a relative mutual movement (361).

FIG. 15 is a functional perspective view of a transverse magnetic field motor (378) comprising a first portion (371) [which can include magnetic conductors, coils, permanent magnets, etc.] and a second portion (381) mounted to relatively spin around a spin axis (374). A transverse magnetic field (384) can be provided between the first and second portions (371, 381). The second portion (381) can include one or more electrical conductors (382) [e.g. transversely oriented, radially oriented, laminated, integral conductive paths, etc.]. A stationary electromagnetic interface (not shown) can at least partially provide the transverse magnetic field (384) and the motor (378) can be configured to function as a secondary electromagnetic interface configured to spin around the spin axis (374) at a distance [e.g. determined by the magnetic field strength] from the stationary electromagnetic interface to induce a current (386) in the electrical conductor (382).

FIG. 16 is a functional perspective view of a transverse magnetic field motor (398) comprising a first portion (not shown) and a second portion (401) mounted to relatively spin around a spin axis (404). A transverse magnetic field (394) can be provided between the first portion and the second portion (401) which can include an electrical conductor (402). A stationary electromagnetic interface (391) can provide the transverse magnetic field (394) and the motor (398) can be configured to function as a secondary electromagnetic interface configured to spin around the spin axis (404) at a distance from the stationary electromagnetic interface (391) to induce a current in the electrical conductor (402). The motor (398) can be coupled with a secondary electrocomponent [e.g. conductive bearings (408a, 408b)].

FIG. 17a is a functional perspective view of a transverse magnetic field motor (428) comprising a first portion (421) and a second portion (431) mounted to relatively spin around a spin axis (424). A transverse magnetic field (414) can be provided between the first portion (421) and the second portion (431) [e.g. the first portion (421) can include one or more windings connected with a charging and driving unit (438) to establish the transverse magnetic field (414)]. The second portion (431) can include an electrical conductor (432). A stationary electromagnetic interface (411) [which can include a magnetic conductor (413)] can provide the transverse magnetic field (414) and the motor (428) can be configured to function as a secondary electromagnetic interface configured to spin around the spin axis (424) at a distance from the stationary electromagnetic interface (411) to induce a current in the electrical conductor (432). The motor (428) can be coupled with a secondary electrocomponent [e.g. a rechargeable battery (439), the electric vehicle charging and driving unit (438) which can switch between charging and driving modes, between direct current and alternating current modes, between direct magnetic field and alternating magnetic field modes, etc.].

FIG. 17b is a perspective view of a transverse magnetic field motor (448) coupled with a front drive [similarly can be coupled with a rear drive, e.g. with a cardan shaft]. The motor (448) can can comprise a first portion including axially oriented coils which can be switched by a controller to provide a rotating magnetic field and a second portion including electrically conductive longitudinal fins [which can provide air/liquid cooling] shortened at both ends by shorting rings. The axial flux motor (448) can be of an analogical construction as the radial flux motor (478) described in FIG. 19.

FIG. 18 is a functional perspective view of a transverse magnetic field motor (458) comprising a first portion (451) [which can be a stator having at least two poles (four poles shown) connected to an alternating current power source producing a rotating magnetic field] and a second portion (461) [which can be a rotor consisting of electrically conductive longitudinal bars (462), blades, etc., which can be provided in one or more circumferential layers and which can be from steel, copper, aluminium, etc., and which can be shorted at both ends by shorting rings (463a, 463b); by adjusting the shape of the bars/blades in the rotor, the speed-torque characteristics can be changed; the motor can be driven by single-phase or poly phases, e.g. three-phases; second portion (461) can optionally include magnetic conductors inclusive of permanent magnets (not shown) which can be provided in various sections and arrangements/e.g. two-pole, four-pole, etc./] mounted to relatively spin around a spin axis (464) [which can be a shaft (not shown)]. A transverse magnetic field (454a, 454b) can be provided between the first and second portions (451, 461) to induce a rotating magnetic field.

FIG. 19 is a functional perspective view of a transverse magnetic field motor (478) comprising a first portion (471) [e.g. a stator which can consist of 3 phase windings and a metal housing; windings can be electrically and mechanically 120° apart; the windings can have laminated iron cores] and a second portion (481) [e.g. a rotor including shorting rims and electrically conductive blades (482) and can be conveniently laminated to reduce eddy currents and maximize electromagnetic induction] mounted to relatively spin around a spin axis (484) [which can be a shaft (not shown)]. A rotating magnetic field can be provided by the stator (471) to induce a rotating magnetic field in the rotor (481). The three-phase transverse magnetic field motor (478) can be used to pump a fluid (488) and can be used as an electricity generator [e.g. as a turbine] or as an electric mill or any other application wherein a mechanical part, e.g. such as a blade (482), can perform an electromagnetic function of a rotor part. The proposed configuration can be provided with different shapes of rotors [e.g. cylindric] and with different stator configurations [e.g. its form can be conical; different numbers of poles, a turbine/pump/mill feeder (489), insulations, shieldings, etc., can be provided]. Alternatively an outer turbine rotor can be provided from a nonmagnetic material/e.g. polymers/including permanent magnets. Still alternatively an outer turbine stator can include permanent magnets and the rotor can include one or more windings, optionally with magnetic cores. The proposed embodiment can be coupled with various mechanocomponents, e.g. gears, planetary speed reducers or multipliers, shafts, belts, chains, clutches, brakes, etc.

FIG. 20 is a schematic oblique view of a secondary electromagnetic interface (481) with a secondary electrical conductor (482) oriented perpendicularly to a transverse magnetic field (474) and coupled with an electric bicycle (484). The secondary electrical conductor (482) can be coupled with a rechargeable power source (not shown).

FIG. 21 is a schematic of a secondary electromagnetic interface (501) with a secondary electrical conductor (502) oriented perpendicularly to a transverse magnetic field (494) and coupled with a switch (508).

FIG. 22 is a schematic of another embodiment of a secondary electromagnetic interface (521) with secondary electrical conductors (522a, 522b, 522c) oriented perpendicularly to a transverse magnetic field (perpendicular to the page) and coupled with an array of switches (528).

FIG. 23 is a functional schematic perspective view of another embodiment of a stationary-rotational wireless power transfer system with a primary electromagnetic interface (531) including a primary magnetic conductor (533) providing a transverse magnetic field (534) and with a secondary electromagnetic interface (541) coupled with secondary electrocomponents [e.g. bidirectional charging electronics (548), a rechargeable battery/capacitor hybrid source (549)].

FIG. 24 is a side view of an electric car (554) with other possible emplacements of secondary electromagnetic interfaces (551a, 551b, 551c) according to the present invention.

FIG. 25 is a schematic perspective view of a secondary electromagnetic interface (571) with a secondary electrical conductor (572) oriented perpendicularly to a transverse magnetic field (564) coupled with a radial flux type electric motor (578).

FIG. 26 is a functional schematic partial cross sectional view of another embodiment of a stationary-rotational wireless power transfer system with a primary electromagnetic interface (581) including a primary magnetic conductor (583) providing a transverse magnetic field (584) and with a secondary electromagnetic interface (591) including a secondary electrical conductor (592) [which can be formed with flanges] oriented substantially perpendicularly to the transverse magnetic field (584) and coupled with secondary electrocomponents [e.g. conductive bearings (598), charging electronics (608), a rechargeable power source (609)] and including a secondary magnetic conductor (593) configured to be in at least partial magnetic interaction with the primary magnetic conductor (583) [the secondary magnetic conductor (593) can provide an opposite magnetic pole to an adjacent pole of the primary magnetic element (583); the secondary magnetic conductor (593) can be configured not to spin at a same relative angular velocity as the secondary electrical conductor (592), e.g. can be provided with a stabilizing weight, can be stabilized by means of a hub, etc.]. The secondary interface (591) can be configured to be an electric motor [e.g. the charging electronics (608) can be bidirectional providing a driving mode, etc.]. The primary electromagnetic interface (581) can be provided with a shielding (586). The shown structure of the secondary electromagnetic interface (591) can be integrated into a wheel [e.g. a railway wheel, a sprocket wheel, etc.] and into a wheel with a tire [e.g. the flange into a rim, into a tire radial cord body, or a special new disc/tire construction can be provided, etc.].

FIG. 27 is a functional schematic side view of a secondary electromagnetic interface (621) with a secondary electrical conductor (622) oriented perpendicularly to a transverse magnetic field (614) and coupled with a pneumatic motor (628).

FIG. 28 is a schematic side view of a secondary electromagnetic interface (638a) which can be optionally coupled with another axial flux electric motor (638b). The secondary interface (638a) can be configured to be an electric motor [e.g. in an internal power drive mode wherein the motor can be driven by the proposed method; e.g. by providing magnetic points/e.g. individually controllable coils providing a (rotating) transverse magnetic field which can be provided in one portion/e.g. disc/of the interface (638a) and by providing magnetic holes/e.g. electrically and magnetically conductive disc/which can be provided in the other one portion of the interface (638a); and/or in an external power drive mode wherein the transverse magnetic field can be provided by a stationary primary electromagnetic interface/e.g. provided in a roadway/; regenerative braking modes can be another possible option for an electric vehicle with a charging/driving electronics and a rechargeable power source].

FIG. 29 is a functional schematic perspective view of another embodiment of a stationary-rotational wireless power transfer system with a primary electromagnetic interface (641) including a primary magnetic conductor (643) providing a transverse magnetic field (644) and with a secondary electromagnetic interface (651) including a secondary electrical conductor (652) oriented substantially perpendicularly to the transverse magnetic field (644) and including a secondary magnetic conductor (653) configured to be in at least partial magnetic interaction with the primary magnetic conductor (643) [e.g. the magnetic conductor (653) can be provided at or as a piece of carrosserie e.g. an electric vehicle wheel arch, etc.]. The secondary interface (651) can be optionally configured to be an electric motor.

FIG. 30 is a functional schematic perspective view of another embodiment of a stationary-rotational wireless power transfer system with a primary electromagnetic interface (661) including a primary magnetic conductor (663) providing a transverse magnetic field (664) and with a secondary electromagnetic interface (671) coupled with a (chain or belt) drive system (678).

FIG. 31 is a functional schematic cross sectional view of another embodiment of a stationary-rotational wireless power transfer system which can comprise a primary electromagnetic interface (681) including a primary magnetic conductor (683) [which can be a permanent magnet or a DC or an AC electromagnet] providing transverse magnetic fields (684). The system can comprise a secondary electromagnetic interface (691) including one or more electrically conductive windings (692a, 692b) [e.g. coils which can be flat coils, long coils, coils on cores, combinations] and secondary electrical conductors (692c. 692d) [which can be conductive discs, coiled wires, discs with conductive paths, combinations, etc.] oriented substantially perpendicularly to the transverse magnetic fields (684) and coupled with secondary electrocomponents [e.g. conductive bearings (698a. 698b), coupling nodes, switches, controllers, AC/DC power amplifiers, sensing circuits, filters, capacitors, diodes, etc.] and including a secondary magnetic conductor (not shown) [which can be coil cores, backing plates, I, H, T, E cores, and which can be provided on either side of the coils (692a, 692b) inclusive of lateral parts and the central part, etc.] configured to be in at least partial magnetic interaction with the primary magnetic conductor (683) [e.g. by providing a convenient magnetic polarity and a return magnetic path]. The secondary interface (691) can be configured to be an electric motor [e.g. by providing a current to the coils (692a, 692b) and the conductors (692c, 692d)]. The secondary interface (691) can be provided in various applications inclusive of electric vehicles' wheels. Driving electronics can control DC or AC current provided into the windings (692a, 692b) and the secondary conductors (692c, 692d).

FIG. 32 is a schematic frontal view of a secondary electromagnetic interface (701) with a perpendicular secondary electrical conductor (702) [e.g. substantially radially oriented] and an interacting [e.g. conveniently polarized, etc.] secondary magnetic conductor (703).

FIG. 33 is a functional schematic side view of another embodiment of a stationary-rotational wireless power transfer system with a secondary electromagnetic interface (711) coupled with an electric piston engine (718) [or with another type of a linear motor] comprising a piston (711a) coupled with a coupling mean (712) [e.g. a connecting rod] and guided by a guiding mean (713) [e.g. an inner cylinder]. A winding (714) [e.g. from a wire] can be provided at least partially around the cylinder (713). An alternating electrical current can be provided from a current source (715) into the winding (714) to force the piston (711) to move on the cylinder (713).

FIG. 34 is a schematic oblique view of another embodiment of a stationary-rotational wireless power transfer system with a primary electromagnetic interface (not shown) including a primary magnetic conductor (not shown) providing a transverse magnetic field (724) and with a secondary electromagnetic interface (721) including secondary electrical conductors (722) [which can be spur, helical, bevel, herringbone, hypoid, rack and pinion, internal, harmonic, planetary, etc., gears preferably at least partially electrically conductive, from various magnetic or non-magnetic materials] oriented substantially perpendicularly to the transverse magnetic field (724) and spinning around spin axes (724a, 724b) at a distance to induce a current. The secondary electrical conductors (722) can be coupled with a secondary electrocomponent [e.g. via conductive bearings]. Since the gears (722) spin in opposite directions in the transverse magnetic field (724) the induced currents flow in opposite directions as well. i.e. in one wheel (722) from the center to periphery and in the other wheel from periphery to the center, thus the conductive bearings can collect the current [which can be direct or alternating depending on whether the primary transverse magnetic field is direct or alternating and on whether the wheels (722) rotate in one direction or oscillate in two opposite directions]. The shown embodiment can be analogically transferred to any gear type including planetary gears. It can be multiplied, combined, provided in gearboxes, differentials, etc. The spinning axes (724a, 724b) can have different mutual positions. Omnidirectional magnetic fields can be provided, etc. Such power transfer gears can be coupled with various mechanocomponents [e.g. clutches, shafts, chains, belts, gears, gearboxes, etc.] provided in various directions, numbers, etc. The geared secondary interface (721) can be configured to be an electric motor [e.g. by providing the transverse magnetic field (724) by means of secondary windings (not shown) and by providing an electrical current to the secondary electrical conductors (722). The shown embodiment can be coupled with secondary electrocomponents [e.g. a driving/charging unit connected with a rechargeable power source] and can be provided in charging, driving and regenerative modes. The shown embodiment can be configured to be an electricity generator [e.g. by providing a driving force rotating the conductors (722) in the provided magnetic field (724)].

FIG. 35a is a functional schematic partial oblique view of another embodiment of a stationary-rotational wireless power transfer system with a primary electromagnetic interface (731) including a primary magnetic conductor (733) providing a transverse magnetic field (734) and with a secondary electromagnetic interface (741) including a secondary electrical conductor (742) oriented substantially perpendicularly to the transverse magnetic field (734) and including a secondary magnetic conductor (743) configured to be in at least partial magnetic interaction with the primary magnetic conductor (733). The secondary interface (741) can be configured to be an electric motor [e.g. by providing a DC current to the secondary electrical conductor (742)].

Figure 35B:
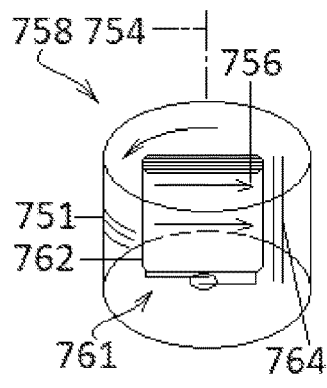
FIG. 35*b* is a functional perspective view of a transverse magnetic field motor with a transversely oriented laminated conductive blade.

FIG. 35b is a functional perspective view of a transverse magnetic field motor (758) comprising a first portion (751) [which can include a coil] and a second portion (761) mounted to relatively spin around a spin axis (754). A transverse magnetic field (764) can be provided between the first and the second portion (751, 761). The second portion (761) can include one or more electrical conductors (762) [e.g. a transversely oriented laminated plate which can further have a mechanical function for example of a fan, compressor or propeller blade, etc.]. A stationary electromagnetic interface (not shown) can at least partially provide the transverse magnetic field (764) and the motor (758) can be configured to function as a secondary electromagnetic interface configured to spin around the spin axis (754) at a distance [e.g. determined by the magnetic field strength] from the stationary electromagnetic interface to induce a current (756) in the electrical conductor (762).

Figure 36A:
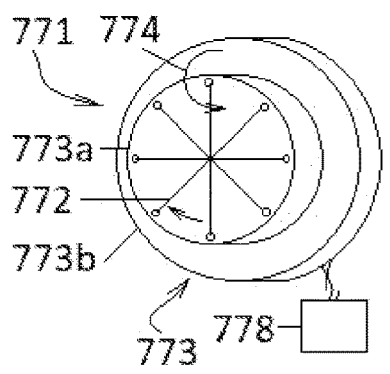
FIG. 36*a* is a schematic oblique view of a secondary electromagnetic interface with perpendicular secondary electrical conductors.

FIG. 36a is a schematic oblique view of a secondary electromagnetic interface (771) including one or more secondary electrical conductors (772) and a secondary magnetic conductor (773) [which can include preferably axially oriented coils which can be disposed in an inner circle (773a) and in an outer circle (773b) and which can be connected with a controller (778)]. The secondary interface (771) can be configured to be an electric motor [e.g. the controller (778) can set polarities of inner and outer coils to provide a magnetic field (774) and provide a current to the secondary electrical conductors (772)]. The secondary magnetic conductor (773) can be in at least partial magnetic interaction with a primary electromagnetic interface (not shown) [e.g. the controller (778) can polarize the coils to provide a magnetic field to correspond to a transverse magnetic field provided by the primary electromagnetic interface.]. The controller (778) can switch between charging and driving modes [e.g. by polarizing the coils with regard to the polarity of the transversal magnetic field provided by the primary electromagnetic interface], between direct current and alternating current modes, between direct magnetic field and alternating magnetic field modes, etc. The secondary interface/electric motor (771) can be provided in wheels of an electric vehicle (not shown) and the secondary magnetic conductor (773) can be provided at least partially in a magnetically conductive tire (not shown) and can include permanent magnets.

Figure 36B:
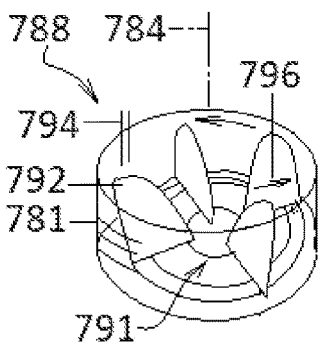
FIG. 36*b* is a functional perspective view of a transverse magnetic field motor with transversely oriented conductive blades.

FIG. 36b is a functional perspective view of a transverse magnetic field motor (788) comprising a first portion (781) [which can include a coil] and a second portion (791) mounted to relatively spin around a spin axis (784). A transverse magnetic field (794) can be provided between the first and the second portion (781, 791). The second portion (791) can include one or more electrical conductors (792) [e.g. a transversely oriented laminated plates which can further have a mechanical function for example of blades]. A stationary electromagnetic interface (not shown) can at least partially provide the transverse magnetic field (794) and the motor (788) can be configured to function as a secondary electromagnetic interface configured to spin around the spin axis (784) at a distance [e.g. determined by the magnetic field strength] from the stationary electromagnetic interface to induce a current (786) in the electrical conductor (792).

Figure 37:
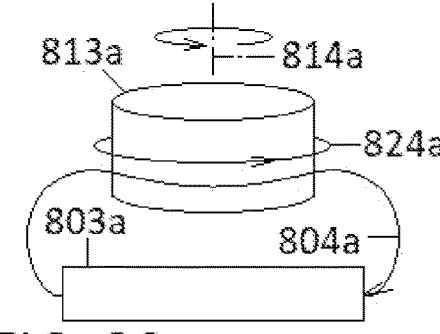
FIG. 37 is a functional schematic perspective view of a perpendicularly oriented interacting secondary magnetic conductor providing a rotating magnetic field.

FIG. 37 is a functional schematic perspective view of an interacting secondary magnetic conductor (813a) spinning around a spin axis (814a) perpendicularly oriented to a transverse magnetic field (804a) provided by a primary magnetic conductor (803a) and creating a rotating magnetic field (824a).

Figure 38:
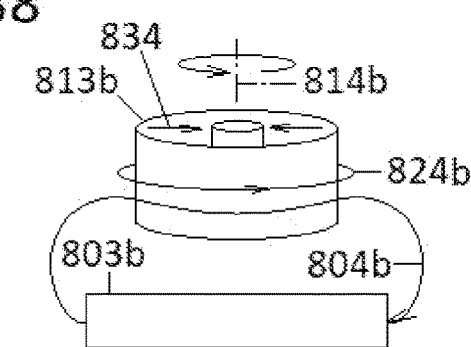
FIG. 38 is a functional schematic perspective view of another perpendicularly oriented interacting secondary magnetic conductor providing a rotating magnetic field and a radially oriented magnetic field.

FIG. 38 is a functional schematic perspective view of an interacting secondary magnetic conductor (813b) spinning around a spin axis (814b) perpendicularly oriented to a transverse magnetic field (804b) provided by a primary magnetic conductor (803b) and providing a rotating magnetic field (824b) and a radially oriented magnetic field (834).

Figure 39:
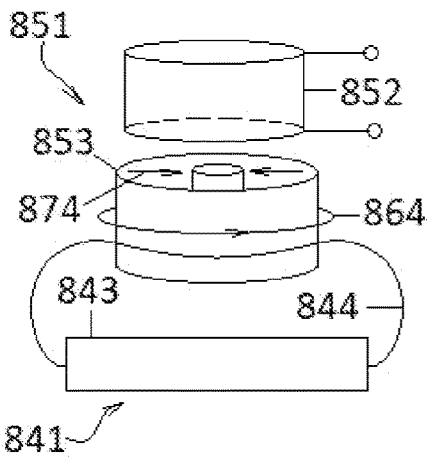
FIG. 39 is a functional schematic perspective view of another embodiment of a stationary-rotational wireless power transfer system with a secondary interface which can be configured to be an electric motor with perpendicularly oriented secondary electrical conductor and an interacting secondary magnetic conductor providing a rotating magnetic field and a radially oriented magnetic field.

FIG. 39 is a functional schematic perspective view of another embodiment of a stationary-rotational wireless power transfer system with a primary electromagnetic interface (841) including a primary magnetic conductor (843) providing a transverse magnetic field (844) and with a secondary electromagnetic interface (851) including a secondary electrical conductor (852) oriented substantially perpendicularly to the transverse magnetic field (844) and including a secondary magnetic conductor (853) configured to be in at least partial magnetic interaction with the primary magnetic conductor (843) and providing a rotating magnetic field (864) and a radially oriented magnetic field (874). The secondary interface (851) can be optionally configured to be an electric motor [e.g by inducing a DC current to the secondary electrical conductor (852)].

Figure 40:
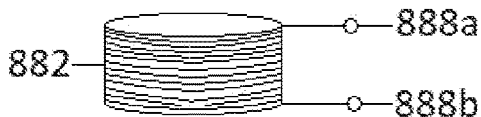
FIG. 40 is a schematic perspective view of another perpendicularly oriented secondary electrical conductor for a secondary interface.

FIG. 40 is a schematic perspective view of another perpendicularly oriented secondary electrical conductor (882) [e.g. formed from a corrugated, helix-surface, or other conductive path] for a secondary interface. The conductor can have at opposite end coupling nodes (888a, 888b) which can be coupled with conductive bearings, brushes, slip rings, etc. (not shown).

Figure 41:
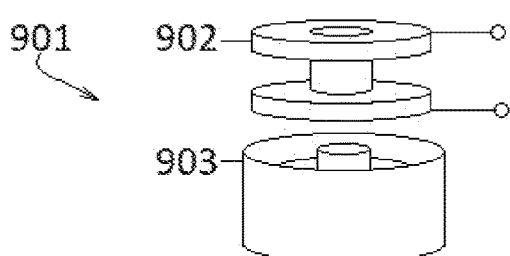
FIG. 41 is a schematic perspective view of another embodiment of a secondary electromagnetic interface.

FIG. 41 is a schematic perspective view of another embodiment of a secondary electromagnetic interface (901) with a perpendicularly oriented secondary electrical conductor (902) and a secondary magnetic conductor (903).

Figure 42:
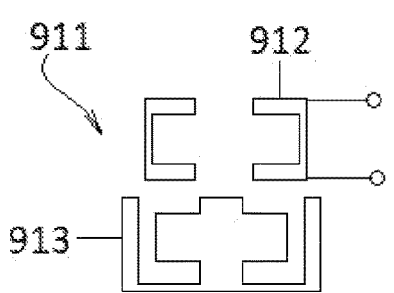
FIG. 42 is a schematic cross sectional view of another embodiment of a secondary electromagnetic interface.

FIG. 42 is a schematic cross sectional view of another embodiment of a secondary electromagnetic interface (911) with a perpendicularly oriented secondary electrical conductor (912) and a secondary magnetic conductor (913).

Figure 43:
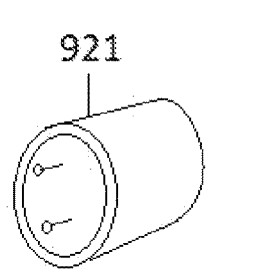
FIG. 43 is a perspective illustration of a modularly configured secondary electromagnetic interface.

FIG. 43 is a perspective illustration of a modularly configured secondary electromagnetic interface (921).

Figure 44:
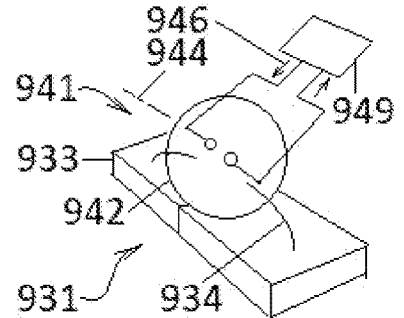
FIG. 44 is a functional schematic perspective view of another embodiment of a stationary-rotational wireless power transfer system.

FIG. 44 is a functional schematic perspective view of another embodiment of a stationary-rotational wireless power transfer system with a primary electromagnetic interface (931) including a primary magnetic conductor (933) providing a transverse magnetic field (934) and with a secondary electromagnetic interface (941) including a secondary electrical conductor (942) oriented substantially perpendicularly to the transverse magnetic field (934) and spinning around a spin axis (944) at a distance to induce a direct current (946) and coupled with a secondary electro-component (949) [e.g. rechargeable battery source].

FIG. 45 is a functional schematic side view of another embodiment of a stationary-rotational wireless power transfer system with a primary electromagnetic interface (951) including a primary magnetic conductor (953) providing a transverse magnetic field (954) and with a secondary electromagnetic interface (961) including a secondary magnetic conductor (963) configured to be in at least partial magnetic interaction with the primary magnetic conductor (953) and including an electrical conductor (not shown) oriented substantially perpendicularly to the transverse magnetic field (954) and spinning around a spinning axis (964). The primary electromagnetic interface (951) can be coupled with an onshore track (not shown) and the secondary electromagnetic interface (961) can be coupled with a wheel (968) [e.g. of an electric bicycle or motorcycle, a wheelchair, etc.]. The secondary interface (961) can be configured to be an electric motor [e.g. by providing a DC current to the secondary electrical conductor].

FIG. 46 is a functional schematic side view of another embodiment of a stationary-rotational wireless power transfer system with a primary electromagnetic interface (971) including a primary magnetic conductor (973) providing a transverse magnetic field (974) and with a secondary electromagnetic interface (981) including secondary magnetic conductors (983) interacting with the primary magnetic conductor (973) and including a secondary electrical conductor (982) [e.g. a coiled wire, parallel interconnected discs, etc.] oriented substantially perpendicularly to the transverse magnetic field (974) and configured to spin around a spinning axis (984). The secondary interface (981) can be configured to be an electric motor [e.g. by providing a transverse magnetic field between the secondary magnetic conductors (983).

FIG. 47 is a functional schematic cross sectional view of another embodiment of a stationary-rotational wireless power transfer system with a primary electromagnetic interface (991) including primary magnetic conductors (993) providing a transverse magnetic field (994) and with a secondary electromagnetic interface (1001) including a secondary electrical conductor (1002) [e.g. a coiled wire, one or more parallel discs, etc.] oriented substantially perpendicularly to the transverse magnetic field (994) and configured to spin around a spinning axis (1004). The primary electromagnetic interface (991) can be coupled with a track or a waterway track (not shown) and the secondary electromagnetic interface (1001) can be coupled with a vehicle or a water vessel (not shown), respective. The primary electromagnetic interface (991) can include sections and connections (not shown) [e.g. to cope with the thermal expansion of materials, tidal changes, water movement, to provide independently switchable power/data transfer sections, etc.].

FIG. 48 is a perspective illustration of a segment of a secondary electromagnetic interface (1011) including secondary magnetic conductors (1013) configured to be in at least partial magnetic interaction with a primary magnetic conductor (not shown) and including secondary electrical conductors (1012) oriented substantially perpendicularly to a transverse magnetic field (not shown) and configured to spin around a spinning axis (1014).

FIG. 49 is a perspective illustration of a secondary electromagnetic interface (1021) including a secondary magnetic conductor (1023) configured to be in at least partial interaction with a primary magnetic conductor (not shown) and including secondary electrical conductors (1022) [which can be of a coiled wire] oriented substantially perpendicularly to a transverse magnetic field (not shown) and configured to spin around a spinning axis (1024). The secondary interface (1021) can be coupled with an electrocomponent [e.g. electromagnetically coupled with wheel fork spikes (1038) at least partially comprised of low reluctance material and coupling coils (1029); with a capacitor (1039) optionally tuned to a resonance frequency] and can be configured to be an electric motor [e.g. by providing current to the coupling coils (1039) thus providing a transverse magnetic field between the wheel fork spikes (1038); number of turns, wire diameter and coil diameter of secondary electrical conductors (1022) and coupling coils (1029) can be different].

FIG. 50 is a functional partial detailed cross sectional view of another embodiment of a stationary-rotational wireless power transfer system with a primary electromagnetic interface (1041) including a primary magnetic conductor (1043) providing a transverse magnetic field (1044) and with a secondary electromagnetic interface (1051) including secondary magnetic conductors (1053) interacting with the primary magnetic conductor (1043) and including a secondary electrical conductor (1052) [e.g. coiled wire discs preferably electrically insulated from each other and from a spinning axis (1054)] oriented substantially perpendicularly to the transverse magnetic field (1044), configured to spin around the spinning axis (1054) and coupled with electrocomponents [e.g. by means of conductive bearings (1058a, 1058b)]. The secondary interface (1051) can be configured to be an electric motor [e.g. by providing a transverse magnetic field between the secondary magnetic conductors (1053) which can be by means of one or more coils (not shown), electromagnets, permanent magnets, etc.]. The secondary electromagnetic interface can be analogically modified as shown e.g. in FIGS. 31, 194 to 197.

FIG. 51 is a perspective illustration of a secondary electromagnetic interface (1061) including a secondary electrical conductor (1062) [which can be one or more conductive discs] oriented substantially perpendicularly to a transverse magnetic field (not shown) and configured to spin around a spinning axis (1064). The secondary interface (1061) can be coupled with electrocomponents [e.g. a bidirectional electromagnetic axle (1068), charging/driving electronics (1078a) which can comprise converter, inverter, rectifier, bidirectional converter, etc., a central processing unit (1078b), a battery management system (1079a), a rechargeable battery pack (1079b), etc.] and can be configured to be an electric motor which can turn in both directions. The system including a primary electromagnetic interface (not shown) can operate on alternating current and on direct current, modulated and unmodulated current, the system can function bidirectionally, the system can wirelessly transfer only power or power with communication or only a communication signal, the system can use regenerative energy recovery, etc.

FIG. 52 is a functional schematic perspective view of another embodiment of a stationary-rotational wireless power transfer system with a primary electromagnetic interface (1081) providing a transverse magnetic field (1084) and with a secondary electromagnetic interface (1091) which can be coupled with electrocomponents [e.g. a charging circuit (1098), a driving circuit (1108) and a rechargeable battery/capacitor pack (1109)]. The primary electromagnetic interface (1081) can be coupled with an onshore track (1087) and the secondary electromagnetic interface (1091) can be coupled with a vehicle (1094) [e.g. an electric vehicle]. The secondary interface (1091) can be configured to be an electric motor.

Figures 53, 54, 55, 56, 57, 58, 59, 60, 61, 62:
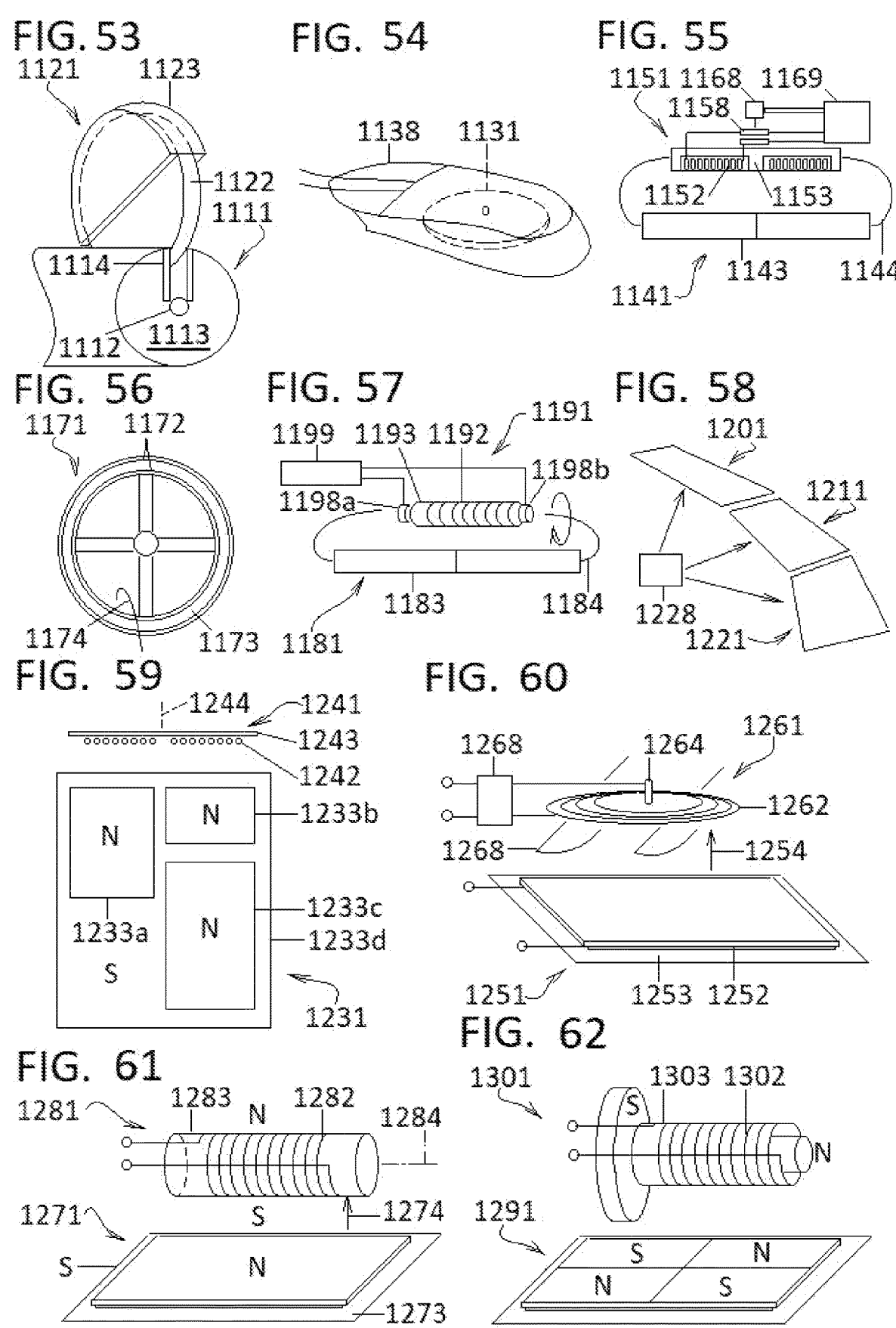
FIG. 53 is a schematic perspective view of another embodiment of a stationary-rotational wireless power transfer system with a secondary electromagnetic interface insertable into a primary electromagnetic interface and provided as a piece of a bodywork.
FIG. 54 is a perspective phantom illustration of a secondary electromagnetic interface according to the present invention coupled with a computer mouse.
FIG. 55 is a functional schematic cross sectional view of another embodiment of a stationary-rotational wireless power transfer system with a secondary interface with a perpendicularly oriented secondary electrical conductor coupled with electrocomponents and an interacting secondary magnetic conductor providing a rotating magnetic field and a radially oriented magnetic field.
FIG. 56 is a frontal view of a secondary interface with perpendicularly oriented secondary electrical conductors and provided in a tire.
FIG. 57 is a functional oblique view of another embodiment of a stationary-rotational wireless power transfer system with a secondary interface with a perpendicularly oriented secondary electrical conductor and an interacting secondary magnetic conductor and coupled with electrocomponents.
FIG. 58 is a functional perspective view of another embodiment of a stationary-rotational wireless power transfer system with separately controllable primary interface sections coupled with an electrocomponent.
FIG. 59 is a frontal/side view of another embodiment of a stationary-rotational wireless power transfer system with a secondary interface with a perpendicularly oriented secondary electrical conductor and an interacting secondary magnetic conductor.
FIG. 60 is a functional schematic oblique view of another embodiment of a stationary-rotational wireless power transfer system with a secondary interface with a perpendicularly oriented secondary electrical conductor and coupled with an electrocomponent.
FIG. 61 is a functional schematic oblique view of another embodiment of a stationary-rotational wireless power transfer system with a secondary interface with a perpendicularly oriented secondary electrical conductor.
FIG. 62 is a schematic oblique view of a variant of the embodiment shown in FIG. 61.

FIG. 53 is a schematic perspective view of another embodiment of a stationary-rotational wireless power transfer system with a primary electromagnetic interface (1111) including one or more primary electrical conductors (1112) [which can be provided in any cross sectional position and which can be coupled with a (high frequency) AC or DC current power source] and including a primary magnetic conductor (1113) (shown in a partial cutout) [which can be from ferrites providing magnetically conductive circular paths] providing a transverse magnetic field (not shown) between electrodes (1114) [which can be from soft ferromagnetic materials, metals, metal alloys] and with a secondary electromagnetic interface (1121) including a secondary electrical conductor (1122) [which can be a coiled wire or one or more discs coupled in series] oriented substantially perpendicularly to the transverse magnetic field between the electrodes (1114) and including a secondary magnetic conductor (1123) [which can be provided at or as a piece of a bodywork, e.g. an electric vehicle wheel arch, etc.] configured to be in at least partial magnetic interaction with the primary magnetic conductor (1113) [e.g. can reduce unwanted eddy currents on the upper part of the secondary electrical conductor (1122)]. The primary electrodes (1114) can induce eddy currents which can boost eddy currents induction in the secondary electrical conductor (1122) and increase the system efficiency. The power transfer system can be bidirectional and the secondary interface (1121) can be configured to be an electric motor [e.g. by providing a transverse magnetic field by the secondary magnetic conductor (1123) and a direct current in the secondary electrical conductor (1122), e.g. between the center and the rim].

FIG. 54 is a perspective phantom illustration of a secondary electromagnetic interface (1131) coupled with an electrocomponent [e.g. a computer mouse (1138)].

FIG. 55 is a functional schematic cross sectional view of another embodiment of a stationary-rotational wireless power transfer system with a primary electromagnetic interface (1141) including a primary magnetic conductor (1143) providing a transverse magnetic field (1144) and with a secondary electromagnetic interface (1151) including a secondary electrical conductor (1152) [which can be a coiled wire] oriented substantially perpendicularly to the transverse magnetic field (1144) and including a secondary magnetic conductor (1153) configured to be in at least partial magnetic interaction with the primary magnetic conductor (1143) and providing a rotating magnetic field and a radially oriented magnetic field. The secondary electrical conductor (1152) can be coupled with electrocomponents [e.g. a conductive bearings (1158), a driving electromotor (1168) and a battery management system with a rechargeable battery (1169)].

FIG. 56 is a frontal view of a secondary electromagnetic interface (1171) including secondary electrical conductors (1172) [which can be a coiled wire in one or more layers which can be provided preferably at a tire thread but can be also provided at any other part of the tire, one or more windings can have a diameter of an overall tire diameter, of a rim diameter, of an inbetween diameter, of a section height or a deflected section height; the windings can be provided during a tire fabrication process, the windings can be inserted into tire layers, e.g. a fabric layer, a rubber tire element, a carcass, a cushion-layer, a tire bead, a bead filler, a radial cord body, an inner liner, a belt ply, a sidewall, a tread, etc.]. The conductors (1172) can be oriented substantially perpendicularly to a transverse magnetic field (1174) and including a secondary magnetic conductor (1173) [e.g. magnetically conductive rubber of the fire].

FIG. 57 is a functional schematic side view of another embodiment of a stationary-rotational wireless power transfer system with a primary electromagnetic interface (1181) including a primary magnetic conductor (1183) providing a transverse magnetic field (1184) and with a secondary electromagnetic interface (1191) including a secondary electrical conductor (1192) [which can be a coiled wire] oriented substantially perpendicularly to the transverse magnetic field (1184) and including a secondary magnetic conductor (1193) configured to be in at least partial magnetic interaction with the primary magnetic conductor (1183). The secondary electrical conductor (1192) can be coupled with electrocomponents [e.g. conductive bearings (1198*a*, 118*b*), a charging/driving power module (1199), etc.].

FIG. 58 is a functional perspective view of another embodiment of a stationary-rotational wireless power transfer system with separately controllable primary interface sections (1201, 1211, 1221) coupled with an electrocomponent (1228) [e.g. a central controller] representing a functional connection between the sections (1201, 1211, 1221). The sections can be separately switched in according to power transfer needs of the entire system [e.g. following an electric vehicle course, an energy supply possibilities and optimalisation, etc.].

FIG. 59 is a frontal/side view of another embodiment of a stationary-rotational wireless power transfer system comprising a primary electromagnetic interface (1231) (shown from a frontal view) including a primary magnetic conductor which can comprise sections (1233*a*, 1233*b*. 1233*c*) which can be interconnected by a common portion (1233*d*) providing magnetically conductive path among the sections (1233*a*, 1233*b*, 1233*e*). The portions (1233*a*, 1233*b*, 1233*c*) and (1233*d*) can have opposite polarity. The system comprising a secondary electromagnetic interface (1241) (shown from a side view) configured to spin around a spin axis (1244) and including a secondary electrical conductor (1242) [which can be a flat coiled wire] oriented substantially perpendicularly to a transverse magnetic field [which can be at least partially oriented perpendicularly to the page] and including a secondary magnetic conductor (1243) configured to be in at least partial magnetic interaction with the primary magnetic conductor. The secondary electrical conductor (1242) can be coupled with electrocomponents (not shown) [e.g. an electronic device to be charged/a laptop/, etc.].

FIG. 60 is a functional schematic oblique view of another embodiment of a stationary-rotational wireless power transfer system comprising a primary electromagnetic interface (1251) including a primary electrical conductor (1252) and a primary magnetic conductor (1253). The system comprising a secondary electromagnetic interface (1261) configured to spin around a spin axis (1264) and including a secondary electrical conductor (1262) oriented substantially perpendicularly to an at least partially transverse magnetic field (1254). The secondary electrical conductor (1262) can be coupled with an electrocomponent (1268) [e.g. charging/driving electronics]. The spinning secondary interface (1261) and the stationary primary interface (1251) can advantageously form an efficace wireless energy (power plus communication) transfer system with high tolerancy to interfaces misalignment. The secondary electromagnetic interface (1261) can thus be coupled with a mobile [e.g. sliding, rotating, etc.] construction (1268).

FIG. 61 is a functional schematic oblique view of another embodiment of a stationary-rotational wireless power transfer system comprising a primary electromagnetic interface (1271) including a primary magnetic conductor (1273) and a secondary electromagnetic interface (1281) configured to spin around a spin axis (1284) and including a secondary magnetic conductor (1283) and a secondary electrical conductor (1282) oriented substantially perpendicularly to a transverse magnetic field (1274). The spinning secondary electrical conductor (1282) coil can act as a dipole antenna in the transverse magnetic field (1274) and can be coupled with electrocomponents (not shown) [e.g. a commutator, a slip ring, conductive bearings, etc.].

FIG. 62 is a schematic oblique view of a variant of the embodiment shown in FIG. 61 with a primary electromagnetic interface (1291) providing a transverse magnetic field and a secondary electromagnetic interface (1301) including a secondary magnetic conductor (1303) [e.g. from a soft magnetic material] providing radially oriented magnetic field and including a secondary electrical conductor (1302) [e.g. a corrugated cylinder] which can be coupled with a secondary electrocomponent (not shown) [e.g. a rectifier].

FIG. 63a is a perspective illustration of a prior art with a partial cutout showing a secondary electromagnetic interface (1311a) including secondary electrical conductors (1312a) [which can be radially oriented coils; each coil can be connected with a controller, a charging unit, a rechargeable power source; the coils can be coupled in series or preferably in parallel, the coils can be coupled with a compensation circuitry/e.g. at least a resonant capacitor/, a rectifier, a filter, etc.] oriented substantially perpendicularly to a magnetic field (1314a) provided by primary coils (not shown).

FIG. 63b is a perspective illustration with a partial cutout of a secondary electromagnetic interface (1311b) including secondary electrical conductors (1312b) [which can be preferably axially oriented coils optionally elastically coupled and having preferably laminated cores which can be from an elastic magnetic material too; the coils (1312b) can be detachable and recyclable] oriented substantially perpendicularly to a transverse magnetic field (1314b) provided by primary coils (not shown) and including a secondary magnetic conductor (1313b) [e.g. magnetically conductive rubber of a tire which can form magnetic poles]. The shown embodiment of the invention represents and advantage in comparison with the prior art of FIG. 63a in a substantially increased tolerance against coils misalignment which can be useful in dynamic charging; in case that the tire follows a track (not shown) it can be always sufficiently aligned with a transverse magnetic field (1314b) provided over the track [e.g. a roadway, a traffic line, a section of the roadway, a sidewalk, etc.]. The shown embodiment can be convenient for applications with a relatively small centrifugal force. In case of relatively important centrifugal force other solutions can be preferably adopted. The tire with the magnetic conductor (1313b) can include magnetically coupling devices [e.g. connectors, hooks, etc.] and the coils (1312b) can be coupled with a rim (not shown) [e.g. attached, detachably attached, incorporated, etc.]. The tire can be airless, tubeless, or with an air chamber. In case that the tire is not puncture proof, it can be provided with an internal material/construction to protect the coils and to reduce the risk of flat tires [e.g. various at least partially filling materials, laminated structures, pendulum like internal supporting structures, etc.; these internal structures can provide secondary magnetic conductors too]. The windings (1312b) may not be perpendicularly oriented in condition that the poles will be magnetically coupled with parts of the magnetic conductor (1313b) to be able to magnetically interact with the transverse magnetic field (1314b).

FIG. 64 is a functional schematic perspective view of another embodiment of a secondary electromagnetic interface (1331) in the proposed stationary-rotational wireless power transfer system comprising a stationary primary electromagnetic interface (1321) [which can be a (relatively planar) charging structure] providing a transverse magnetic field (1324) and the secondary electromagnetic interface (1331) configured to spin around a spin axis (1334) which can change its orientation [e.g. by means of a proposed homokinetic joint motor (1338)]. The shown configuration can be used in the proposed motor embodiments.

FIG. 65 is a functional schematic perspective view of another embodiment of a primary electromagnetic interface (1341) in the proposed stationary-rotational wireless power transfer system including primary magnetic conductors (1343) which can include sections and connections of opposed polarity to provide a transverse magnetic field (not shown) [another preferably even number of sections and connections can be used].

FIG. 66 is a functional schematic oblique view of a secondary interface (1351) in the proposed stationary-rotational wireless power transfer system including a secondary magnetic conductor (1353a) and (1353b) configured to spin around a spin axis (1354), the conductors (1353a, 1353b) providing radially oriented magnetic field and including a secondary electrical conductor (1352).

FIG. 67 is a functional cross sectional view of another embodiment of a stationary-rotational wireless power transfer system comprising a stationary primary electromagnetic interface (1361) providing a transverse magnetic field (1364) and secondary electromagnetic interfaces (1371, 1381) configured to spin around a spin axes (1374, 1384) respective at a distance to induce a current [the interfaces (1371, 1381) can change parameters towards the magnetic field (1364) e.g. position, spinning direction, angular speed, etc. and the embodiment can be used as a sensor].

FIG. 68 is a functional schematic oblique exploded view of another embodiment of a stationary-rotational wireless power transfer system with a primary electromagnetic interface (1391) including a primary magnetic conductor (1393) providing a transverse magnetic field (1394) and with a secondary electromagnetic interface (1401) including a secondary electrical conductor (1402) [which can be a drum] oriented substantially perpendicularly to the transverse magnetic field (1394) and configured to spin around a spin axis (1404) and including a secondary magnetic conductor (1403) configured to be in at least partial magnetic interaction with the primary magnetic conductor (1393) [e.g. to provide a radially oriented magnetic field]. The secondary electrical conductor (1402) can be coupled with electrocomponents (not shown) [e.g. conductive bearings, a sensing circuit, etc.].

FIG. 69 is an oblique view of another embodiment of a stationary-rotational wireless power transfer system with a secondary interface (1411) configured to spin around a spin axis (1414) and including a secondary electrical conductor (1412) [which can be a corrugated conductor] and further comprising a secondary magnetic conductor which can be composed of a relatively rotatable mounted central magnetic portion (1413a) [which can form a coil core] and a peripheral magnetic portion (1413b). [Such an embodiment can be coupled with electric vehicle wheels, tires, etc.]. The shown embodiment can be configured to be an electric motor [e.g. by providing a radial magnetic field between the central portion (1413a) and the peripheral portion (1413b) and an electrical current to the secondary electrical conductor (1412) [e.g. from a direct current source or a rectified alternative current source].

FIG. 70 is an oblique view of a primary interface in the proposed stationary-rotational wireless power transfer system with a primary electromagnetic interface (1421) including a plurality of (independently controllable) primary coils (1422) and a primary magnetic conductor (1423).

FIG. 71 is a functional schematic diagram of a stationary-rotational wireless power transfer system with a primary electromagnetic interface (1431) providing a transverse magnetic field (1434) and a secondary electromagnetic interface (1441) configured to spin around a spin axis (1444) to induce a current in a secondary electrical conductor (1442) which can be coupled with an electrocomponent (1448).

FIG. 72 is an oblique exploded view of a secondary interface (1451) in the proposed stationary-rotational wireless power transfer system including one or more secondary electrically conductive loops (1452*a*, 1452*b*) and one or more secondary magnetic conductors (1453). The secondary electrical conductors (1452*b*) can spin around a spin axis (1454) at a distance from a primary electromagnetic interface (not shown) to induce a current in the secondary electrically conductive loops (1452*b*).

The secondary magnetic conductors (1453) can be interconnected to provide a magnetically conductive path. The secondary electrical conductors (1452*a*) can be coupled with electrocomponents [e.g. slip rings (1458) and driving/charging electronics (1468)]. The secondary electromagnetic interface can be configured to be an electric motor [e.g. by providing a transverse magnetic field and a current to the conductive loops (1452*b*)].

FIG. 73 is an oblique view of a secondary interface (1471) in the proposed stationary-rotational wireless power transfer system including one or more secondary electrically conductive loops (1472) and one or more secondary magnetic conductors (1473*a*, 1473*b*).

FIG. 74 is a functional schematic perspective view of another embodiment of a stationary-rotational wireless power transfer system with a primary electromagnetic interface (1481) including a primary magnetic conductor (1483) [which can be a permanent magnet or a DC or an AC electromagnet] providing a transverse magnetic field (1484) and with a secondary electromagnetic interface (1491) including secondary electrical conductors (1492*a*, 1492*b*) [which can be two parallel (coiled) discs] oriented substantially perpendicularly to the transverse magnetic field (1484), configured to spin around a spin axis (1494) and coupled with secondary electrocomponents (not shown) [e.g. conductive bearings, commutators, coupling nodes, switches, convertors, rechargeable batteries, etc.] and including a secondary magnetic conductor (1493) configured to be in at least partial magnetic interaction with the primary magnetic conductor (583) [e.g. to provide a central magnetic fluxes return path].

FIG. 75 is a functional schematic perspective exploded view of an electric motor (1508) comprising a first portion (1501) and a second portion (1511) mounted to relatively spin around a spin axis (1504). A transverse magnetic field (1514) can be provided between the first and second portions (1501.1511). The second portion (1511) can include one or more magnetic holes (1513) providing low reluctance paths according to the proposed method.

FIG. 76 is a functional schematic cross sectional view of another embodiment of an electric motor (1528) comprising a first portion (1521) and a second portion (1531) mounted to relatively spin around a spin axis (1524). A transverse magnetic field (1534) can be provided between the first and second portions (1521,1531). The second portion (1531) can include one or more magnetic holes (1533).

FIG. 77 is a frontal view of a second portion (1541) of an electric motor to be mounted to relatively spin around a spin axis (1544). The second portion (1541) can include a magnetic hole (1553).

FIG. 78 is a perspective view of another embodiment of a first portion (1561) of another embodiment of an electric motor to comprise a second portion (not shown) to be mounted to relatively spin around a spin axis or to move along the first portion (1561). [The second portion can have form of a disc rolling upon the first portion (1561) or a mover (traveller) sliding upon the first portion (1561).]

FIG. 79 is a perspective illustration of another embodiment of an electric motor (1578) comprising a first portion (1571, 1581) and a second portion (1581, 1591) mounted to relatively move. [The portion (1581) can be configured to act as a first and as a second portion at the same time.] The motor (1578) can be coupled with an offshore vessel (1584) [e.g. as a ship docking actuator].

FIG. 80 is a perspective illustration of another embodiment of an electric motor (1608) coupled with an onshore vehicle (1604) [e.g. as an actuator].

Figures 81, 82, 83, 84, 85A, 85B, 86, 87, 88, 89, 90, 91:
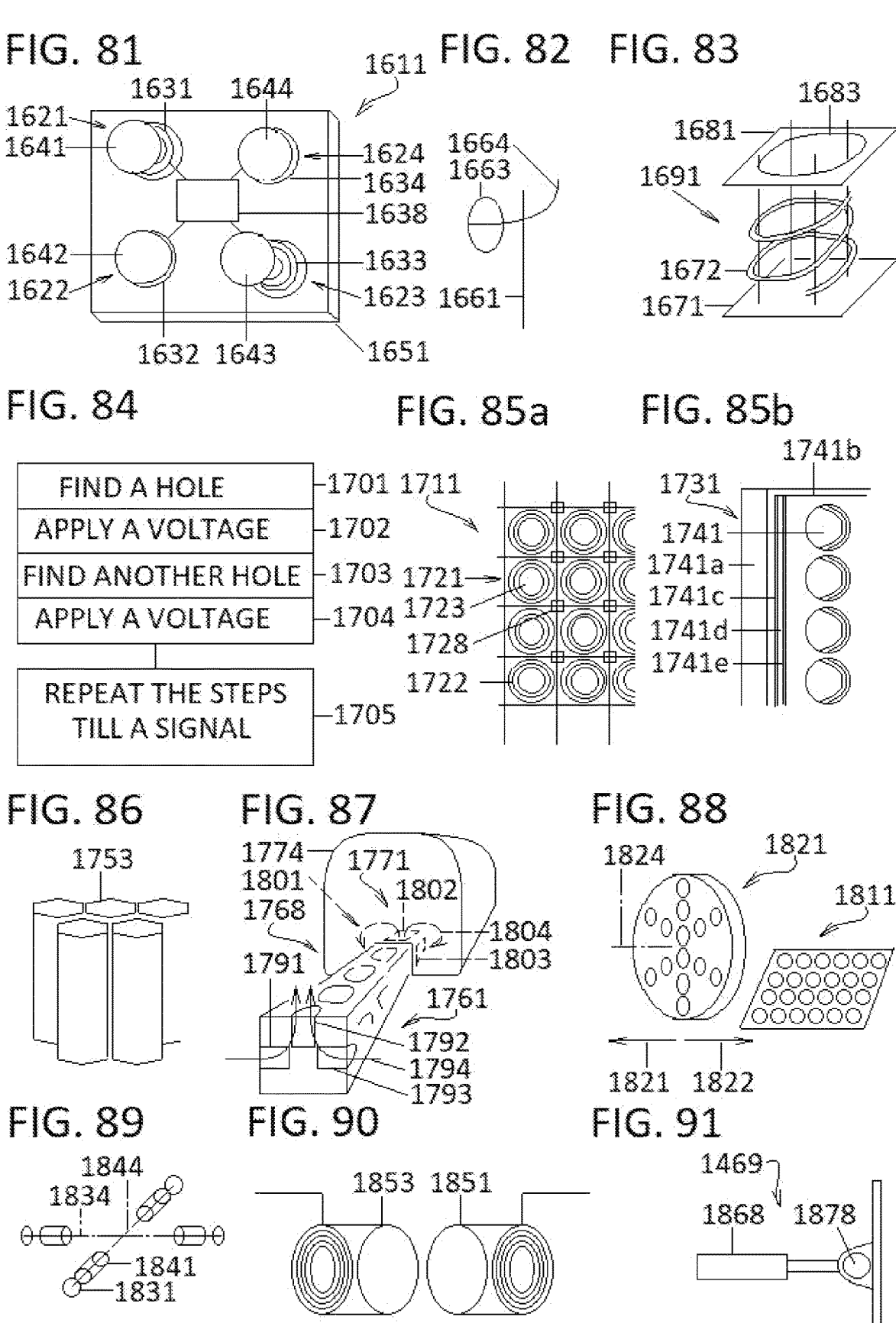
FIG. 81 is a functional perspective illustration of a first portion of an electric motor operable by the proposed method.
FIG. 82 is a functional perspective illustration of a magnetic hole provided in a second portion of an electric motor operable by the proposed method.
FIG. 83 is a functional schematic oblique view of a first and a second portion of an electric motor operable by the proposed method.
FIG. 84 is a process flowchart of a magnetic field driving method for an electric motor according to the present invention.
FIG. 85a is a plan view of a first portion of an electric motor operable by the proposed method.
FIG. 85b is an oblique view of a second portion of an electric motor operable by the proposed method.
FIG. 86 is an oblique view of stackable magnetic holes.
FIG. 87 is a perspective illustration of another embodiment of an electric motor operable by the proposed method, the motor coupled with a track and a track vehicle.
FIG. 88 is a functional schematic perspective illustration of first and second portions of another embodiment of an electric motor operable by the proposed method.
FIG. 89 is a functional schematic perspective illustration of a two axes electric motor operable by the proposed method.
FIG. 90 is an oblique view of an active magnetic hole and an active magnetic point for an electric motor operable by the proposed method.
FIG. 91 is a schematic of an actuator including a linear magnetic field and a rotational magnetic field motors operable by the proposed method.

FIG. 81 is a functional perspective illustration of a first portion (1611) of another embodiment of an electric motor to comprise a second portion (not shown) to be mounted to relatively spin around a spin axis or to move along the first portion (1611) which can provide a transverse magnetic field by means of active magnetic points (1621, 1622, 1623, 1624) [e.g. which can include coils (1631, 1632, 1633, 1634) with magnetic conductors which can form cores (1641, 1642, 1643, 1644). The coils (1631, 1632, 1633, 1634) can be coupled with a controller (1638) which can select to which coil a voltage will be provided; the cores (1641, 1642, 1643, 1644) can be magnetically interconnected [e.g. at a non-coupling side (1651)] to provide a short magnetic return path.

FIG. 82 is a functional perspective illustration of magnetic boles (1663*a*. 1663*b*) provided in a second portion (1661) of another embodiment of an electric motor to comprise a first portion (not shown) to provide a transverse magnetic field (1664) [e.g. by means of magnetic points (not shown)] to be conducted through the magnetic hole (1663).

FIG. 83 is a functional schematic oblique view of a structure which can perform the proposed magnetic field driving method for an electric motor comprising the steps of finding one or more magnetic holes (1683) in a second portion (1681) of the electric motor, the portion mounted to relatively spin around a spin axis or to relatively move in at least one direction, the magnetic holes providing a low reluctance path for a magnetic field; applying one or more voltages to one or more magnetic points (1691) [e.g. by means of one or more windings (1672) to provide magnetic field (1674), the magnetic points (1691) provided on a coupling side of a stationary first portion (1671) of said electric motor; other magnetic holes can be found and voltage can be applied to other magnetic points, the steps can be repeated till a signal.

FIG. 84 is a process flowchart of a magnetic field driving method according to the present invention, the process comprising steps of finding one or more magnetic holes [e.g. magnetic conductors, etc.] in a second portion of an electric motor, the portion mounted to relatively spin around a spin axis or to relatively move in at least one direction, the one or more magnetic holes providing a low reluctance path for a magnetic field (1701); applying one or more voltages [e.g. to one or more coils] to one or more magnetic points to provide the magnetic field [which can be transverse or longitudinal, i.e. perpendicular or parallel to the line of movement], the one or more magnetic points provided on a coupling side of a stationary first portion of the electric motor (1702): finding another one or more magnetic holes (1703) [which can be in any position to the first magnetic holes including an identical position for providing the magnetic fields with different parameters]; applying the voltage to another one or more magnetic points (1704) [the other created magnetic field can have a different strength, frequency, spatial derivatives, magnetic field induction vectors, etc., a different voltage with different frequency can be applied and can have a different polarity, whereas it can be preferable in some designs to provide an opposite vector magnetic field to provide a return magnetic path; the first magnetic field and the second magnetic fields can be applied sequentially or simultaneously, more magnetic points and magnetic holes can be activated simultaneously or sequentially, the numbers of activated magnetic points and magnetic holes may not match]. The steps can be repeated till a signal be applied (1705) [e.g. a stop signal, a discontinuity signal, a disruption signal, a change mode signal, etc.]. In case that a position of respective magnetic points and magnetic holes can be different [e.g. shifted, misaligned, etc.], magnetic force between the closest magnetic points and magnetic holes can cause relative movement between the first and second portions to maximize the inductance of the excited phase of the magnetic points. In case that the magnetic hole is an electrical conductor, the transverse magnetic field can induce eddy currents producing thrust force which can relatively move the first portion and the second portion. The magnetic hole can actively produce attracting or repulsing magnetic field force [e.g. by means of a winding]. The movement can be rotational, translational, or both. The deployment (pattern) of the magnetic holes and magnetic points in respective second and first portions of a specific electric motor [which can be rotational motors, linear motors, irregular trajectory motors, planar motors of various motion trajectories, actuators of different types, etc.] may not be the same. The specific deployment can depend upon various designs, applications, utilizations, etc. The holes and points patterns can include unique pairs (or groups) for each (unique) position of first and second portions. The specific designs may provide more ways [e.g. having different time, space, effort, etc., parameters] to a desired position. Various (programmable) algorithms can be used. Typically the first portion (stator) and the second portion (rotor or mover, traveller) designs of the transverse or longitudinal magnetic field motors operable by the proposed method can form networks, areas of various geometrical two-dimensional shapes [e.g. squares, rectangles, trapezoids, parallelograms, rings] or three-dimensional forms [e.g. cones, spheres, egg forms, etc.].

The step of finding a magnetic hole can consist of providing an unique design and position information about one or more magnetic holes to be found in a second portion of an electric motor to provide a low reluctance path for a magnetic field which can be provided in the second step by one or more magnetic points by applying one or more voltages. The steps can be repeated till a signal-which process can provide relative spinning or moving in at least one direction between the first and second portions. A processing unit can be provided with the information about design of magnetic points and magnetic holes [e.g. position, electrical parameters, magnetic parameters, etc.] and about true position, final position, interim position, desired rapidity of movement, direction, acceleration, deceleration, etc. The processing unit can calculate parameters of relative movement and successively apply the proposed process successively activating desired magnetic holes till a signal which can bring another information to the successive process (e.g. to stop, to change movement parameters, etc., the signal can be composed of a carrier signal ensuring a motor's activity and a movement of a driven device and of a modulated signal/e.g. amplitude/frequency modulation/ ensuring a secondary activity of a driven device which can be coupled with the second portion/e.g. performing a task during a journey such as machining, painting, detection, surface coating, finishing, etc.]. The power and data transfer can be provided by separate power and communication channels, wired or wireless interfaces. Various communication protocols can be used. The proposed method can activate various points (groups of points) to "activate" (find) desired one or more magnetic holes. The machine which can perform the proposed process can in the proposed magnetic points network (randomly) choose (activate) different patterns of multiple magnetic points in one or more first portions to produce a variety of movements of one or more second portions comprising the magnetic holes.

FIG. 85$a$ is a plan view of a first portion (1711) [which can be planar as shown or 3D modelled] of another embodiment of an electric motor to comprise a second portion (not shown) to be mounted to relatively spin around a spin axis or to move along the first portion (1711) which can provide a magnetic field by means of active magnetic points (1721) which can include coils (1722) and magnetic conductors (1723) [which can form coil cores and/or backing plates]. The coils (1722) can be coupled with switches (1728) [which can be etched, coupled, connected, provided by printed circuit boards techniques, etc.] to apply a voltage to a particular coil or a pair of coils or a group of coils, etc.

FIG. 85$b$ is an oblique view of a second portion (1731) which can provide a lower reluctance path for a magnetic field by means of magnetic holes (1741) which can include a base layer (1741$a$) [which can include a magnetic conductor, a coil and/or an electrical conductor] and a mask (1741$b$) defining the magnetic holes (1741) [the mask (1741$b$) can be of a layered construction composed for example of a carbon sheet (1741$c$), a metallic or polymer supporting core (1741$d$) and another carbon sheet (1741$e$)].

FIG. 86 is an oblique view of magnetic holes (1753) in a stackable configuration [others are possible: polygons, quadrilaterals, squares, rectangles, pentagons, prolongated shapes, slotted shapes, etc.]

FIG. 87 is a functional schematic perspective illustration of an electric motor (1768) comprising a first portion (1761) which can provide a primary magnetic field with a primary magnetic flux (1794) by means of active magnetic points (1791, 1792, 1793) provided on respective coupling sides of the first portion (1761) and comprising a second portion (1771) which can provide a low reluctance path by means of magnetic holes (1801, 1802, 1803) [which can be magnetic conductors and which can be passive, e.g. comprised of soft or hard magnetic material and/or active, e.g. provided by preferably cored coils, coils with backing magnetic plates, etc.] which can provide a secondary magnetic field with a secondary magnetic flux (1804). The second portion (1771) can be mounted to a track vehicle (1774) to relatively move along the first portion (1761) in two opposite directions. The motor (1768) can be operable by the proposed method [e.g. can be controlled by a primary controller/secondary controller, a joined controller which can activate magnetic points to "find" magnetic holes, i.e. to provide various modes, e.g. a driving mode, a lifting force mode, a braking mode, a sustaining drive parameters mode, guiding mode, etc.; the controller can independently choose different groups of magnetic points (1791, 1792, 1793) to perform a specific task]. The shown system can be provided off shore and coupled with a waterway track and a water vessel, respective. The system can be provided inversely wherein a first portion can be coupled with a vehicle/water vessel and a second portion with a track/waterway track (not shown).

FIG. 88 is a functional schematic perspective illustration of a first portion (1811) of another embodiment of an electric motor comprising a second portion (1821) to be mounted to relatively spin around a spin axis (1824) and to move along the first portion (1811) in two opposite directions (1821, 1822).

FIG. 89 is a functional schematic perspective illustration of another embodiment of an electric motor comprising a first portion including magnetic points (1831) and a second portion comprising magnetic holes (1841) to be mounted to relatively spin around spin axes (1834, 1844).

FIG. 90 is a perspective view of an active magnetic hole (1853) (shown in phantom) [which can comprise means to control magnetic conductivity, e.g. shielding, coil, core, etc.] and an active magnetic point (1851) (shown in phantom).

FIG. 91 is a schematic of an actuator (1869) including a linear electric motor (1868) and a rotational electric motor (1878).

FIG. 92 is a schematic partial plan view of another embodiment of an electric motor comprising a first portion (1881) and a second portion (1911) mounted to relatively spin around a spin axis. The first portion (1881) can provide a magnetic field by means of active magnetic points (1891, 1892, 1893) and can provide a short magnetic return path (1901). The second portion (1911) can provide one or more active or passive magnetic holes (not shown) preferably distributed around the perimeter. The first and second portions (1881, 1911) can be provided with side shieldings (1886, 1916) [e.g. aluminium sheets].

FIG. 93 is a cross sectional view of the magnetic field motor shown in FIG. 92 taken along the line A-Á.

FIG. 94 is a plan view of an electric motor (1928) coupled with a directional antenna system (1929) to be rotatably mounted to a support (not shown).

FIG. 95 is a schematic plan view of another embodiment of an electric motor (1938) comprising a first portion (1941) and a second portion (1951) mounted to relatively spin around a spin axis (1954). The first portion (1941) can provide a magnetic field by means of active magnetic points (1961, 1962, 1963, 1964) and can provide a magnetic field guide (1971). The second portion (1951) can provide at least one active or passive magnetic hole (1953) [which can have shaped ends] which can be provided in a non magnetic material (1957) [e.g. a polymer, a non magnetic metal for some applications and frequencies, an air gap, a 2D shape or 3D form provided with a metallic surface, etc.] which can have shielding properties. The first and second portions (1941, 1951) can optionally have multiple axes of relative rotation [e.g. at least three cartesian x, y and z-axes] so that a three degrees of freedom joint can be provided.

FIG. 96 is a schematic detailed plan view of another embodiment of an electric motor comprising a first portion (1981) and a second portion (1991) mounted to relatively spin around a spin axis (not shown). The first portion (1981) can provide a magnetic field by means of active magnetic points (2001, 2002, 2003); only points in one level shown, other points can be provided in levels parallel with the page, e.g. superior and inferior, to be able to rotate the second portion (1991) around an axis of rotation (2004). The second portion (1991) can provide at least one magnetic hole (1993) [which can have enlarged ends].

FIG. 97 is a functional schematic perspective view of another embodiment of an electric motor (2018) comprising a first portion (2021) and a second portion (not shown, provided inside) mounted to relatively spin around a spin axis (2024) and to move an actuator (2019) in a plurality of directions (2011).

FIG. 98 is a schematic perspective view of another embodiment of an electric motor (2038) comprising a first portion (2031) and a second portion (2041). The first portion (2031) can provide a magnetic field by means of active magnetic points (not shown, which can be provided on an inner surface in a convenient pattern, meshwork, lines, etc.). The second portion (2041) can provide one or more active or passive magnetic holes (not shown) which can have ends on an outer surface of the second portion (2041) in convenient patterns, meshworks, bent shapes, lines (2043), etc. The first and second portions (2041, 2051) can have multiple axes of relative rotation so that a three degrees of freedom joint can be provided. The first portion can provide the magnetic points on a spherical surface [e.g. can form a semispherical socket] and similarly the second portion can provide one or more magnetic holes' ends on a spherical surface [e.g. can form a spherical ball]. The magnetic holes can form at least one magnetic path between two magnetic points. The magnetic holes can be interlaced, bent, provide a complete meshwork providing magnetic path between magnetic holes ends. The ends can be provided on opposite sides of the spherical ball, at an immediate vicinity defined by a narrow spatial angle thus forming short magnetic paths, at quadrants, can be ramificated, etc., according to particular applications. The patterns of magnetic holes and the patterns of magnetic poles does need to correspond, optionally the patterns can be formed according to specific algorithms to provide defined or undefined number of unique positions. A controller can activate the active magnetic points/holes. The controller can successively activate points/holes pairs or groups to reach the extremes positions of the joint. The system can provide a complete control over the freedom spherical joint.

FIG. 99 is a schematic perspective view of another embodiment of an electric motor (2058) comprising a first portion (2051) and a second portion (2061) mounted to relatively spin around a spin axis (2064). The first portion (2051) can provide a magnetic field by means of active magnetic points (2052) [which can be coils with cores and which can be provided with a sinusoidal or non-sinusoidal (switched) signal; the coils can be covered by cooling ribs (not shown); the rib structures can provide a return magnetic path between the coils]. The second portion (2061) can provide at least one magnetic hole (2063) [which can be soft magnetic material laminated structures/e.g. from laminated silicon steel/, permanent magnets, inserted fins from a magnetic material, iron sheets, low reluctance paths, etc., the lamination can have various shapes-transverse, various forms of quadrants, the lamination can include bridges, webs, magnets, flux guides, flux barriers, nonmagnetic material, magnetically insulating material/air/, etc., the lamination can be preferably in a direction parallel to the spin axis (2064) and/or in a direction perpendicular, the lamination can be (multi-) crossed in different ways]. The first and second portions (2051, 2061) can provide a homokinetic joint electric motor [e.g. directly couplable with driving wheels in electric vehicles, etc.]. The first and second portions (2051, 2061) can be spherical, aspheric, conical, egg-shaped, etc.

FIG. 100 is a schematic side view of another embodiment of an electric motor (2078) operable by the proposed method which can be provided in an electric vehicle charging station (2079) [e.g. in a cooling circuit which can include a dryer/separator, a compressor with the motor (2078), a condenser, a thermostatic expansion valve, sensors, etc.] cooling a charger (2088) [which can include a central processing unit and a controller controlling the motor (2078)] and cooling a charging cable (2089) by means of another cooling circuit [which can include sensing circuits connected with the controller, etc.]. Any other thermal management system using the motor (2078) [e.g. as a coolant pump] can be used. [Alternatively, the electric motors as shown in FIGS. 176*b* and 194 to 197 can be provided as compressors].

FIG. 101 is a schematic perspective illustration of another embodiment of an electric motor (2098) which can be coupled with a pump and provided in a fuel supply system of an internal combustion engine car. The motor can be controlled by a controller (2108) which can be coupled with a sensor (2109). The proposed motor can be used in others heat engine applications [e.g. in a compression-ignition engine as a high-pressure compressor, etc.]

FIG. 102 is a schematic perspective view of another embodiment of an electric motor (2118) comprising a first portion (2111) and a second portion (2121) mounted to relatively spin around a spin axis (2124). The first portion (2111) can provide a transverse magnetic field [i.e. perpendicular to the line of movement] and a longitudinal magnetic field [i.e. parallel to the line of movement] by means of active magnetic points (not shown) [which can be coils and which can be provided single-sided and double sided] The second portion (2121) can provide magnetic holes (not shown) [which can provide parallel and perpendicular lower reluctance paths (not shown)].

FIG. 103 is a schematic oblique view of another embodiment of electric in-wheel motors (2148) which can be coupled with a vehicle central controller (2149) and provided in a mobile system wherein the controller (2149) can directly and independently control the in-wheel motors (2148) thus distributing the torque and braking effort. The system can be programmed to act as open differential, locked differential, active differential, limited slip differential, to provide a traction and braking control system, etc. The system can be provided in an all-wheel drive.

FIG. 104 is a partial perspective illustration of another embodiment of an electric motor (2158) comprising a first portion (2151) and a second portion (2161) mounted to relatively spin around spin axes [e.g. at least three cartesian x, y and z-axes so that a three degrees of freedom traveller (2168) can be provided.

Figures 105, 106, 107, 108, 109, 110, 111, 112, 113, 114, 115:
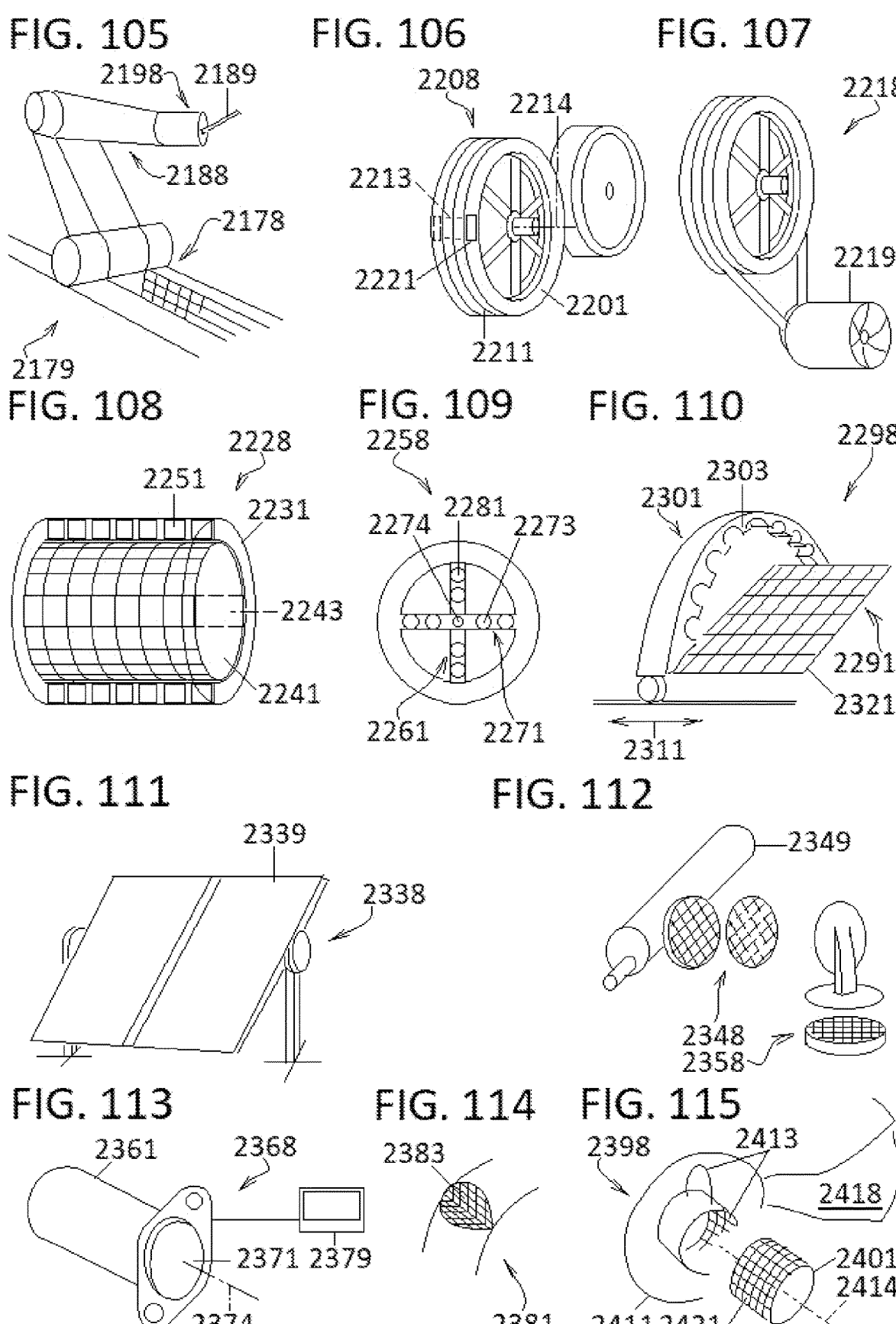
FIG. 105 is a perspective illustration of other embodiments of electric motors operable by the proposed method and coupled with a robotic arm.
FIG. 106 is a schematic perspective view of other embodiments of electric motors operable by the proposed method with peripherally situated magnetic points and magnetic holes.
FIG. 107 is a schematic perspective view of another embodiment of an electric motor operable by the proposed method and configured to be an electricity generator.
FIG. 108 is a schematic perspective view of another embodiment of a cylindrical shaped electric motor operable by the proposed method.
FIG. 109 is a schematic plan view of another embodiment of an electric motor operable by the proposed method with crossed first and second portions.
FIG. 110 is a schematic plan view of another embodiment of an electric motor operable by the proposed method with distant first and second portions.
FIG. 111 is a perspective illustration of another embodiment of an electric motor operable by the proposed method and driving solar panels.
FIG. 112 is a perspective exploded view of another embodiment of electric motors operable by the proposed method and driving an astronomical telescope.
FIG. 113 is a functional schematic perspective view of another embodiment of an electric motor operable by the proposed method with a spinning and sliding second portion.

FIG. 105 is a perspective illustration of other embodiments of electric motors (2178, 2188, 2198) which can be coupled with a robotic arm (2179) with an actuator (2189).

FIG. 106 is a schematic perspective view of other embodiments of electric motors (2208) comprising a first portion (2201) and a second portion (2211) mounted to relatively spin around a spin axis (2214). The first portion (2201) can provide a transverse magnetic field by means of active magnetic points (2221). The second portion (2211) can provide one or more magnetic holes (2213).

FIG. 107 is a schematic perspective view of another embodiment of an electric motor (2218) coupled with a pump/turbine (2219) and configured to be a generator [the motor (2218) operable according to the proposed method can act as a generator generating an electric current in at least one of first and second portions (not shown)].

FIG. 108 is a schematic perspective view of another embodiment of an electric motor (2228) comprising a first portion (2231) (shown in a partial cutout) and a second portion (2241) mounted to relatively spin around a spin axis. The first portion (2231) can provide a magnetic field [which can be transverse, longitudinal, symmetric, asymmetric, rotating, etc.] by means of active magnetic points (2251). The second portion (2241) can provide one or more magnetic holes (2243).

FIG. 109 is a schematic plan view of another embodiment of an electric motor (2258) comprising a first portion (2261) (partially hidden) and a second portion (2271) mounted to relatively spin around a spin axis (2274). The first portion (2261) can provide a magnetic field by means of active magnetic points (2281). The second portion (2271) can provide one or more magnetic holes (2273).

FIG. 110 is a schematic plan view of another embodiment of an electric motor (2298) comprising a first portion (2291) and a second portion (2301) mounted to relatively move in defined directions (2311). The first portion (2291) can provide a transverse magnetic field by means of active magnetic points (2321). The second portion (2301) can provide magnetic holes (2303) [e.g. at defined positions and distances].

FIG. 111 is a perspective illustration of another embodiment of an electric motor (2338) which can be coupled with a with solar panels (2339) [or analogically with an adjustable wind or water current turbine, etc.].

FIG. 112 is a perspective exploded view of another embodiment of electric motors (2348, 2358) which can be coupled with an astronomical telescope (2349) [or a microscope, etc., others than the shown embodiment are possible to drive various instruments, devices, apparatuses].

FIG. 113 is a functional schematic perspective view of another embodiment of an electric motor (2368) comprising a first portion (2361) [which can be coupled with a body, a support construction, an actuator, etc.] and a second portion (2371) [which can be coupled with a sprocket, a wheel, an actuator, etc.] mounted to relatively spin/slide around a spin axis (2374). The first portion (2361) can provide a magnetic field by means of active magnetic points (not shown). The second portion (2371) can provide one or more magnetic boles (not shown). The motor (2368) can be coupled with a programmable controller (2379) [which can combine spinning and sliding movement to desired patterns which can be used in various robotic, actuator, PC-assisted applications, active vehicle suspensions/e.g. with various programmable modes/, etc.].

FIG. 114 is a perspective view of a second portion (2381) (shown in a partial cutout) which can provide magnetic holes (2383) [in convenient 3D patterns, meshworks, lines, etc.].

FIG. 115 is a partial perspective exploded view of another embodiment of an electric motor (2398) comprising a first portion (2401) and a second portion (2411) mounted to relatively spin around a spin axis (2414). The first portion (2401) can provide a magnetic field by means of active magnetic points (2421) [which can be controlled by a controller (not shown)]. The second portion (2411) can provide magnetic holes (2413) [e.g. at defined distances, 3D forms, patterns, etc.]. The second portion can be coupled with propeller blades (2418). The system can function under water, in stratosphere, in normal atmospheric pressure, etc. The holes (2413) can be passive or active. Active holes can be provided with controlling means [e.g. switching array similarly as shown in FIG. 85]. Control information for the controlling means can be provided preferably wirelessly [e.g. by a communication interface or by means of the simultaneous wireless power transfer and data communication via the first portion (2401)]. The active holes meshwork can change routes for different motor modes [e.g. a starting, full load, braking, regenerative modes, etc.]. The controller can switch various combinations of magnetic points (2421) which can activate various magnetic holes (2413) [e.g. for starting mode, full load mode, etc.].

Figure 116:
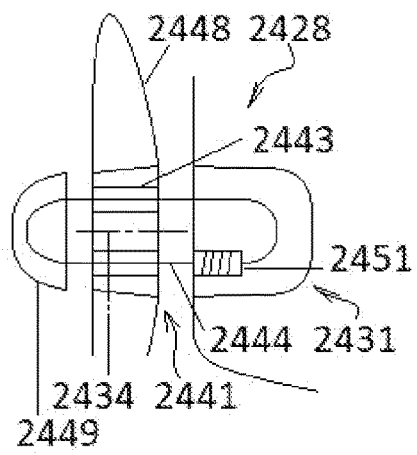

FIG. 116 is a functional schematic cross sectional view of another embodiment of an electric motor (2428) comprising a first portion (2431) and a second portion (2441) mounted to relatively spin around a spin axis (2434). The first portion (2431) can provide a (circulating) transverse magnetic field (2444) by means of active magnetic points (2451) [which can include coils with cores controlled by a controller (not shown)]. The second portion (2441) can provide magnetic holes (2443) providing a low reluctance path for the transverse magnetic field (2444). The second portion (2441) can be coupled with propeller blades (2448). The system can provide a cap (2449) providing a short magnetic flux return path. Another magnetic flux return path can be provided in the first portion (2431) [the both magnetic flux return paths can be provided by various structures, e.g. laminated structures, magnetically conductive materials such as magnetic metals, ferrites, insulated magnetical conductors of various cross sections, etc.].

Figure 117:
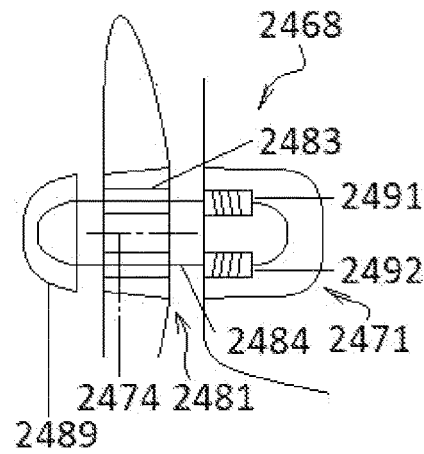

FIG. 117 is a functional schematic cross sectional view of another embodiment of an electric motor (2468) comprising a first portion (2471) and a second portion (2481) mounted to relatively spin around a spin axis (2474). The first portion (2471) can provide a transverse magnetic field (2484) by means of active magnetic points (2491, 2492) [which can include coils]. The second portion (2481) can provide magnetic holes (2483). The system can provide a cap (2489) providing a short magnetic flux return path. Another magnetic flux return path can be provided in the first portion (2471).

Figure 118:
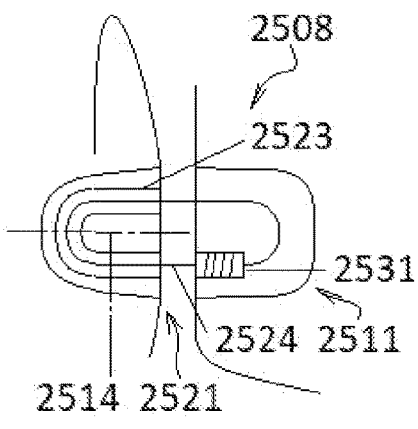

FIG. 118 is a functional schematic cross sectional view of another embodiment of an electric motor (2508) comprising a first portion (2511) and a second portion (2521) mounted to relatively spin around a spin axis (2514). The first portion (2511) can provide a travelling magnetic field (2524) by means of active magnetic points (2531). The second portion (2521) can provide magnetic holes (2523). A magnetic flux return path can be provided in the first portion (2511).

Figure 119:
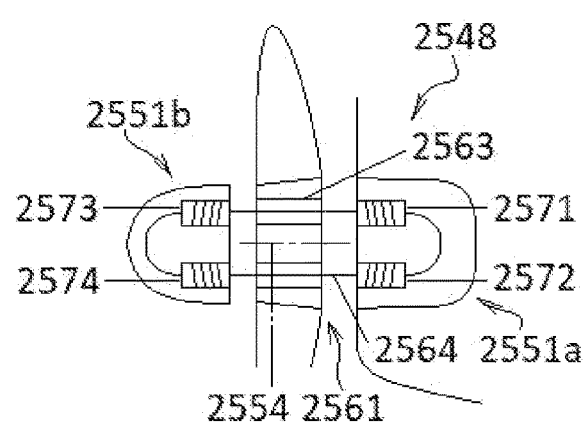

FIG. 119 is a functional schematic cross sectional view of another embodiment of an electric motor (2548) comprising a first portion (2551a, 2551b) and a second portion (2561) mounted to relatively spin around a spin axis (2554). The first portion (2551a, 2551b) can provide a transverse magnetic field (2564) by means of active magnetic points (2571, 2572, 2573, 2574) [which can be controllable coils]. The second portion (2561) can provide magnetic holes (2563). The first portion (2551a, 2551b) can provide magnetic flux return paths.

Figure 120:
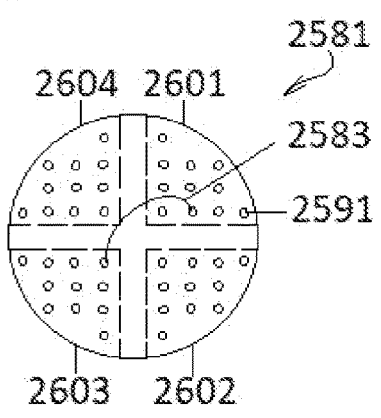

FIG. 120 is a functional schematic oblique view of a first portion (2581) of an electric motor. The first portion (2581) can provide magnetic points (2591) which can be functionally divided into groups (2601, 2602, 2603, 2604) which can be activated successively to provide a rotating magnetic field [e.g. by sinusoidal or non-sinusoidal waveforms]. The shown embodiment can be an example that a set of the magnetic points can be subdivided into various functional groups which can be switched in various ways and in different polarities according to specific embodiments, preferably in a way to provide a short magnetic flux return path (2583).

Figure 121:
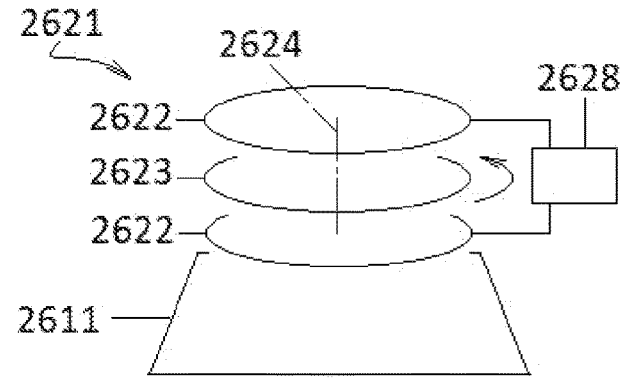

FIG. 121 is a schematic perspective illustration of an embodiment of a stationary-rotational wireless power transfer system which can comprise a secondary electromagnetic interface (2621) which can include secondary electrical conductors (2622) which can be coupled with an electrocomponent (2628) [which can be a converter, a rechargeable power source, a controller, a switch, etc.] and can further comprise a spinning secondary magnetic conductor (2623) configured to be in a magnetic interaction with the primary magnetic conductor (2611) [e.g. can provide polarization of a transverse magnetic field in near field] to induce a current in the secondary electrical conductors (2622). The secondary magnetic conductor (2623) can change the direction of rotation or can rotate in one direction, in the latter case the spin axis (2624) can interconnect the secondary electrical conductors (2622). The secondary interface (2611) can be coupled with a flywheel (not shown) or other mechanical component [e.g. gears, a sprocket, a shaft, a motor, etc.].

FIG. 122 is a schematic perspective illustration of an embodiment of a stationary-rotational wireless power transfer system which can comprise a secondary electromagnetic interface (2641) which can include secondary electrical conductors (2642) coupled with an electrocomponent (2648) and a secondary magnetic conductor (2643) spinning at a distance from a primary magnetic conductor (2631). The secondary interface (2641) can further comprise another secondary interacting magnetic conductor (2653) [which can be replaced or supplemented with a shielding (not shown)].

FIG. 123 is a schematic perspective illustration of an embodiment of a stationary-rotational wireless power transfer system which can comprise a (buoyant) stationary primary electromagnetic interface (2661) including one or more primary magnetic conductors (2663) and optionally sections and connections (not shown). The system can comprise a secondary electromagnetic interface (2671) including a spinning secondary magnetic conductor (2673) and secondary electrical conductors (2672) [which can be coiled wires, discs, radial conductive paths, etc.]. The secondary interface (2671) can be coupled with a vehicle or water vessel (not shown) and the primary interface (2661) can be coupled with an onshore track or a waterway track (not shown), respective. The system can be provided with an insulation and an outer magnetic/shielding part of the primary/secondary interfaces similarly as shown in FIG. 122. The system can wirelessly transfer electromagnetic energy in direct current and alternating current modes, respective direct magnetic field and alternating magnetic field modes [e.g. using power amplifying systems as described in FIG. 31.

FIG. 124 is a schematic perspective illustration of another embodiment of a stationary-rotational wireless power transfer system which can comprise a stationary primary electromagnetic interface (2681) which can be coupled with an onshore track (not shown) [e.g. a tarmac] and a secondary electromagnetic interface (2691) which can be coupled with a vehicle [e.g. provided in an airplane wing (2698) or other part].

FIG. 125 is a schematic perspective illustration of another embodiment of a stationary-rotational wireless power transfer system which can comprise a stationary primary electromagnetic interface (not shown) which can be coupled with any convenient construction [a street furniture, a furniture, a vehicle, a vessel, etc.] and a secondary electromagnetic interface (2701) which can be coupled with a piece of clothing [e.g. a chook (2708)].

FIG. 126 is a functional schematic oblique view of an embodiment of of a stationary-rotational wireless power transfer system which can comprise a secondary electromagnetic interface (2721) which can include a secondary electrical conductor (2722) configured to spin around a spin axis (2724) and which can be disc shaped with flanges to effectively concentrate a transverse magnetic field (2714) provided by a primary electromagnetic interface (not shown).

FIG. 127 is a perspective illustration of an embodiment of a stationary-rotational wireless power transfer system which can comprise a secondary electromagnetic interface (not shown) [which can be coupled with a portable or mobile electronics, pieces of clothing, robots, drones, electronic equipment of works, hospitals, schools, etc.] and which can comprise a primary electromagnetic interface (2731) [which can be provided as charging modules, active panels, etc.] and which can be provided at a building construction (2734) [e.g. engineering constructions such as walls, floors, ceilings, beams, sunroofs, marquees, etc.].

FIG. 128 is a perspective illustration of an embodiment of a stationary-rotational wireless power transfer system which can comprise a secondary electromagnetic interface (not shown) [which can be coupled with rechargeable electronics, etc.] and which can comprise a primary electromagnetic interface (2741) [which can be provided as a portable module] which can be provided on a supporting construction (2744) [e.g. a piece of furniture, etc.].

FIG. 129 is a schematic perspective view of an air/liquid turbine (2758) with a shaft (2754) which can provide or be coupled with a spin axis of a secondary electromagnetic interface (not shown).

FIG. 130 is a schematic perspective illustration of an embodiment of a stationary-rotational wireless power transfer system which can comprise a secondary electromagnetic interface (2761) which can include secondary electrical conductors (2762) and a secondary magnetic conductor (2763) configured to spin around a spin axis (2764) and which can be provided with a thermal management system (2766) [e.g. air cooling structures like fins, holes, blades, hollow structures or liquid cooling structures like coolant conduits, heat exchangers, chillers, radiators or phase change materials containing structures, etc.]. Similarly spinning electrical conductors or other system components can be provided with air/liquid/phase change thermal management systems. A primary electromagnetic interface (not shown) can be provided from either or both sides of the secondary electromagnetic interface.

FIG. 131 is a schematic perspective illustration of an electric piston engine (3008) comprising: at least one piston (3001) coupled with a coupling mean (3002) and guided by a guiding mean (3003), said engine characterised in that a winding (3004) is provided at least partially around said guiding mean (3003), wherein an electrical current provided into said winding (3004) forces the piston (3001) to move along the guiding mean (3003).

FIG. 132 is a functional schematic perspective illustration of an electric piston engine (3018) comprising a piston (3011) coupled with a coupling mean (3012) [e.g. a connecting rod] and guided by a guiding mean (3013) [e.g. a cylinder]. A winding (3014) [e.g. from a wire] can be provided at least partially around the cylinder (3013). An alternating electrical current can be provided from a current source (3015) into the winding (3014) to force the piston (3011) to move in the cylinder (3013).

FIG. 133 is a functional schematic cross sectional view of an electric piston engine (3028) [which can be a flat twin engine either of a new construction or provided by a conversion from an existing IC engine] comprising pistons (3021) [which can be provided with a piston winding (3027) and which can be provided with various types of piston rings, preferably at least wiper and oil rings in case that the engine (3028) can use an oil lubrication/e.g. a splash system, a dry sump system, a pressure system/; oil free designs and materials/e.g. bearings, cylinder sleeves, pistons, piston rings, etc./are contemplated as well] coupled with connecting rods (3022) and guided by guiding means (3023) [e.g. a cylinder inner wall, a sleeve, etc.]. A winding (3024) [e.g. from a wire] can be provided at least partially around the guiding means (3023) [e.g. by means of cylinder boring/sleeving, etc.]. An alternating electrical current can be provided from a current source (not shown) into the winding (3024) to force the piston (3021) to move in the cylinder (3023). A liquid cooled electric piston flat-four (boxer-four, horizontally opposed-four) engine can be a good and balanced option for electric vehicles, electric water vessels. An air cooled electric piston flat-six engine can be advantageously used in electric aircrafts and helicopters.

FIG. 134 is a functional schematic cross sectional view of an electric piston engine (3038) [which can be a straight-4 engine] comprising pistons (3031) [which can be provided with one or more piston windings with cores (not shown)] coupled with connecting rods (3032) and guided by guiding means (3033). A winding (3034) can be provided at least partially around the guiding means (3033). In-line electric piston engines can be advantageously used in electric vehicles, water vessels, aircrafts, helicopters, etc.

FIG. 135 is an isometric diagram of an electric piston engine (3048) [which can be a V6 engine] comprising pistons (3041) coupled with connecting rods (3042) and guided by guiding means with provided windings (not shown).

FIG. 136 is a diagram of a 90° twin electric piston engine (3058) comprising pistons (3051) coupled with connecting rods (3052) and guided by guiding means with provided windings (3054) [which can be 90° out of phase].

FIG. 137 is a diagram of a 4 cylinder electric piston radial engine (3068) comprising pistons coupled with coupling means (not shown) and guided by guiding means with provided windings (3064) [which can be single-phase].

FIG. 138 is a diagram of a 3 cylinder electric piston radial engine (3078) comprising pistons coupled with coupling means (not shown) and guided by guiding means with provided windings (3074) [which can be three-phase].

FIG. 139 is a diagram of a 3 cylinder electric piston rotary engine (3088) comprising pistons (3081) coupled with connecting rods (3082) and guided by guiding means (3083) [e.g. rotating cylinders] with provided windings (3084) which can be connected to stationary electrocomponents [e.g. power electronics, a rechargeable power source, sensing circuits, etc., e.g. by means of slip rings, brushes, conductive bearings which can be coupled to a stationary crankshaft, wireless power transfer by means of coupling coils, capacitors, electromagnetic interfaces can be contemplated.]. The engine (3088) can include generally odd number of cylinders or can be a two row type. Electric piston rotary engines can be advantageously used in aircrafts, helicopters, as in-wheel engines, etc.

FIG. 140 is an oblique view of a cylinder (3093) with radially oriented windings (3094) [e.g. coils laid into transverse slots, cores can be laminated, opposite poles can be placed side by side to create a transverse magnetic flux, multiphase coils can overlap with each phase giving an alternating polarity, the coils can produce a linearly moving magnetic field, the coils can be provided on one side, on opposite sides, 120 degrees apart or in any other pattern, etc.] and a piston (3091) [which can include loops, coils, pieces or plates of metal and which can be laminated and can have eddy currents induced creating an opposing magnetic field to the linearly moving magnetic field thus creating a relative motion]. The piston (3091) or the cylinder (3093) can include sensors (3098) [e.g. position sensors, optical sensors, electromagnetic sensors, proximity sensors, temperature sensors, pressure sensors, etc.] which can be positioned at any part of an engine [e.g. a flywheel, a crankshaft, a connecting rod, etc.]. The sensors (3098) can provide information to a controller (not shown) controlling a current provided into windings, a thermal management system, a lubrication system, etc.

FIG. 141 is a diagram of an electric piston engine (4008) comprising pistons coupled with connecting rods and guided by cylinders (4003) provided with windings (not shown) [which can be wound axially, radially, provided at any part of cylinder walls and bases, e.g. at a (detachable) cylinder head]. The engine (4008) can be coupled to drive a vehicle (4004) [which can be any type of an onshore vehicle including models and toys].

FIG. 142 is a perspective illustration of another application of an electric piston engine (not shown) coupled to drive an aerial vehicle (4014) which can include solar panels (4019) which can provide at least partially an electrical current for the engine.

FIG. 143 is a perspective illustration of another application of an electric piston engine (4028) comprising pistons and cylinders (4023) and coupled to drive an aircraft (4024) which can include a rechargeable power source (not shown) which can provide an electrical current for the engine (4028).

FIG. 144 is a diagram of another application of an electric piston engine (4038) coupled to drive an aircraft (4034) which can include a hydrogen fuel tank (4041), a fuel cell stack (4042), a converter (4043), an inverter (4044), a rechargeable power source with a source management system (4045) and auxiliary devices (4046). Others than shown architectures can be possible to provide an electric current to the electric piston engine (4038). Wind energy to electric energy converters, solar energy to electric energy converters, regenerative designs, supercapacitors, hybrid sources, etc., are possible other components to provide electric energy.

FIG. 145 is a perspective illustration of another application of an electric piston engine (not shown) coupled to drive a vehicle (4044) [which can be a tram, a railway engine, a coach, an amusement park cart, a golf cart, an electric engine car, etc.].

FIG. 146 is a perspective illustration of an electric piston flat twin engine monoblock (4058a) [e.g. from cast iron, aluminium alloys, polymers, etc.] which can include cylinders (4051) to be provided with windings (not shown) [e.g. at any portion, from inside, from outside, in layers, etc.].

FIG. 147 is a functional schematic plan view of an electric rotating piston engine (4068) comprising a piston (4071) [which can be a rotating piston with a rotor gear (partially shown); the piston can include soft magnetic material, hard magnetic material, laminated material, inserted material: the piston can have apexes (4073) which can be wear resistant and include an inherent lubricity, a lubricating agent/e.g. graphite, MoS2, boron nitride, silicone, PTFE (polytetrafluoroethylene) (teflon), etc./, the apex lubrication in the electric rotating piston engine (4068) can meet the requirements different from an internal combustion (IC) engine as far as thermal conditions especially in a combustion zone of the IC engine concerned]. The piston (4071) can be coupled with a coupling mean (4072) [e.g. a crankshaft] and guided by a guiding mean (4061) [e.g. a stator including side housing and a stator gear (partially shown) which can be from metals, metal alloys, polymers, etc.]. Windings (4064, 4074) (only partially and schematically shown) [e.g. distributed or concentrated windings which can be coils from a litz wire, etc.] can be provided at least partially around an inner surface of the stator (4061) [e.g. around the side housing and/or on both lateral sides thus providing radial and/or axial magnetic fluxes]. An alternating electrical current can be provided from a current source (not shown) into the windings (4064, 4074) to force the piston (4071) to rotate in the stator (4061) [e.g. in a synchronous or switched form, in a sinusoidal or non-sinusoidal waveform, in single-phase or in three-phase, etc.]. Multiple engine chambers can be coupled to the crankshaft.

FIG. 148 is a time sequence scheme (to be read from bottom to top) illustrating the stages of typical magnetic forces provided in the proposed electric rotating piston engine during a half-turn ot a piston which can provide at least one magnetic conductor (4081) [which can have induced non-permanent or permanent magnetic poles] which can be consecutively attracted/repulsed by stator poles (4091) [e.g. provided by three-phase windings distributed around a housing (5001) (shown in an unrolled form)].

FIG. 149 is a functional schematic plan view of an electric rotating piston engine (5018) comprising a piston (5021) guided by a stator (5031). Windings (5024) can be provided around an inner surface of the stator (5031). An alternating electrical current can be provided into the windings (5024) [e.g. a single-phase AC sine wave]. Other solutions can be a split-phase resistance-start, a capacitor-start induction-run, a capacitor-start capacitor-run, a permanent split capacitor, a shaded pole motor, etc. (not shown).

FIG. 150 is a functional schematic plan view of an electric rotating piston engine (5048) comprising a piston (5051) guided by a stator (5061). Windings (5064) can be provided around the stator (5061). An alternating electrical current can be provided into the windings (5064) [e.g. a two-phase AC sine wave].

FIG. 151 is a functional schematic plan view of an electric rotating piston engine (5078) comprising a piston (5081) guided by a stator (5091). Windings (5094) can be provided around the stator (5091). An alternating electrical current can be provided into the windings (5094) [e.g. a three-phase AC sine wave] which can have star or delta connections.

FIG. 152 is a functional schematic plan view of an electric rotating piston engine (6008) comprising a piston (not shown) guided by a stator (6021). Windings (6024) can be provided around the stator (6021) [e.g. on either or both lateral sides]. An alternating electrical current can be provided into the windings (6024) [e.g. a three-phase AC sine wave].

FIG. 153 is an oblique view of an electric rotating piston engine (6038) in a compact packaging with air cooling fins (6031) [e.g. metallic, polymer, etc.].

FIG. 154 is a diagram of another application of an electric rotating piston engine (6048) [which can be used as a propulsion motor, a bow thruster, etc.] to drive a water vessel (6044) [e.g. an overwater, underwater vessel] which can include hydrogen fuel tanks (6051), fuel cell systems (6052) [e.g. proton exchange membrane, alkaline, phosphoric acid, molten carbonate, solid oxide, direct methanol, etc., optionally in a purpose built container], power electronics with energy management system (6053), a buffer battery (6055) [e.g. lithium ion, lead gel, etc., which can be used for buffering, peak load shaving, etc.] and auxiliary devices (6056).

Hydrogen power units including fuel cells can include hydrogen production units and hydrogen storage units. Hydrogen production units can be e.g. electrolysis systems, hydrocarbons reforming systems, alcohols reforming systems, sugars reforming systems, chemical processing systems, biological processing systems, biomass processing systems, thermal processing systems, photo processing systems, metal and water systems, etc. Hydrogen storage units can be e.g. compressed gas systems, liquified gas systems, chemical systems, electrochemical systems, physi-sorption systems, nanomaterial systems, intercalation in metals systems, intercalation in hydrides systems, inorganic gaseous systems, inorganic liquids systems, inorganic solids systems, organic gaseous systems, organic liquids systems, organic solids systems, etc.

FIG. 155 is a diagram of another application of an electric rotating piston engine (6068) [which can be coupled in series] to drive an aircraft (6064) which can include a battery system, a hybrid propulsion system, hydrogen storage and production systems, etc. (not shown)].

FIG. 156 is a schematic perspective illustration of another embodiment of an electric piston engine (6078) comprising pistons (6071) [which can provide lower reluctance path, support induced eddy currents, contain permanent magnets or electromagnets, etc.; and which can have various forms, e.g. cylinders, rectangular prisms, triangular prisms, etc.] coupled with a coupling mean (not shown) [which can be a piston-rod, a bolt, a bracket, etc.], and guided by a guiding mean (6073) [which can have various shapes and forms], the engine (6078) characterised in that a winding (6074) [e.g. a single phase, three-phase windings, concentrated windings in one coil per phase, two poles per phase/e.g. single sided/, four poles per phase/e.g. double sided/, etc.] is provided at least partially around the guiding mean (6073) [e.g. at least from one side (as shown) and/or at the lateral sides, the sides can include grooves, slots, etc., and various winding schematics, types and materials can be provided], wherein an electrical current provided into the winding (6074) forces the pistons (6071) to move along the guiding mean (6073). [The embodiment can drive automatic sliding doors, propulsion systems, conveyor systems, warehouse management systems, printing systems, etc.].

FIG. 157 is a schematic diagram of a driving wavefront to the embodiment shown in FIG. 156 wherein a plurality of pistons in guiding means with windings provided at least partially around the guiding means are forced to move by an electrical current provided into the windings in sinusoidal waveforms (6075, 6076) or non-sinusoidal waveforms (not shown). The provided signal(s) can be composed of a carrier signal and a modulated signal. The carrier signal can drive a piston and the modulated data signal can be demodulated and provide an information to a piston to perform a task [e.g. to activate a painting, machining, rubbing, locking, etc. mechanisms].

FIG. 158 is a perspective illustration of a spherical joint electric motor (6088) provided in a compact packaging and comprising a first portion (6081) and a second portion (6091).

FIG. 159 is an application example of a spherical joint electric motor (6108) driving a (swivel head) mixer (6109).

FIG. 160 is an application example of a spherical joint electric motor (not shown) driving a robotic cat (6119) [or other robotic or mechanical device, the electric motor can be provided at a body to drive a head, extremities, tail, etc.].

FIG. 161 is an application example of a spherical joint electric motor (6128) driving an adaptable car leg (6129) [e.g. from glasses, others adaptable chained structures can be contemplated].

FIG. 162 is an application example of a spherical joint electric motor (6138) [e.g. provided in a head, tail articles, etc.] driving an adaptable robotic snake (6139) (partially shown).

FIG. 163 is an application example of a spherical joint electric motor (not shown) driving a (doll or human) body (6149) and/or limbs.

FIG. 164 is an application example of a spherical joint electric motor (6158) which can be coupled to a landing gear (6159).

FIG. 165 is an application example of a spherical joint electric motor (6168) which can be coupled to a rotor (6169) [e.g. of a drone, model helicopter, helicopter, etc.].

FIG. 166 is an application example of a spherical joint electric motor (6178) which can be coupled to an antenna system (6179) [e.g. a parabolic, a monopole, a crossed dipole antenna, etc.].

FIGS. 167 and 168 are a functional perspective illustration and a schematic detailed functional perspective illustration of another embodiment of a stationary-rotational wireless power transfer system comprising a stationary primary electromagnetic interface (6181) including one or more primary magnetic conductors (6183) [which can be laminated cores of coils] and providing a transverse magnetic field (6184) on its coupling side and a secondary electromagnetic interface (6198) including a secondary electrical conductor (6212) [which can be a wheel disc with rims, e.g. from steel or aluminium] configured to spin around a spin axis (6194) at a distance from the primary electromagnetic interface (6181) to induce a current [which can be an eddy current] in the secondary electrical conductor (6212). The system can further comprise a secondary magnetic conductor (6201a, 6201b) configured to be in at least partial magnetic interaction with the primary magnetic conductor (6183) [in a power transfer mode the secondary magnetic conductor (6201b) can support the transverse magnetic field by providing a lower reluctance path]. The secondary electromagnetic interface (6198) can be configured to be an in-wheel electric motor and/or an electric generator [e.g. the secondary magnetic conductor (6201a) can be a core of one or more coils connected with a driving circuit which can provide an electrical current in a driving mode activating the coils to provide a rotating magnetic field together with the secondary magnetic conductor (6201b), eddy currents can be induced in the secondary electrical conductor (6192) which can cause it to spin]. The primary interface (6181) can be coupled with an onshore track (6187) and the secondary interface (6198) can be coupled with a vehicle (6194).

The proposed electric motor (6198) can be also driven by the proposed magnetic field driving method and can comprise the first portions (6201a, 6201b) [wherein at least one of them can include magnetic points, e.g. coils, the other can provide a lower reluctance (return) path] and the second portion (6212) [which can have the induced eddy currents] mounted to relatively spin around the spin axis (6194). A transverse magnetic field (not shown) can be provided between the first and second portions (6201a, 6212, 6201b). The second portion (6212) can include one or more magnetic holes (not shown) [e.g. a metallic material supporting eddy currents] providing low reluctance paths according to the proposed driving method and may not be planar [e.g. convex, concave, paraboloïde, a shape of a wheel disc, etc.]. The proposed electric motor (6198) can be provided in power transfer, charging, driving and regenerative braking modes and can be provided with a thermal management [e.g. cooling fins (6216) or other air cooling or liquid cooling structures].

FIG. 169 is a schematic exploded perspective view of a sandwiched secondary electrical conductor (6222) [which can be formed with flanges] including a secondary magnetic conductor (6223) configured to be in at least partial magnetic interaction with a primary magnetic conductor (not shown) [e.g. the secondary magnetic conductor (6223) can provide an opposite magnetic pole to an adjacent pole of the primary magnetic element]. The shown sandwiched secondary electrical conductor (6222) can be used in the embodiment shown in FIGS. 167 and 168.

FIG. 170 is a detailed perspective illustration of a first portion (6231a) of the proposed electric motor which can be part of the proposed stationary-rotational wireless power transfer system. The first portion (6231a) can be coupled with a steering and suspension system (6234).

FIG. 171 is a detailed perspective illustration of a first portion (6241a) of the proposed electric motor which can be part of the proposed stationary-rotational wireless power transfer system. The first portion (6241a) can be coupled with a suspension system (6244). Another electric motor (6248) can be provided as part of the active/semi-active suspension system (6244) [in an active mode the motor (6248) can raise or lower a part of a chassis, in a semi-active mode the motor (6248) can be connected with a controller (6258) to electrically control damping].

FIG. 172 is a schematic winding diagram in a stationary-rotational wireless power transfer system to comprise a stationary primary electromagnetic interface to include primary conductive loops (6262a, 6262b, 6262c) (for clarity schematically posed on a front of an electric vehicle (6274) to approximately show proportions which can be modified accordingly to a particular application) [which can be from a litz wire, conductive tubes, or other conductors] to be wound around primary magnetic conductors and to provide transverse magnetic fields (6264a, 6264b).

Shown embodiment can provide a possibility for a previous art conception of wireless static/dynamic power transfer to the electric vehicles (6274) having receiving coils situated centrally under a chassis (unibody or body-on-frame) and at the same time it can provide the transverse magnetic fields (6264a, 6264b) on a primary coupling side for embodiments of the present invention [e.g. secondary electromagnetic interfaces provided in wheels, in tires, configured to be an electric motor, etc.]. Thus a vehicle equipped with a prior art (resonant) inductive charging system can be further equipped with the proposed transversal (resonant) inductive charging system which can be optionally configured to be an electric motor.

FIG. 173 is an oblique view of a stationary primary electromagnetic interface (6271) including primary conductive loops (6272a, 6272b, 6272c) wound around primary magnetic conductors (6273a, 6273b, 6273c) [preferably in the winding diagram shown in FIG. 172]. The primary interface (6271) can be configured to provide a single phase transverse magnetic field, a multiphase travelling magnetic field, etc. The conductors (6272a, 6272b, 6272c) wound around the magnetic conductors (6273a, 6273b, 6273c) can electrically and physically overlap (not shown) and can be coupled with compensation network, HF AC/DC converter, DC/AC converter, a (smart) grid, etc. (not shown).

FIG. 174 is a schematic winding diagram of a stationary primary electromagnetic interface including primary conductive loops (6282a, 6282b, 6282c, 6282d) wound around primary magnetic conductors (6283a, 6283b, 6283c, 6283d) and configured to provide transverse magnetic fields (not shown). Others winding diagrams for the transverse magnetic fields can be provided.

FIG. 175 is a functional schematic perspective illustration (seen from bellow) of a stationary primary electromagnetic interface (6291) including primary conductive loops (not shown) wound around primary magnetic conductors (6293a, 6293b, 6293c) [which can form rows under a track (not shown) which can include a surface course, a binder course, a base course, a subbase course, etc.; the primary electromagnetic interface components should be preferably protected against the load from passing vehicles and insulated, the primary magnetic conductors (6293a, 6293b, 6293c) can be provided for example in the binder course or base course and can be provided for example from a beton, asphalt or other convenient material which can be mixed with a magnetically conductive material, e.g. ferrites]. The primary interface (6271) can be longitudinally and transversally divided into separately controllable sections (not shown) which can by means of sensors, via a satellite control, etc., follow a movement of an electric vehicle (not shown) and which can be separately switchable by one or more controllers (6298) controlling a grid (6299). The primary magnetic conductors (6293a, 6293b, 6293c) can be provided under a traffic line, or the central part (6293b) can be provided under a roadway and the peripheral parts (6293a, 6293c) can be provided under shoulders [e.g. for electric bicycles, motorcycles], etc. Other combinations of transversely interacting rows in various numbers can be provided to cover various (undivided or divided) highway, roadway, sidewalk, etc., layouts.

FIG. 176a is a functional schematic oblique view of another embodiment of a stationary-rotational wireless power transfer system with a primary electromagnetic interface (6301a) including a primary magnetic conductor (6303a) [which can be a permanent magnet or a DC or an AC electromagnet] providing a transverse magnetic field (6304a) and with a secondary electromagnetic interface (6311a) including a secondary electrical conductor (6312a) [which can be a drum spinning around a spin axis (6314a)] oriented substantially perpendicularly to the transverse magnetic field (6304a) and including a secondary magnetic conductor (6313a) configured to be in at least partial magnetic interaction with the primary magnetic conductor (6303a) [e.g. providing a lower reluctance path fort the transverse magnetic field (6304a)] and providing a radially oriented magnetic field (6324a). The secondary electrical conductor (6312a) can be coupled at both ends with a circuit [e.g. a charging/driving circuit including a battery bank]. [The shown embodiment can be provided in various applications for a wireless power transfer. In the case of an electric vehicle static/dynamic charging it can be suspended under a chassis, provided in a construction of wheels inclusive of tires, etc. [. The secondary interface (6311a) can be configured to be an electric motor [e.g. by providing a direct current to the both ends of the conductor (6312a) and the radial magnetic field (6324a)]. The primary interface can be coupled with a track in various layouts, poles numbers and combinations. The primary and secondary interfaces (6301a. 6311a) can further comprise various thermal management systems [e.g. the conductor (6312a) can be provided with cooling fins, conduits, etc.].

FIG. 176b is a functional schematic oblique view of a transverse magnetic field motor (6318b) comprising a first portion (6301b) [providing a steel turbine case which can include an inlet, a nozzle, an outlet, a deflector, a magnetically conductive stator with peripheral coils having opposite secondary windings which should be electrically insulated from the stator, etc.] and a second portion (6311b) [providing a magnetically conductive rotor/e.g. from steel/and which can include a core and with coils having opposite primary windings] mounted to relatively spin around a spin axis [preferably coupled with an electrically conductive rotatable connection/e.g. conductive bearings, conductive slip rings, etc./]. Transverse magnetic fields can be provided between the first and second portions (6301b. 6311b) [either of which can be comprised of soft magnetic materials, hard magnetic materials inclusive of permanent magnets, either of which can be provided without opposite windings]. The second portion (6311*b*) can include one or more preferably salient electrical conductors (6312*b*) [e.g. conductive rotor blades (rotor buckets, rotor nozzles, etc.) which should be electrically insulated from the secondary windings]. The shown embodiment can function as an electricity generating turbine and/or can be configured to be a motor turbine which can be provided with a liquid flow, a gas flow, a steam flow, etc. The turbine can further contain stator fixed nozzles. The turbine and nozzles can use venturi effect. The shown turbine can function as an impulse and/or reaction turbine. The transverse magnetic field between the stator and the rotor can be intensified by the stator and/or rotor windings, by the provided rotor core, and by a magnetic interaction between the stator and rotor surfaces inclusive of magnetically conductive components [e.g. the nozzles, buckets, blades, etc.]. The stator and/or rotor electrical circuit can include other electrocomponents [e.g. resistances, relays, filters, capacitors, switches, etc.]. In case that stator or rotor may not include a winding, a low-voltage direct current source can be preferably used. Either stator and/or rotor component can be suitably laminated, insulated, cooled, etc. Various sensor types and sensing circuits can be used.

The turbine case and other components can be shaped to function unidirectionally or bidirectionally. Other winding diagrams can be provided with different input and output node positioning, coils situating along the turbine, variations, permutations to provide an analogical function and providing components with electromagnetic and mechanic function at a same time (blades, nozzles, etc.). The turbine can be coupled with vehicles, vessels, power generators, etc. The turbine can be coupled with electrocomponents [e.g. driving units, charging units, controllers, rechargeable power sources, hydrogen production and/or storage units, etc.]. The turbine can be coupled with mechanocomponents [e.g. gears, brakes, shafts, belts, other turbines, etc.].

FIG. 177 is a frontal view of a transverse magnetic field motor (6338) comprising a first portion (6331) [which can include magnetic conductors, coils, permanent magnets, etc., and which can be provided in various shapes and forms, e.g. a peripheral coil optionally coupled with a conductive/protective/network, magnetic backing plates or sheets of various shapes and proportions, etc.] and a second portion (6341) mounted to relatively spin around a spin axis (6334). A transverse magnetic field (perpendicular to the page) can be provided between the first and second portions (6331, 6341). The second portion (6341) can include one or more electrical conductors (6342) [e.g. fan blades supporting eddy currents (, the blades can be from aluminium, copper, steel, a polymer layered with aluminium sheet, etc.].

FIG. 178 is a perspective view of a transverse magnetic field motor (6358) comprising a first portion (6351) [which can be a peripheral coil] and a second portion (6361) mounted to relatively spin around a spin axis (6354). A transverse magnetic field (perpendicular to the plane of the coil) can be provided between the first and second portions (6351, 6361). The second portion (6361) can include one or more electrical conductors (6362) [e.g. fan blades supporting eddy currents]. The second portion (6361) can further drive a squirrel cage fan (6368).

FIG. 179 is a schematic perspective view of an electric motor (6378) comprising a first portion (6371) and a second portion (6381) mounted to relatively spin around a spin axis (6374). A transverse magnetic field (not shown) can be provided between the first and second portions (6371, 6381).

The first portion (6371) can include one or more magnetic points (not shown) [e.g. including coils]. The second portion (6381) can include one or more magnetic holes [e.g. including a metallic sheet or plate supporting eddy currents] providing low reluctance paths. The motor (6378) can be driven according to the proposed method and can include sensors (6388) [e.g. hall position sensors] providing a position information to a processing device in communication with a controller activating the magnetic points.

FIG. 180 is a schematic cross sectional view of a transverse magnetic field motor (6398) comprising a first portion (6391) [which can include one or more peripheral coils] and a second portion (6401) mounted to relatively spin around a spin axis (6394). A transverse magnetic field (perpendicular to the plane of the coil) can be provided between the first and second portions (6391, 6401). The second portion (6401) can include one or more electrical conductors (6402) [e.g. blades supporting eddy currents]. The motor (6398) can be used to produce a thrust for an electric aircraft and can be coupled to a wing, a fuselage, a stabilizer, etc. The motor (6398) can be provided in a turbine case (6399) with an inlet (6399*a*) and an outlet (6399*b*). The motor (6398) can be provided with other structures increasing the thrust such as vanes, nozzles, etc., which can be axially and/or radially oriented, venturi effect can be used. Signal provided to the windings can be amplified by various methods, e.g. pulse width modulation, power amplification, etc. Very high frequency of pulses with adjusted amplitude may be needed to realize an effective power transfer. Eddy currents induction in blades (6402) [which can be rotatable around their long axis to change the blade pitch] can be boosted by adding magnetic conductors, electrical conductors, combinations, laminated structures can be provided, 2D shaping and 3D forming of the blade (6402) can lead to power transfer and thrust optimalization in different applications. A diameter of the coils can be approximately the same as that of the casing (6399) or the coils can be provided round the perimeter of the turbine and conveniently oriented with conveniently formed cores to optimize eddy current induction in the blades (6402) which can perform mechanical and electromagnetically functions at the same time. The proposed motor (6398) can be provided with different shapes and configurations of rotors and with different stator configurations [e.g. its form can be conical; different numbers of poles, insulations, shieldings, etc., can be provided]. Permanent magnets can be used in the proposed construction of the stator (6391) and the rotor (6401). The proposed motor (6398) can be coupled with various mechanocomponents, e.g. gears, gearboxes [e.g. a helicopter main rotor gearbox], planetary speed reducers or multipliers, shafts, belts, chains, clutches, brakes, etc.

FIG. 181 is a schematic isometric view of an electric piston engine (6418) [which can be a V four engine] comprising pistons (6411) [which can be provided with one or more piston windings (6417) which can be coupled with one or more capacitors (6418) and one or more resistances (not shown); and which can have one resonant frequency and multiple harmonic frequencies; a distributed capacitance between the windings can be also contemplated; the circuit can be designed to provide maximum (or minimum) impedance to a cylinder winding (6414)].

The pistons (6411) can be coupled with connecting rods (6412) and guided by guiding means (6413) [e.g. cylinders which can open at various angles for example from 25° to 154°, e.g. 45°, 90°]. The winding (6414) can be provided at least partially around the guiding means (6413) [e.g. at a cylinder head; more cylinders can be coupled with windings, as shown on the left side in FIG. 181, with different winding diagrams, e.g. "O", "8", etc., for example in correlation with a crankshaft shape. In case of a narrow V four engine or other embodiment with an in-line crankshaft a common winding can be provided around all cylinders (not shown)].

FIG. 182 is a schematic cross sectional view of an electric piston engine (6428) [which can be a straight-4 engine] comprising pistons (6421) coupled with connecting rods (6422) and guided by guiding means (6423) [e.g. cylinders]. A winding (not shown) can be provided at least partially around the cylinders (6423). A crankshaft can be differently shaped from that of an IC engine [e.g. can be rotated by a quarter turn].

FIG. 183 is a schematic cross sectional view of an electric piston engine (6438) comprising pistons (6431) coupled with connecting rods (6432) and guided by guiding means (6433) [e.g. cylinders]. A winding (6434) can be provided at least partially around the cylinders (6433). A crankshaft can be differently shaped from that of an IC engine [e.g. crankpins can be provided in one line].

FIG. 184 is a schematic perspective view of an electric piston engine (6448) [which can be a V four engine] comprising pistons (6441) coupled with connecting rods (6442) and guided by a guiding mean (6443) [e.g. a cylinder block (shown in phantom) with four bores (6443*a*)]. A winding (6444) can be provided around the cylinder body (6443). Liquid cooling conducts (not shown) can be provided in the cylinder body (6443).

FIG. 185 is a schematic cross sectional view of an electric piston engine (6458) [which can be a narrow V engine] comprising pistons (6451) coupled with connecting rods (6452) and guided by guiding means (6453). A winding (6454) can be provided around the cylinders (6453). Air cooling fins can be provided (6456).

FIG. 186 is a perspective front three-quarter view of a secondary electromagnetic interface (6461) [which can be provided in a tire (6469)] including secondary electrical conductors (6462) [which can be radially and axially oriented coils; each coil can be connected with a switch (6468)/e.g. a flexible push button switch covered by a tread (not shown)/which can activate only coils in a contact with a rolling surface, a controller, a charging unit, a rechargeable power source; the coils can be coupled in series or preferably in parallel, the coils can be coupled with a compensation circuitry/e.g. at least a resonant capacitor/, a rectifier, a filter, etc.]. At least part of the coils (6462) can be oriented substantially perpendicularly to a transverse magnetic field (not shown) provided by primary coils (not shown). The switch can be provided in a packaging structure; without an external pressure a transmitting coil circuit can be interrupted; the packaging structure can be elastic to keep the circuit open when no external pressure applied; it can include for example form keeping an air layer between switch contacts, rubber, a spring made of various materials, etc.

FIG. 187 is a perspective front three-quarter view of another embodiment of a secondary electromagnetic interface (6471) [which can be provided in a tire (6479)] including secondary electrical conductors (6472) [which can be radially and axially oriented coils; each coil can be connected with a compensation circuitry]. The coils (6472) [namely outer coils which can be partially provided at tire sidewalls] can be at least partially oriented perpendicularly to a transverse magnetic field (not shown) provided by primary electromagnetic interface (not shown). Two rows of coils can be provided with coils at least partially provided at the sidewalls; three rows of coils can be provided with two lateral partially provided at sidewalls and one central and substantially parallel to a road surface, etc.

FIG. 188 is a perspective front three-quarter view with a partial cutout of another embodiment of of a secondary electromagnetic interface (6481) [which can be provided in a tire (6489)] including one or more secondary electrical conductors (6482) [which can be tangentially oriented coils; each coil can be connected with a compensation circuitry and other electrocomponents; the coils (6482) can at least partially provide or be coupled with a radial cord body of the tire (6489)].

FIG. 189 is a perspective illustration of a secondary electromagnetic interface (6501) including a secondary electrical conductor (6502) [which can be one or more conductive discs, tires, etc.] oriented substantially perpendicularly to a transverse magnetic field (6494) and configured to spin around a spinning axis (6504). The secondary interface (6501) can be coupled with electrocomponents [e.g. a bidirectional electromagnetic axle (6508) which can include a coil (6508*a*) which can include a core/e.g. E, U, I, etc./, charging/driving electronics, a rechargeable battery pack, etc.] and can be configured to be an electric motor which can turn in both directions. The system including a primary electromagnetic interface (not shown) providing the transverse magnetic field (6494) [e.g. in a charging/driving mode]. The primary interface can be provided in a sidewalk, roadway, home/office charging interface, etc.

FIG. 190 is a plan view of an electromagnetic axle (6518) which can include coils (6518*a*) and a double L core (6518*b*) which can be laminated to provide transverse magnetic fields (6514).

FIG. 191 is a functional schematic cross sectional view of another embodiment of a stationary-rotational wireless power transfer system with a primary electromagnetic interface (6521) including a primary magnetic conductor (6523) [preferably a DC electromagnet] providing transverse magnetic fields (6524) and with a secondary electromagnetic interface (6531) including a secondary electrical conductor (6532) [which can be wheel discs interconnected with tangentially oriented windings in a tire] oriented substantially perpendicularly to the transverse magnetic fields (6524) and configured to spin around a spin axis (6534) at a distance from the primary electromagnetic interface (6521) to induce a current (6536) in the secondary electrical conductor (6532) and including a secondary magnetic conductor (6533) [which can be preferably from a magnetically soft material which can be partially elastic/e.g. ferrites and a ferrite-gum mixture/, an air core, etc.] configured to be in at least partial magnetic interaction with the primary magnetic conductor (6523) [e.g. providing a lower reluctance path for the transverse magnetic fields (6524) and return paths]. The secondary interface (6531) can be configured to be an electric motor and can be coupled with an electric scooter with an electromagnetic axle [e.g. as shown in FIGS. 189 and 190].

FIG. 192 is schematic perspective illustration with a partial cutout of an electric piston engine (6548) comprising a piston (6541) [which can have in a cross section view a laminated H or L core which can be at least partially subdivided to produce a slot or other space; the core can have sliding flanges and can include laminae connecting means/e.g. rods/; various forms not only cylindric can be provided with salient part to provide magnetic conductivity/e.g. spheres, hemispheres, composed forms, etc./; the cylinder can be from a good magnetic conductor and can be from an electrically non-conductive material, can be from materials containing ferrites, magnetic polymers, etc.]

coupled with a coupling mean (6542) [e.g. a piston rod] and guided by a guiding mean (6543) [e.g. a cylinder which can be from glass]. A winding (6544) (shown in a cutout) [e.g. from a litz wire] can be provided at least partially around the cylinder (6543). An alternating electrical current can be provided from a current source (not shown) into the winding (6544) [in one or more desired frequencies] to force the piston (6541) to move in the cylinder (6543).

FIG. 193 is a perspective illustration of an electrically conductive blade (6552) [e.g. a turbine, compressor, propeller, fan, axial pump blade] with an electrical conductor (6552*a*) providing a return conductive path for the induced electrical current in a rotating blade in a transverse magnetic field (6554) provided by a first portion of a transverse magnetic field motor (not shown). [Other solutions for the return path can be contemplated. For example the return path can be provided at the leading edge, at the trailing edge, can be aerodynamically or hydrodynamically shaped, can be provided in a form of a flap, a slot, a slat, a spoiler, a tab, a cuff, etc. The return path can be integrated into the body of the blade (6552). The blades can be peripherally interconnected by a ring structure which can be connected to a return path/e.g. by means of brushes, sliding contact, conductive bearing, slip rings, etc./. The return path can be provided by another blade if the magnetic field changes its orientation. Other solutions can be adopted/e.g. using salient fixed or rotating components, etc./].

FIG. 194 is a schematic winding diagram of a transverse magnetic field motor (6568) comprising a first portion (6561) [which can be a stator including one or more windings wound around a rotor (schematically shown provided on one side of the rotor)] and a second portion (6571) [providing a magnetically conductive rotor having two zones (6571*a*, 6571*b*) which can include a core with one or more coils (not shown) wherein the coils of one zone and the other zone can be preferably wound in opposite directions: each zone can further include salient electrical conductors (not shown) such as blades, wherein different variants of deployment of the coils and the salient conductors in respective zones can be provided; the rotor can be coupled with electrically conductive connections (6578) such as conductive bearings, slip rings, journals, etc.]. Transverse magnetic fields can be provided between the stator and the rotor (6561, 6571) [either of which can be comprised of hard and/or soft magnetic materials, of permanent magnets, either of which can be provided without opposite windings; the magnetic field can be intensified by means of the salient rotor parts and by means of salient stator parts such as nozzles, vanes, etc.].

The shown embodiment can function as an electricity generating turbine, power generating propeller, regenerating propeller, etc., and/or can be configured to be a motor turbine, a compressor, a fan, a propeller, a pump, etc. The primary and the secondary coils can be wound according to right-hand rule so that the system can optimally function. Salient conductors and coils layouts, winding diagrams, etc. can be learned by practicing the invention and by theoretical calculations for individual applications.

FIG. 195 is a schematic winding diagram of a transverse magnetic field motor (6588) comprising a first portion (6581) [which can be a stator having two zones (6581*a*, 6581*b*) which can include a hollow core with one or more coils (not shown) wherein the coils of one zone and the other zone can be preferably wound in opposite directions; each zone can further include salient electrical conductors (not shown) such as fixed nozzles, vanes, etc.] and a second portion (6591) [which can include a core with one or more coils (not shown) and which can further include salient electrical conductors (not shown) such as blades, wherein different variants of deployment of the coils and the salient conductors can be provided; the rotor can be coupled with electrically conductive connections (6598)]. Transverse magnetic fields can be provided between the stator and the rotor (6561, 6571). The primary and the secondary coils can be wound according to left hand rule.

FIG. 196 is a schematic winding diagram of a transverse magnetic field motor (6608) comprising a first portion (6601) [which can be a stator including one or more windings wound around a rotor] and a second portion (6611) [providing a magnetically conductive rotor having three zones (6611*a*, 6611*b*, 6611*c*) which can include a core with one or more coils (not shown) preferably wound in opposite directions between the adjacent zones; each zone can further include salient electrical conductors; the rotor can be coupled with electrically conductive connections (6618)]. Transverse magnetic fields can be provided between the stator and the rotor (6601, 6611).

FIG. 197 is a schematic partial cross sectional view of a deployment of electrical conductors [e.g. windings provided under a shaft's surface (6622*a*), above the shaft's surface (6622*b*), aside of blades (6622*c*), peripherally of the blades (6622*d*)] around a rotor which can be used in a second portion (6621) of a transverse magnetic field motor. [The windings can be electrically, mechanically, etc., insulated and can be provided in grooves, housings, on a surface, attached to a supporting construction/e.g. concentric rings/, detachably attached, glued, welded, screwed, soldered, riveted, provided by printed circuit board techniques, coupled, etc.]

FIG. 198 is a schematic winding diagram of a transverse magnetic field motor (6638) comprising a first portion (6631) [which can be a stator including one or more windings wound around a rotor] and a second portion (6641) [providing a magnetically conductive rotor having four zones (6641*a*, 6641*b*, 6641*c*, 6641*d*) which can include a core with one or more coils (not shown) preferably wound in opposite directions between the adjacent zones; each zone can further include salient electrical conductors; the rotor can be coupled with electrically conductive connections (6648)]. Transverse magnetic fields can be provided between the stator and the rotor (6631, 6641). [N zones may be provided in stator and/or rotor of the proposed turbines, compressors, propellers, pumps, etc. The zones can provide one or more coils and/or one or more fixed or rotating salient conductors provided preferably in concentric rows. Various deployment of the salient conductors and of the coils can be provided. In motor embodiments, stator and rotor polarities, coils' polarities, winding directions, current directions may be set according to left hand rule so that tangential partial forces acting et rotors provide one direction of rotation and analogically in power generating embodiments the components may be set to provide a single current flow].

Common features of FIGS. 1 to 74, 176*a* and 186 to 191.

The primary and the secondary magnetic conductors can have a strong (proximity) coupling [e.g. with a coupling factor k>0.1] or a loose (vicinity) coupling [e.g. with a coupling factor k<0.1] when spaced apart from each other to be able to transfer magnetic fluxes created around the primary and the secondary conductors in a predominantly non-radiative direct field (resonant) coupling or energy transfer can use predominantly radiative coupling. The layout, pattern, dimensions, shapes, numbers, etc., of the primary/secondary (repeating) magnetic components of the embodiments and the shielding can shape the provided electromagnetic field. The shielding can function as a reflector [especially at higher frequencies between 100 MHz and 300 GHz], e.g. in a parabolic, a 3D modelled form/e.g. conical, pyramidal, diagonal, cavity-backed, etc., wherein sidewalls may be straight, shaped, curved, etc./, custom shaped or it can be a planar reflector, etc.

Overall design and material choice of the primary/secondary electromagnetic interfaces [e.g. reducing sharp edges and corners, preferably chamfering, radiusing the edges/corners of the primary/secondary magnetic elements, evenly disposing primary/secondary electrical conductors in selected patterns, choosing a convenient thermal management system, etc.] and of the whole system can provide uniform electromagnetic field distribution and reduce or eliminate magnetic field hot spots.

Energy transfer can be perturbed in the presence of an extraneous object which can influence coupling and result in energy losses. Optimalisations of the system can avoid or alleviate perturbations.

The system can use energy transfer repeaters, energy relays, etc. Repeating electromagnetic interfaces can provide energy to devices/e.g. to a portable or home electronics, to a repeating device of a vehicle, etc./and can simultaneously pass a portion of received energy onto other device in the system]. The repeaters can receive an electromagnetic energy through a first electromagnetic field with a first plurality of parameters and can generate a second electromagnetic field with a second plurality of parameters. The repeaters can be multiplied to extend the distance range of the system. The repeated electromagnetic fields can have different frequencies from the first electromagnetic fields.

Various applications of the system can have various useful energy exchange and energy transfer efficiency demands [e.g. at least 80% in electric vehicles/offshore vessels (charging) power transfer applications, greater than 10% in consumer electronics, 1% in sensor layers, etc.]. The system can use a passive compensation method and adjustable elements [e.g. in active tuning, autotuning, controlling tuning circuits, etc.] to provide acceptable (economical, tolerable/within environment limits, size limits, cost restrictions/, etc.) energy transfer efficiency. The system can use detuning, frequency hopping, time multiplexing techniques to decouple [e.g. to reduce voltage, current, power transfer, to protect devices with lower power demand from overheating, to defend the system from unauthorised power transfer, to enable authentication of energy sources and coupled loads in the system, etc.].

The system can use inductors, capacitors, distributed inductance, distributed capacitance, distributed filter banks, or combinations [e.g. capacitively loaded (coupling) inductors, etc.]. The components can be fixed or variable, can vary impedance matching, a resonant frequency, etc. The components can be connected in series (resonant circuits) or in parallel (resonant circuits).

The embodiments of the electromagnetic interfaces can provide (distributed) inductance, (distributed) capacitance and (distributed) inductance-capacitance in according to the present invention.

The elements of the invention on a primary side and on a secondary side can be differently sized, oriented [e.g. parallel, substantially parallel, offset, rotated, etc.], structured, coupled, etc. Geometric parameters and distance among primary and secondary electromagnetic interfaces may considerably influence coupling factor. A radiation energy transfer can be reduced if the size of the system components [primary/secondary magnetic elements, primary/secondary conductors, primary/secondary coupling inductors, etc.] can be much less than the wavelength of system operation. Shaping, shielding, sizing, orienting the primary/secondary electromagnetic interfaces [which can be sub-wavelength objects] together with tuning, frequency range and other system parameters setting can help to design electromagnetic fields, to alleviate losses [e.g. primary/secondary conductor absorptive losses, radiation losses, absorption losses/e.g. in extraneous objects/, etc.] and to optimize the system efficiency which can be learned by practicing the invention. The primary/secondary electromagnetic interfaces and their elements can be separated by a thickness of an insulation, a dielectric layer, etc. and can be spaced apart by any distance in which the system can be able to transfer at least partially the magnetic fluxes.

An electric field of a primary/secondary electrical conductor which can be a good conductor can be completely perpendicular and a magnetic field can be tangential and composed of one or more circular magnetic fluxes. Electric field of the primary/secondary electrical conductor providing condenser action can be provided between parallel portions of the primary/secondary conductor [e.g. within a dielectric layer] and can be perpendicular to the circular magnetic fluxes in the primary/secondary magnetic elements. An electron flow between the parallel portions (electrodes) and/or an electric current in the primary/secondary conductor can create magnetic fluxes in the primary/secondary magnetic conductor and vice versa.

A primary/secondary [and tertiary, etc. in case of a repeater] magnetic field created by respective primary/secondary magnetic fluxes [and tertiary fluxes, etc.] can advantageously provide homogenous and (highly) directive electric and magnetic fields or can provide omnidirectional patterns. Directivity can be a significant advantage in applications where the power is only required to be directed over a small area and can prevent it, for example causing interference to other users. Devices coupled with a secondary [and tertiary, etc.] magnetic field can have a certain orientation freedom in a 3D space in relation to a position of a primary electromagnetic interface.

Primary/secondary electromagnetic interfaces can be (substantially) parallel oriented in a proximity or vicinity or can be orthogonally, convergently, divergently, focus, random oriented, etc. A coupling side of a primary/secondary electromagnetic interface can be conveniently [e.g. convexly, concavely, cylindrically, etc.] shaped.

The primary/secondary electrical conductors [or groups of primary/secondary conductors] can have constant phase, a constant phase 90, 180, etc. degrees out of phase, a variable phase, etc.

The system can be used in wired-wireless (an unipolar, two-interface, single-wire) energy transfer systems comprising a primary electromagnetic interface coupled with a secondary electromagnetic interface and providing a forward path from an energy source to a load and further comprising a conductive returning path [which can be a rail for a train, an earth ground for an electric vehicle, a fresh/sea water for an offshore vessel, etc.]. A bipolar structure can include primary and secondary electromagnetic interfaces working pairs (groups). In unipolar, bipolar (or other) structures the primary electromagnetic interfaces can have different size, orientation, insulation, shielding, circuitry, etc. than the secondary electromagnetic interfaces.

Applications of the system can imply heat [e.g. hysteresis loss, energy transfer induced heat, or ambient heat/e.g. when used in tires, etc./. The elements/e.g. binders, polymers, wires, etc./can be fabricated of appropriate heat resistant materials and/or provided with appropriate thermal insulation, etc. The primary and the secondary magnetic conductors together with the primary and the secondary electrical conductors and shielding can be designed to be flexible, scrollable, foldable [e.g. can be embedded, integrated, etc. into flexible enclosures/e.g. clothes, cushions, etc./]. The primary/secondary magnetic conductors can be comprised of elastomers containing magnetic particles, and the like, and the primary/secondary conductors can be fabricated of tressed wires, and the like.

The primary/secondary electrical conductors can be switchable, or can be in a switchable groups. Some of the primary/secondary electrical conductors can be dedicated for a power transfer and others for a signal (data) transfer and provide communication.

The primary/secondary electrical conductors can be provided in various shapes, forms, structures, etc. [e.g. monoblocs, spongeous, fibrous, sheet structures, layered structures].

The primary/secondary magnetic conductors and/or the primary/secondary electrical conductors and/or the shielding can be shaped to match various installations [e.g. engineering constructions, furniture, street furniture, etc.], devices [e.g. autonomous electronics, sensors, home appliances, tools, magnetic cards, RFID tags, game controllers, wireless computer peripherals, micromechanical systems, applications [e.g. power transfer, communications/e.g. the Global System for Mobile Communications (GSM), the Universal Mobile Telecommunications System (UMTS), the Long Term Evolution (LTE), the Global Positioning System (GPS), the Global Navigation Satellite System (GLONASS), WiFi, Bluetooth, etc./]. They can curve to follow the contours of the device, they can fill a dedicated space within the device, etc. They can have various geometries, shapes, enhancements, ridges, indentations, notches, etc. The primary/secondary electromagnetic interfaces provided in a dynamic power transfer system can be shaped and spaced to create magnetic fluxes corresponding to a predominant motion of electric vehicles/vessels [e.g. on a road, fairway, etc.]. The primary/secondary electromagnetic interfaces can be shaped to provide a multidirectional energy transfer in a multidirectional area. The primary and secondary electromagnetic interfaces can be relatively planar to be integrable into planar electronic devices such as charging pads, carpets, etc., on one side and portable electronics, electric vehicles, etc., on the other side.

Magnetic materials that have ferromagnetic or ferrimagnetic properties can magnify magnetic flux density and can add additional magnetic flux to the already existing flux. Ferrite materials typically show a hysteresis effect between the applied magnetic field and the resulting field. The flux magnification effect of a ferrite rod depends on both the relative permeability of the ferrite material used, and on the form factor, for example the diameter to length ratio. The gyromagnetic effects of certain materials such as ferrite can also be used to increase the (circular) magnetic flux. The system components can convert electric energy to magnetic energy and back to electric energy. The provided electromagnetic field characterised by the (circular) magnetic fluxes can be resonant and the system can have a preset coupling coefficient for various applications. Resonance can be achieved within the primary/secondary/repeating electromagnetic interfaces (antennas) and/or with coupled (compensation) electrocomponents.

The system can include an oscillator to convert DC energy into AC energy [e.g. in the frequency range from around 20 kHz to around 300 GHz] and can function at defined frequencies [e.g. about 135 kHz, 200 kHz, 600 kHz, 1 MHz, 6.78 MHz, 10 MHz, 13.56 MHz, 21 MHz, 27.12 MHz, 40.68 MHz, 10 GHz, etc.]. The frequencies for power transfer can be unmodulated.

The electromagnetic energy transfer systems can be enclosed in magnetically permeable packaging, in low-lossy (non-lossy) materials (e.g. certain plastic, carbon fiber, composites, plastic composites, Teflon, Rexolite, ABS (Acrylonitrile butadiene styrene), PVC (Polyvinyl chloride), nylon, rubber, acrylic, polystyrene, ceramics, stone, etc.). The packaging can comprise air, gas, sand, insulation, etc. The plurality of primary and/or secondary magnetic conductors and/or primary and/or secondary electrical conductors can be integrated into one device and similarly on a primary side can be one device transferring power to a number of devices on a secondary side or vice versa.

The wireless electromagnetic energy transfer system can be used in device-to-grid applications and/or secondary devices can provide return of energy to primary devices in a bidirectional power flow [i.e. in a negative power flow wherein the secondary devices with secondary electromagnetic interfaces become power sources and the primary devices with primary electromagnetic interfaces become power sinks/e.g. loads/and similarly for repeating devices and repeating electromagnetic interfaces].

The system can provide wireless data transmission which can provide communication through some form of modulation of the signal [e.g. analog/amplitude, frequency, phase/, digital/amplitude, frequency phase shift keying/, etc.]. Communication can utilize various wireless short range or long range carriers and protocols. Wireless communication can use primary and secondary (eventually repeating) electromagnetic interfaces, a Near Field Communication (NFC), a Radio Frequency Identification (RFID), a Wireless Personal Area Network (WPAN) [e.g. Bluetooth, ZigBee), a Wireless Local Area Network (WLAN) [e.g. Wi-Fi], a Worldwide Interoperability for Microwave Access (WiMax), wireless telephone technologies [e.g., 4G, 5G, etc.], a satellite connection. Communication can further be optical, [e.g. laser, infrared, etc.], acoustic [e.g. underwater acoustic communication, etc.]. Communication can use a separate channel from the provided electromagnetic field or can be combined with the electromagnetic field.

The system can be provided in cloud/fog/edge architectures wherein communication/control systems can be at least partially in relation with energy transfer. The architectures can be provided e.g. within the Internet, the Internet of Things and the Industrial Internet of Things.

The cloud computing system can include a cloud (a core of the network) which can provide big data processing, business logic, data storage, etc., and which can provide cloud services and communicate with fog nodes, edge nodes, systems operators. The cloud can be applied for mobile networks which can include data centers, configurable networks, radio access networks and mobile clouds which can include remote, local and hybrid clouds (which can include cloudlets). The cloud can communicate with fog/edge nodes wiredly (e.g. using wired network connections) [e.g. digital lines, fiber optics, etc.] and/or wirelessly (e.g. through satellite communication, telephone techniques, etc.).

The fog computing system can include fog nodes which can include (powerful) server devices, gateways, processing, storage and communication devices which can be provided at various electrocomponents [e.g. hydrogen power units providing fuel cells, etc.] at power sources [e.g. onshore/offshore charging stations, etc.]. The fog node can process/store data sent from edge nodes (which can be connected wiredly through local networks and/or wirelessly through radio access networks, etc.), can process diary data, ambient conditions, etc., and can capture other sensors data. The fog node can manage edge devices (e.g. manage charging/discharging power provided to the charging stations/which can comprise a fog of chargers/, the rechargeable power sources, etc.). The fog node can function as an aggregator controller which can allocate power resources, manage power flows and which can be responsible for safety.

The edge computing system can include edge nodes (which can be end-devices) which can include sensors (sensor layer), controllers, local bus, edge computing platforms, data storage, interfaces, etc. The edge nodes can be provided at the electric vehicles, the offshore vessels, the rechargeable power sources, the chargers, the power sources, etc. Edge computing platforms can communicate with the cloud/fog nodes via a core network. Edge computing platforms can perform function of local aggregators managing energy transfer processes.

Cloud/fog/edge nodes can have local and global access. The system can enable processing, control and power management on a local (edge, fog) level and information generation, servicing and control on a global level (cloud). The system can enable power aggregation and interaction between power resources (e.g. electric energy generators, onshore/offshore power sources, etc.), the rechargeable power sources, the charging stations, etc. Cloud services can monitor data from fog nodes/edge nodes, human-machine interfaces (e.g. client smartphones), internet enabled devices, etc. The cloud services can make general decisions, store and process data and provide statistical analysis. The cloud/fog node/edge node system can set a real-time price for the energy transfer based on received information from fog nodes/edge nodes nodes (e.g. provided from different electric vehicles, offshore vessels), on power supply and demand from the loads [e.g. electric vehicles/offshore vessels], on power supply and demand from power generators, etc. according to power market evaluation, energy price trend and development.

The system can make offers for a future price according to evaluation tests and model algorithms analysing data, implementing specific patterns to develop optimal energy transfer parameters. The system can provide renewable energy management, power to grid management, booking management, pricing management, etc. The system can provide a multilevel architecture (e.g. two-level wherein edge nodes can communicate directly with clouds; a three-level architecture including edge nodes, fog nodes and clouds, or combinations). Each layer and the whole system can have various functionality patterns and architectures, can combine mobile and stationary nodes.

Thermal management systems managing wireless energy transfer can be air tempering systems, liquid tempering systems, liquid tempering systems using offshore water as a thermal medium, tempering systems using phase change materials including methods for increasing the thermal conductivity (e.g. inserted fins, heat pipes; added fillers, foams, particles, nanostructures; metal/semimetal/nonmetal materials; carbon, graphite, graphene, composites), dispersed/de-centralised/microcapsule packaging, tempering systems using heat pipes, heat sinks, heat spreaders, vapor chambers, condensers, evaporators, etc., compound cooling, natural convection cooling, thermal conductance materials in any shape and form (e.g. tubes, foams, fibers, etc.) to transport, spread, dissipate, etc. heat/cold. The systems can thermally manage the primary/secondary magnetic conductors, the primary/secondary electrical conductors and/or any other element of the system which can be an electrocomponent (e.g. a rechargeable power source, a charger, etc.). The thermal management systems can include complex technologies. The systems can include ventilators, thermal exchangers, radiators, compressors, chillers, condensers, heaters, sensors, pumps, programmable controllers, thermal medium chambers and conducts, valves, heat pipes, vapor chambers, heat sinks, fillers, etc. The systems may thermally manage power transfer interfaces, power transfer cables, rechargeable power sources or other components.

The systems can be integrated into devices which can comprise communication interfaces to show various parameters concerning functioning of the system. The systems can be coupled to other circuitry providing additional functions such as sensors, amplifiers, resonators, rectifiers, inverters, converters, controllers, processors, and can be coupled with inductors, capacitors, resistors, diodes, varactors, transistors, switches, etc. These electrocomponents can represent circuits or networks and can adjust frequency, input, output, can provide energy conversion, bidirectional energy flow, can control the energy and/or data transfer, can provide a feedback mechanism, optimize system performance to obtain desired energy/data transfer. These electrocomponents can be external and can lie outside the system components, units, etc.

The primary/secondary electrical conductors can be coupled with various electrocomponents to optimize functionality of the system. Various compensation circuitry can be used in the wireless power transfer embodiments [e.g. non-resonant which can use a pulse width modulation converter/e.g. buck, boost, cuk, sepic, zeta/; resonant which can use power amplifiers/e.g. class D, E, EF, φ/, full-bridge inverters/e.g. connected with L, LC, LCL, LCLC, CLLC, etc. topologies/, the primary and secondary sides can be tuned to approximately the same or the same resonant frequency/even if the frequencies cannot be matched, energy may be transferred, e.g. at lower efficiency; requirements on tuning of transmitting tank circuits can be higher than requirements on tuning of receiving circuits/, multiple resonances can be in compensation circuits, various tuning methods can be used; serial-serial, serial-parallel, parallel-serial, parallel-parallel compensations, or combinations can be used; fixed and variable components/e.g. capacitors, inductors, etc./can be combined in various topologies (serial, parallel) to achieve fine tuning, etc.] depending on power and efficiency requirements, system volume, required inductance and/or capacitance size, energy transfer distance, electromagnetic interfaces size, passive components size, switching frequency, etc. Additionally different combinations of interface components, interface configurations, electrocomponents, topologies, compensations, etc., can be used.

The embodiments of the invention can be provided in one (primary/secondary) or more (primary and secondary, tertiary, repeating, etc.) circuits. For example sensors can be provided in one sensing circuit [with primary/secondary elements] or in primary and secondary (repeating) sensing circuits [with primary and secondary (repeating) elements].

The system can perform a function of sensors which can sense position, velocity, directional movement (e.g. head-on, sideways, push-pull, push-push sensing movements), etc. The sensors can sense magnets, magnetic materials, magnetic fields (e.g. generated by passing currents), can be used as detectors. Sensors can be insulated (e.g. sealed against dust, water, etc.).

The primary/secondary electromagnetic interfaces provided in an offshore static/dynamic power transfer system and providing an electromagnetic power transfer in a direct contact with fresh water or seawater can be watertight/waterproof insulated because of water's high permittivity and electrical conductivity wherein attenuation of electromagnetic signals can be much lower in fresh water than in seawater. Since there can be a little effect on the magnetic field component, loss can be mainly due to the electric field attenuation. There can be a different effect of a permanent (under) water contact and a temporary (splash) water contact on the electromagnetic energy transfer effectiveness. Various types of insulation can be applied to the shown systems [e.g. mechanical/seals/, chemical/water repellants/, active/drying air streams, heat drying systems, wiping systems/, design parameters/delimited, circumscribed, narrow working spaces for electromagnetic power transfer isolated from the surrounding liquid, primary electromagnetic interfaces positioned on the top of floaters and protected against a direct splash, etc./].

The system can use various resonant circuit combinations in input and output circuits [e.g. parallel-in/parallel-out, series-in/series-out, parallel-in/series-out, series-in/parallel-out, wherein the (electro) components may be fixed or variable, coupled with other resonant topologies, other electrocomponents/e.g. tuning varactors, tuning transformers, etc./, distributed capacitance or inductance can be taken into account, etc.] for various applications for power transfer, energy transfer providing communication, applications providing various voltage step-up/step-down ratios [e.g. in relation with coupling coefficients, coupling distances, primary/secondary inductances/capacitances ratios, etc.].

Flexible and divisible primary/secondary (repeating) electromagnetic interfaces can be divided into parts.

The system providing the electromagnetic field can be used in static/dynamic onshore/offshore power transfer systems wherein it can provide a high degree of freedom for vehicles [e.g. electric vehicles and in certain extend offshore vessels].

Embodiments can be provided at an interface of two elements (e.g. water-air) can provide possibilities of energy transfer which can be used in sensing applications, data transmission systems (e.g. harvest data from submerged applications to surface systems/e.g. vessels/, communications, maritime beacons, real-time control of unmanned underwater vessels, underwater/maritime navigation, sensing, shallow water applications/e.g. in harbours, rivers, estuarine waters/, wireless underground sensor networks/ which can consider carrier frequency of a system, burial depth of sensors, horizontal inter sensors distances, underground volumetric water content/, etc.], power transmission systems, etc.

The wireless electromagnetic energy transfer system in a static/dynamic power transfer system can be provided onshore and/or offshore and can comprise repeating elements which can be compatible with respective primary and secondary elements. The primary/secondary/repeating elements [i.e. conductors, magnetic conductors, electromagnetic interfaces, electrocomponents/e.g. power sources, rechargeable power sources, etc./] can be provided in pluralities [e.g. an electric motor can include more secondary electromagnetic interfaces, electric motors, etc., a track providing the static/dynamic power transfer can include more power transfer units (in a file and in a row) which can be individually switchable, etc./].

Common features of FIGS. 15 to 19, 176*b* to 178, 180, 193 to 198.

Stators of the proposed transverse magnetic field motors (power generators) can be comprised at least partially of magnetic conductors which can be at a same time electrical conductors. Stator and/or rotor windings and other circuit electrical and electronic components may be electrically insulated, insulated against moisture, mechanical damage, electromagnetically shielded, etc. Rotors may be comprised of good electrical conductors, electromagnetically conductors, magnetically nonconductive materials such as aluminium, aluminium alloys. Stator and/or rotor electrical conductors inclusive of salient conductors can be provided with superficial layers from very good conductors such as copper, silver, etc. Superficial insulating layers can be provided on stator/rotor conductive parts inclusive of salient conductors (blades) especially when provided in an electricity conducting liquid such as water, oils, hydrocarbons, steam, etc. Conductors can be layered, laminated, lamelled, etc. Conductive rotating parts such as bearings, journals, slip rings, sliding-rotating contacts, etc., may be electrically insulated against water in liquid applications. Current return paths can be suitably insulated, incorporated into a rotating conductor body, etc./e.g. can be provided in the interior of a blade, in holes, in hollow spaces, etc./. The salient conductors/e.g. blades/can have surfaces and interior structures suitably formed according to aerodynamical or hydrodynamical demands according to different turbine type [e.g. impulse: pelton, turgo, crossflow, waterwheel; reaction: Francis, Kaplan, propeller; gravity: overshot, waterwheel, Archimedes screw, etc.; each turbine type can be adopted in according to the demonstrated principles of the invention wherein turbine blades, discs, rings, etc., fixed and rotating constructions can perform mechanical and electromagnetical functions] and at a same time to provide an enlarged (electro-) magnetical power transfer function/e.g. can be provided with salient structures, conductive nanostructures, etc./. All components of the proposed transversal magnetic field motors/power generators can be provided with suitable thermal management systems such as coolant conduits, air conduits, air holes, hollow spaces, cooling fins, active systems including pumps, thermal exchangers, liquid and/or air compressors, chillers, etc.

Common features of FIGS. 75 to 120, 158 to 166 and 179.

The proposed electric motor drive can be used as a linear motor or as a stepmotor with nonlinear magnetic behavior. The motor can be coupled with a converter controlled by a logic controller. The converter can be asymmetric bridge converter for three phases. (n+1) switches and diodes configurations, bifiliar drives, C-dump converters, etc. The proposed motor can be provided with speed, position and motion feedback and coupled with sensors. The sensors can be provided as encoders. The encoders can be rotary or linear encoders tracking speed and position. The encoders can be absolute and incremental.

The absolute encoders can have an encoder disc, strip, etc., they can be single-turn, multi turn, single track, multi track encoders. They can have a non-volatile memory, they can store position information as binary code. They can have an unique code for each position. They do not lose true position when the power is switched off. They can be programmed from point-to point rather than from a home position.

The incremental encoders can supply square-wave signal in two channels offset or out-of-phase by 90 degrees. They can use index pulse as a position reference. The number of pulses can be stored in an external buffer counter. A homing routine can be performed after a turn off. A battery backup system can be used to store the count or track information.

Common features of FIGS. 121 to 130.

The proposed system can be modified by the spinning secondary magnetic conductor of the secondary electromagnetic interface instead of the spinning secondary electrical conductor. This modification can provide an advantage of a an electrical circuit including only stationary components thus eliminating need for coupling components such as motor brushes, inductive bearings, slip rings, etc. This system proposes a simple installation with only one rotating component. This system proposes a slim secondary electromagnetic interface easily integrable into other structures [e.g. electronic devices including or not rechargeable power sources, etc.].

Common features of FIGS. 131 to 146, 156 to 157, 181 to 185 and 192.

The proposed electric piston engine can be used in various cylinder layouts [e.g. straight-2, straight-3, straight-4, straight-5 to straight-12, similarly V2 to V24 including narrow V angles, similarly flat-two to flat-twelve, opposed-piston engines, W engines, X engines, U engines, H engines, horizontal K type engines, radial engines, delta engines, etc. Steam piston engine, Stirling piston engine designs can be used for the proposed electric piston engine. New designs can be provided as the invention is not limited by intake and exhaust pipes, valves, etc., design requirements known from internal combustion engines designs. The proposed engines can use liquid cooling systems [e.g. liquid-to-liquid, closed-loop dry systems, closed-loop dry systems with trim cooling, open-loop evaporative systems, closed-loop evaporative systems, chilled water systems, etc.] or air cooling systems [e.g. normal pressure or overpressure systems]. The cylinders can be from various materials including polymers, metals. The cylinders and/or cylinder sleeves can be preferably from materials not supporting eddy currents. The windings can be from various types of conductive paths [e.g. wires, bands, tubes, conductive layers, the conductors can be formed by various techniques including etching, printed circuit boards techniques, etc.]. The windings can be electromagnetically shielded. Winding axes can be substantially parallel to a direction of piston movement and/or perpendicular. The electrical current can be provided from various types of sources [e.g. oscillators, AC power sources which can be coupled with switches, frequency converters, DC power sources which can be coupled with inverters, amplifiers, etc.; the power sources can supply linear or non-linear signals]. The windings can be coupled with various electro-components [e.g. capacitors in parallel, in series, various compensation circuits, transformers, resistances, etc.]. Various multi-phase [e.g. 3-phase] or single-phase winding diagrams can be used. Individual cylinders with windings can be separately controlled by one or more controllers which can include switching circuits, sensing circuits, overload protective devices, start/stop buttons, etc. The pistons can be preferably from magnetic conductors, they can be from magnetically soft and hard materials including permanent magnets. They can be from materials supporting eddy currents which can be induced by at least partially transversal magnetic field. They can be from at least partially laminated materials. They can be from light weight metals [e.g. aluminium alloys]. They can be from other alloys [e.g. cast iron, steel, alloys containing vanadium, copper, titanium, chromium, silicon, etc.]. The cylinders can be put into engine blocks [e.g. from cast iron, aluminium alloys, polymers, etc.]. The blocks can contain coolant passages, oil passages, oil galleries, crankcase, (detachable or non-detachable) cylinder heads, cylinder sleeves [e.g. composed of one or more pieces]. The blocks can be monoblocks. The engines can be coupled with transmission directly or via (an existing) clutch mechanism. The engines in the proposed system does not suffer from such a heat expansion compared with internal combustion engines. The heat expansion clearances can be calculated individually according to particular applications.

A difference between an internal combustion (IC) engine and the proposed electric piston engine can be in that the proposed electric piston engine can have four power strokes instead of one of four in a four-stroke IC (diesel or gasoline) engine, or one of two in a two-stroke IC engine. A crankshaft can thus be differently shaped and for some applications simplified. A position sensor [e.g. an encoder] can provide an information about a position of a cylinder or a crankshaft and can stop the engine or provide a homing routine in a convenient position, e.g. slightly beyond a top dead center or a bottom dead center to avoid toggling, facilitate starting the motor, etc.

Common features of FIGS. 147 to 155.

The windings can be non overlapped (3 phase) or overlapped (3 phase). Synchronous reluctance designs with even number of poles (typically 4 or 6 or higher) can be used. Switched reluctance designs with electrically isolated phase windings and with non-sinusoid drive waveform can be used. Axial flux, radial flux designs and combined designs can be provided. Air/liquid cooling can be provided. The proposed electric rotating piston engine can be used in water tight applications [e.g. washing machine designs, laboratory equipment, liquids mixing, color mixing, water vessels drive, etc.].

No limitations are intended others than as described in the claims. The present invention is not limited to the described exemplary embodiments. It should be noted that various modifications of the SRPS can be made without departing from the scope of the invention as defined by the claims.

Elements, integers or components having known equivalents thereof are herein incorporated as if individually set forth.

The circuitry components, devices, production and communication techniques, materials, chemical substances and compounds, etc., described in this specification reflect the state of knowledge at the time of the filling of this application and may be developed in the future.

INDUSTRIAL APPLICABILITY

The present invention can be used for a large number of applications to transfer energy wirelessly and to provide a moving force.

The proposed stationary-rotational wireless power transfer system can be used in electric and/or electronic devices, onshore and/or offshore transport systems, etc. The system can be used in static and dynamic charging of rechargeable power sources and in bidirectional applications. The system can be used in electronic communications including cloud/fog/edge computing systems. The system can be used without a perfect alignment of the primary and secondary electromagnetic interfaces to obtain a high quality energy, power and/or communication transfer.

The SRPS can be provided in a modular system. The modularity and scalability can concern all elements and components of the SRPS and can bring functional and financial benefits to the parties. Modular designs can use various degrees of modularity [e.g. component slottability, platform systems, holistic approach, etc.]. Modules can be catalogued.

The proposed stationary-rotational wireless power transfer system with the central spinning magnetic conductor and peripheral stationary electrical conductors proposes a slim secondary electromagnetic interface easily integrable into other structures [e.g. electronic devices including or not rechargeable power sources, etc.] and can be used in various applications including transport ones.

The proposed transverse magnetic field motor can provide an electric motor easily integrable into slim structures which can provide a function of a power transfer interface. The proposed transverse magnetic field motor comprising a motor rotor being at the same time a turbine, a compressor, a pump or a fan rotor can provide a simple, cheap to produce, efficient, light and reliable design.

The proposed magnetic field driving method for an electric motor enable to construct linear motors, rotational motors, motors with irregular 2D or 3D motion patterns, freedom spherical joints which can be used in actuators, robots, transportation, medical transplants, etc. Motors operable by the proposed method can work under normal atmospheric pressure, under a high ambient pressure, in a humid environment and in a liquid. The motors operable by the proposed method can propose a plurality of various movements. (composed) trajectories [translational, rotational, 2D. 3D, combinations].

The proposed electric piston engine can be used in various motoric application including use of existing know-how concerning internal combustion (IC) engines. The proposed engine can drive onshore vehicles, water vessels, air vehicles, etc. The proposed engine can be used in modification of IC engines in existing vehicles and water vessels including classic, vintage and veteran cars or water vessels thus preserving other structures (clutches, shafts, controls, etc.) which can have historical significance thus saving technical heritage.

The proposed spherical joint electric motor or homokinetic joint electric motor can in comparison with in-wheel motors reduce unsprung mass and improve driving properties of an electric vehicle.

The proposed electric rotating piston engine can offer a smooth operation providing minimum vibrations with enhanced cooling experience as the rotating rotor can create cooler airflow by itself. The electric rotating piston engine can offer even more favorable power-to-weight ratio than an IC rotary engine. The electric rotating piston engine can offer a design simplicity with less likely experiencing a seizing event or other failure which can make it particularly suitable for electric aircrafts. In case of an oil lubrication, as the electric rotary motor does not burn oil during operation a lossless oil lubrication can be achieved. The electric rotating piston engine does not experience the same sealing problems as an IC rotary engine.

I claim:

1. A stationary-rotational wireless power transfer system comprising: a stationary primary electromagnetic interface including one or more primary magnetic conductors and providing a transverse magnetic field on its coupling side and a secondary electromagnetic interface including a secondary electrical conductor, wherein said secondary electromagnetic interface is configured to spin around a spin axis at a distance from said primary electromagnetic interface to induce a current in said secondary electrical conductor, said system characterized in that said stationary primary electromagnetic interface is substantially planar or forms a cylindrical pathway.

2. The stationary-rotational wireless power transfer system according to claim 1, wherein said primary electromagnetic interface includes one or more primary electrically conductive loops wound at least partially around said one or more primary magnetic conductors.

3. The stationary-rotational wireless power transfer system according to claim 1, further comprising a secondary magnetic conductor, wherein said secondary electrical conductor is wound at least partially around a secondary magnetic conductor and wherein a winding axis is substantially perpendicular or parallel to said spin axis.

4. The stationary-rotational wireless power transfer system according to claim 1, wherein said secondary electrical conductor is oriented substantially perpendicularly to said transverse magnetic field.

5. The stationary-rotational wireless power transfer system according to claim 1, further comprising a secondary magnetic conductor configured to be in at least partial magnetic interaction with said primary magnetic conductor.

6. The stationary-rotational wireless power transfer system according to claim 1, further comprising a secondary magnetic conductor configured to provide a secondary magnetic field, wherein at least one said secondary magnetic field is selected from rotating magnetic fields, radially oriented magnetic fields, or combinations thereof.

7. The stationary-rotational wireless power transfer system according to claim 1, wherein said secondary electromagnetic interface is configured to be an electric motor or an electric generator, or combinations thereof.

8. The stationary-rotational wireless power transfer system according to claim 1, wherein said one or more primary magnetic conductors are at least partially interconnected to provide a magnetically conductive path.

9. The stationary-rotational wireless power transfer system according to claim 1, wherein said primary and secondary electromagnetic interface are coupled with a primary and a secondary electrocomponent, respectively.

10. The stationary-rotational wireless power transfer system according to claim 1, providing wireless data transmission.

11. The stationary-rotational wireless power transfer system according to claim 1, further comprising: a shielding to shield at least partially at least one element of said wireless electromagnetic power transfer system.

12. The stationary-rotational wireless power transfer system according to claim 1, further comprising: an insulation to insulate at least partially at least one element of said wireless electromagnetic power transfer system.

13. The stationary-rotational wireless power transfer system according to claim 1, further comprising: a thermal management system to thermally manage said power transfer.

14. The stationary-rotational wireless power transfer system according to claim 1, wherein said primary electromagnetic interface is coupled with an onshore track and said secondary electromagnetic interface is coupled with a vehicle.

15. The stationary-rotational wireless power transfer system according to claim 1, wherein said primary electromagnetic interface is coupled with a waterway track and said secondary electromagnetic interface is coupled with a water vessel.

16. The stationary-rotational wireless power transfer system according to claim 1, wherein said primary electromagnetic interface includes sections and connections to cope with a physical factor.

17. A transverse magnetic field motor comprising: a first portion and a second portion mounted to relatively spin around a spin axis, wherein a transverse magnetic field is provided between said first portion and said second portion and that said second portion includes an electrical conductor substantially perpendicular to said spin axis, said motor characterized in that said first portion is substantially planar.

18. The transverse magnetic field motor according to claim 17, wherein said transverse magnetic field is at least partially provided from a stationary primary electromagnetic interface and wherein said motor is configured to function as a secondary electromagnetic interface configured to relatively spin around said spin axis at a distance from said stationary primary electromagnetic interface to induce a current in said electrical conductor.

19. A magnetic field driving method for an electric motor comprising the steps of:

finding one or more magnetic holes in a second portion of said electric motor, said portion mounted to relatively spin around a spin axis or to relatively move in at least one direction, said one or more magnetic holes providing a low reluctance path for a magnetic field;

applying one or more voltages to one or more magnetic points to provide said magnetic field, said one or more magnetic points provided on a coupling side of a stationary first portion of said electric motor;

finding another said one or more magnetic holes;

applying said voltage to another said one or more magnetic points, wherein the steps are repeated till a signal be applied.

20. An electric piston engine comprising: at least one piston coupled with a coupling mean and guided by a guiding mean, wherein said piston is within a cylinder being said guiding mean or wherein said piston is a rotary piston within a Wankel type engine, said engine characterized in that said guiding mean and said piston has at least partially a winding thereon, wherein an electrical current provided into said windings forces said piston to move along said guiding mean.

\* \* \* \* \*